(12) United States Patent
Yacko et al.

(10) Patent No.: US 12,391,538 B1
(45) Date of Patent: *Aug. 19, 2025

(54) SYSTEMS AND METHODS FOR DISPENSING SUBSTANCES

(71) Applicant: iDispense, LLC, Toledo, OH (US)

(72) Inventors: Robert Bruce Yacko, Toledo, OH (US); Benjamin Chase Yacko, Toledo, OH (US); Felicia R. Yacko, Toledo, OH (US); Robert Lawson-Shanks, Reston, VA (US); Mark Lyons, Leesburg, VA (US); Todd Schimmoeller, Ottawa, OH (US)

(73) Assignee: iDispense, LLC, Toledo, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/096,863

(22) Filed: Jan. 13, 2023

Related U.S. Application Data

(63) Continuation of application No. 18/079,309, filed on Dec. 12, 2022.

(Continued)

(51) Int. Cl.
  *B67D 7/14* (2010.01)
  *B67D 7/02* (2010.01)
  (Continued)

(52) U.S. Cl.
  CPC .......... *B67D 7/145* (2013.01); *B67D 7/0277* (2013.01); *B67D 7/743* (2013.01); *B67D 7/78* (2013.01); *G05D 11/13* (2013.01)

(58) Field of Classification Search
  CPC ...... B67D 7/145; B67D 7/0277; B67D 7/743; B67D 7/78; G05D 11/13
  See application file for complete search history.

(56) References Cited

U.S. PATENT DOCUMENTS 3,103,960 A * 9/1963 Simjian ................... G07F 13/10
  141/351
4,559,979 A * 12/1985 Koblasz .............. G01F 23/2962
  141/11

(Continued)

*Primary Examiner* — Frederick C Nicolas
(74) *Attorney, Agent, or Firm* — KENEALY VAIDYA LLP

(57) ABSTRACT

Systems and methods are disclosed to mix a base ingredient, such as water, with an additive, such as a cleaning concentrate. A dispensing system of the disclosure can include a container filling apparatus. The container filling apparatus can include one or more source containers that contain an additive to be mixed with water or other base ingredient. The container filling apparatus can include a vacuum manifold and a Venturi body assembly (VBA). The additive can be flowed through the vacuum manifold and into the VBA. In the VBA, the additive can be mixed with water or other base ingredient, and output to a receiving container. As the additive is flowed through the vacuum manifold, vacuum pressure in the pressure manifold can be measured by a pressure sensor. A controller can input pressure data from the pressure sensor over the course of a dispense event. Over the course of a dispense event, flow of additive can be varied or modulated based on the pressure data. The flow of additive can be provided, as controlled by the controller, in a sequence of pulses. The length of a pulse, in a dispense event, can be adjusted based on observed pressure data in prior pulses.

16 Claims, 37 Drawing Sheets

Related U.S. Application Data

(60) Provisional application No. 63/414,887, filed on Oct. 10, 2022.

(51) Int. Cl.
   *B67D 7/74* (2010.01)
   *B67D 7/78* (2010.01)
   *G05D 11/13* (2006.01)

(56) References Cited

U.S. PATENT DOCUMENTS

| | | | | |
|---|---|---|---|---|
| 4,733,381 A * | 3/1988 | Farmer | B67D 1/1238 | 141/94 |
| 4,917,155 A * | 4/1990 | Koblasz | B67D 1/1238 | 367/908 |
| 4,929,818 A * | 5/1990 | Bradbury | B67D 1/0014 | 235/383 |
| 5,036,892 A * | 8/1991 | Stembridge | B67D 3/0003 | 367/908 |
| 5,040,699 A * | 8/1991 | Gangemi | G01G 19/346 | 141/105 |
| 5,203,387 A * | 4/1993 | Howlett | B01F 35/714 | 141/156 |
| 5,566,732 A * | 10/1996 | Nelson | B67D 1/1236 | 141/351 |
| 5,765,605 A * | 6/1998 | Waymire | B01F 25/105 | 141/2 |
| 5,915,592 A * | 6/1999 | Mehus | B67D 7/74 | 222/630 |
| 6,056,027 A * | 5/2000 | Patterson | B65B 1/32 | 141/370 |
| 6,082,419 A * | 7/2000 | Skell | B67D 1/1236 | 141/351 |
| 6,193,058 B1 * | 2/2001 | Yacko | B65D 81/3266 | 206/459.5 |
| 6,279,836 B1 * | 8/2001 | Toetschinger | C11D 1/66 | 239/443 |
| 6,293,294 B1 * | 9/2001 | Loeb | B01F 25/312 | 137/892 |
| 6,550,642 B2 * | 4/2003 | Newman | B67D 1/1234 | 222/23 |
| 6,578,763 B1 * | 6/2003 | Brown | G07F 13/06 | 222/129.1 |
| 6,772,944 B2 * | 8/2004 | Brown | G07F 13/06 | 235/383 |
| 6,789,585 B1 * | 9/2004 | Janke | G07F 13/02 | 141/351 |
| 6,883,560 B2 * | 4/2005 | Beldham | B65B 3/22 | 141/105 |
| 6,968,876 B2 * | 11/2005 | Yacko | B67D 7/346 | 141/351 |
| 7,131,468 B2 * | 11/2006 | Schuman | B67D 7/741 | 141/2 |
| 7,237,577 B1 * | 7/2007 | Yacko | B67D 7/84 | 141/351 |
| 7,284,576 B1 * | 10/2007 | Yacko | B67D 7/348 | 141/83 |
| 7,615,122 B2 * | 11/2009 | Mehus | B01F 25/31242 | 137/895 |
| 8,905,079 B2 * | 12/2014 | Bonoz | B01F 35/833 | 137/893 |
| 10,751,680 B2 * | 8/2020 | Carbone, II | G01F 25/10 | |
| 2002/0020742 A1 * | 2/2002 | Streicher | B67D 7/346 | 235/381 |
| 2002/0030102 A1 * | 3/2002 | Brown | G07F 7/06 | 235/435 |
| 2003/0051767 A1 * | 3/2003 | Coccaro | B67D 7/348 | 141/351 |
| 2003/0201282 A1 * | 10/2003 | Floyd | B01F 35/883 | 222/394 |
| 2004/0020723 A1 * | 2/2004 | Schuman | B67D 7/348 | 186/52 |
| 2005/0178799 A1 * | 8/2005 | Cheong | A47J 31/401 | 222/129.4 |

\* cited by examiner

SYSTEMS AND METHODS FOR DISPENSING SUBSTANCES

RELATED PATENT APPLICATION AND PRIORITY

This application claims priority to and is a continuation patent application of U.S. patent application Ser. No. 18/079,309 filed Dec. 12, 2022, the content of which is incorporated herein by reference in its entirety.

This application and U.S. patent application Ser. No. 18/079,309 both claim priority to U.S. Provisional Patent Application 63/414,887 filed Oct. 10, 2022, the content of which is incorporated herein by reference in its entirety.

BACKGROUND OF THE DISCLOSURE

This disclosure relates to systems and methods for substance dispensing in a facility. Industrial and commercial firms frequently require the use of industrial solutions, including cleaning solutions, disinfectant solutions and solvents for various purposes. In hospitals, for example, disinfectant solutions are often used on floors and other surfaces to assure a clean environment. Traditional technology for disbursing and handling these industrial solutions can involve shipping the solution in bulk to the facility requiring the solution, and measuring out quantities of the solution for each use required. This system is disadvantageous in that it requires the shipping and storing of a large amount of bulky, heavy fluid. Alternatively, concentrated chemical substances can be shipped in smaller portions, but the end users are responsible for handling and diluting the chemicals, which are expensive, and, if handled, could be dangerous. Advances in the field of disbursing solutions have lead to the use of concentrates dispensed for dilution and use in various locations within an industrial or commercial facility. The concentrates can be either in a liquid or a solid form. The use of concentrates is an improvement over shipping fully diluted solutions, which require large storage units and take up valuable space in a hospital or factory, for example.

The use of known dispensing systems can place responsibility of dispensing materials on untrained personnel. Further, it then becomes the user's responsibility to know which chemicals can be mixed together and in which proportions. Leaving such choices to the discretion of a user creates the opportunity for the improper and potentially dangerous combination of chemicals, the waste of expensive chemicals or the theft thereof. Additionally, in the food service and pharmaceutical industries, the dispensing of accurate amounts of ingredients is essential to quality control and inventory management.

The use of a chemical mixing and dispensing systems is known. However, in particular, the accuracy and consistency provided by such systems can be improved.

It would be advantageous if a system could be developed for more simply handling, dispensing and diluting concentrated substances in a more accurate and consistent manner.

SUMMARY OF THE DISCLOSURE

Systems and methods are disclosed to mix a base ingredient, such as water, with an additive, such as a cleaning concentrate. A dispensing system of the disclosure can include a container filling apparatus. The container filling apparatus can include one or more source containers that contain an additive or concentrate to be mixed with water or other base ingredient. The container filling apparatus can include a vacuum manifold and a Venturi body assembly (VBA). The additive can be flowed through the vacuum manifold and into the VBA. In the VBA, the additive can be mixed with water or other base ingredient, and output to a receiving container, such as a spray bottle or a mop bucket. As the additive is flowed through the vacuum manifold, vacuum pressure in the pressure manifold can be measured by a pressure sensor. A controller can input pressure data from the pressure sensor over the course of a dispense event. Over the course of a dispense event, flow of additive can be varied or modulated based on the pressure data. The flow of additive can be provided, as controlled by the controller, in a sequence of pulses. The length of a pulse, in a dispense event, can be adjusted based on observed pressure data in prior pulses. The disclosure includes various related features, as described hereinafter.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 33 shows a CFA 300B adding additive into a flow of water 602 from a water source, in accordance with principles of the disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The systems and methods of the disclosure relate to the generation of a product, such a cleaning solution, by mixing a concentrate or additive into a base ingredient, such as water.

Figure 1:
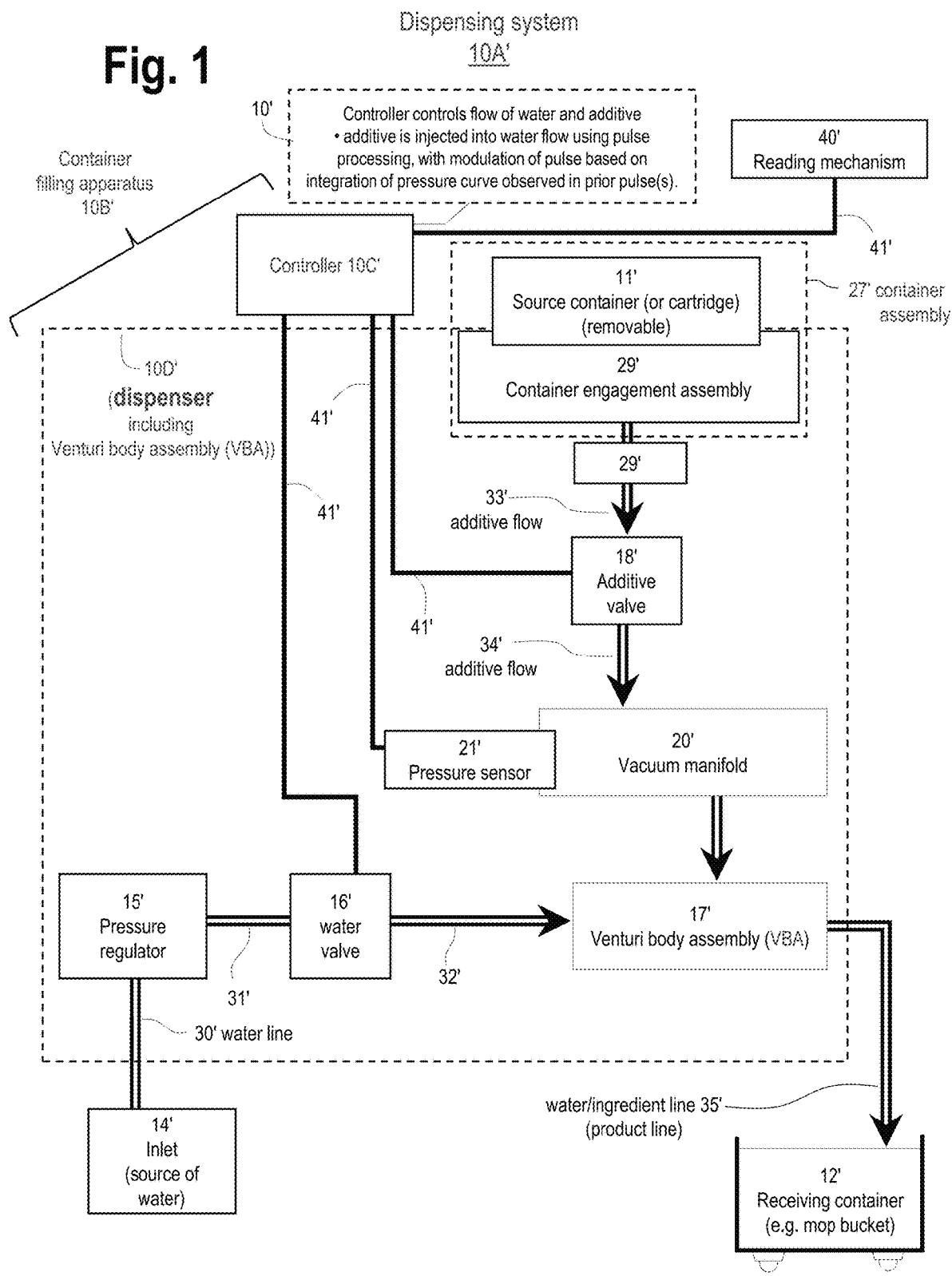
FIG. 1 is a schematic diagram of a dispensing system, in accordance with principles of the disclosed subject matter.

FIG. 1 is a schematic diagram of a dispensing system 10A', in accordance with principles of the disclosed subject matter. The dispensing system 10A' can include a container filling apparatus (CFA) 10B' that combines a base ingredient, such as water, with an additive, such as a cleaning concentrate. The dispensing system 10A' can also include a receiving container 12, as shown in FIG. 1. The dispensing system 10A' can also include other components such as a user device, a central database to aggregate or collect data, various data resources, and other components as described below.

The container filling apparatus 10B', i.e. a dispensing apparatus, can include a dispenser 10D', a controller 10C' that controls the dispenser 10D', and one or more source containers 11'. The controller 10C' can control the dispenser 10D' to mix water (or other base ingredient) to an additive in a source container 11' so as to generate a product. The product can be output to the receiving container 12'. As described in detail below, the dispenser 10D' can include a Venturi body assembly (VBA) 17'. The VBA 17' can be used to combine water with the additive from the source container 11'. The dispenser 10D' can include a container engagement assembly 28' that engages or mates with the source container 11'.

The dispenser can also include an attachment adapter 29' that engages or mates with the container engagement assembly 28'. That is, the attachment adapter 29' can serve to attach the container engagement assembly 28' to a solenoid valve, i.e. an additive valve 18', as shown in FIG. 1. The container engagement assembly 28' can include an attachment collar and a connection assembly that is attached to the source container 11'. As shown in FIG. 1, the source container 11' and the container engagement assembly 28' can be collectively described as a container assembly 27'. Details of such container assembly 27', and the dispenser 10D', are described in detail below.

As shown in FIG. 1, a solenoid valve or additive valve 18' controls flow of additive out of the container assembly 27'. That is, when the additive valve 18' is open, additive can flow out of the container assembly 27', through the attachment adaptor 29', and into a vacuum manifold 20' (as illustrated by additive flows 33' and 34'. The additive can subsequently flow into the VBA 17', as illustrated by additive flow 34". Accordingly, when the additive valve 18' is open, additive flows through the vacuum manifold 20' and into the VBA 17' so as to be mixed with water or other base ingredient. As described herein, water is illustratively described as a base ingredient. However, it is appreciated that any base ingredient can be used, as desired. Indeed, the base ingredient itself could be a mixture as desired.

With further reference to FIG. 1, as additive flows to the vacuum manifold 20' and into the VBA 17', pressure of the flow in the vacuum manifold 20' can be measured. Such measurement can be performed by a pressure sensor 21'. The pressure sensor 21' can send pressure data back to the controller 10C'. As described in detail below, the pressure data can be used to monitor and control the flow of additive and subsequent mixing of the additive with water. As noted at 10', the controller can control the flow of water and additive. Additive can be injected into a water flow using pulse processing, with modulation of the pulses based on integration of a pressure curve observed in prior pulses. After the additive is mixed with water in the VBA 17', the mixture, i.e. product, can be output via a product line 35'. The product can flow into a suitable receiving container 12'. The receiving container 12' can be a mop bucket, spray container, or other container as desired.

As shown in FIG. 1, water can be provided from an inlet 14'. Flow of water into the VBA 17' can be controlled by a water valve 16'. The water valve 16' can be a solenoid valve or any other suitable valve. A pressure regulator 15' can be included in the water flow line. Accordingly, the water line 30' can connect the pressure regulator 15' to the inlet or source of water 14'. Water line 31' can provide flow of water from the pressure regulator 15' to the water valve 16'. A further water line 32' can provide flow of water from the water valve 16' into the VBA 17'. The pressure regulator 15' could be positioned downstream of the water valve 16', rather than upstream as shown in FIG. 1. The pressure regulator can provide a constant pressure of water into the VBA 17'. For example, the pressure regulator 15' might provide 30 psi (pounds per inch) of pressure in water flowing into the VBA 17'. Such constant water pressure can thus be a constant, rather than a variable, to assist in processing of pressure data (from the pressure sensor 21') by the controller 10C'.

The various components of the dispensing system 10A' and the container filling apparatus 10B' can be connected via suitable communication lines 41'. The communication lines 41' can carry control signals, data signals, and/or any other data as desired. In particular, the controller 10C' can be connected via communication lines 41' to the additive valve 18', the pressure sensor 21', the water valve 16', and a reading mechanism 40'. As described in detail below, the reading mechanism 40' can input data, which can be communicated to the controller 10C', regarding if a dispensing event is authorized.

Figure 2:
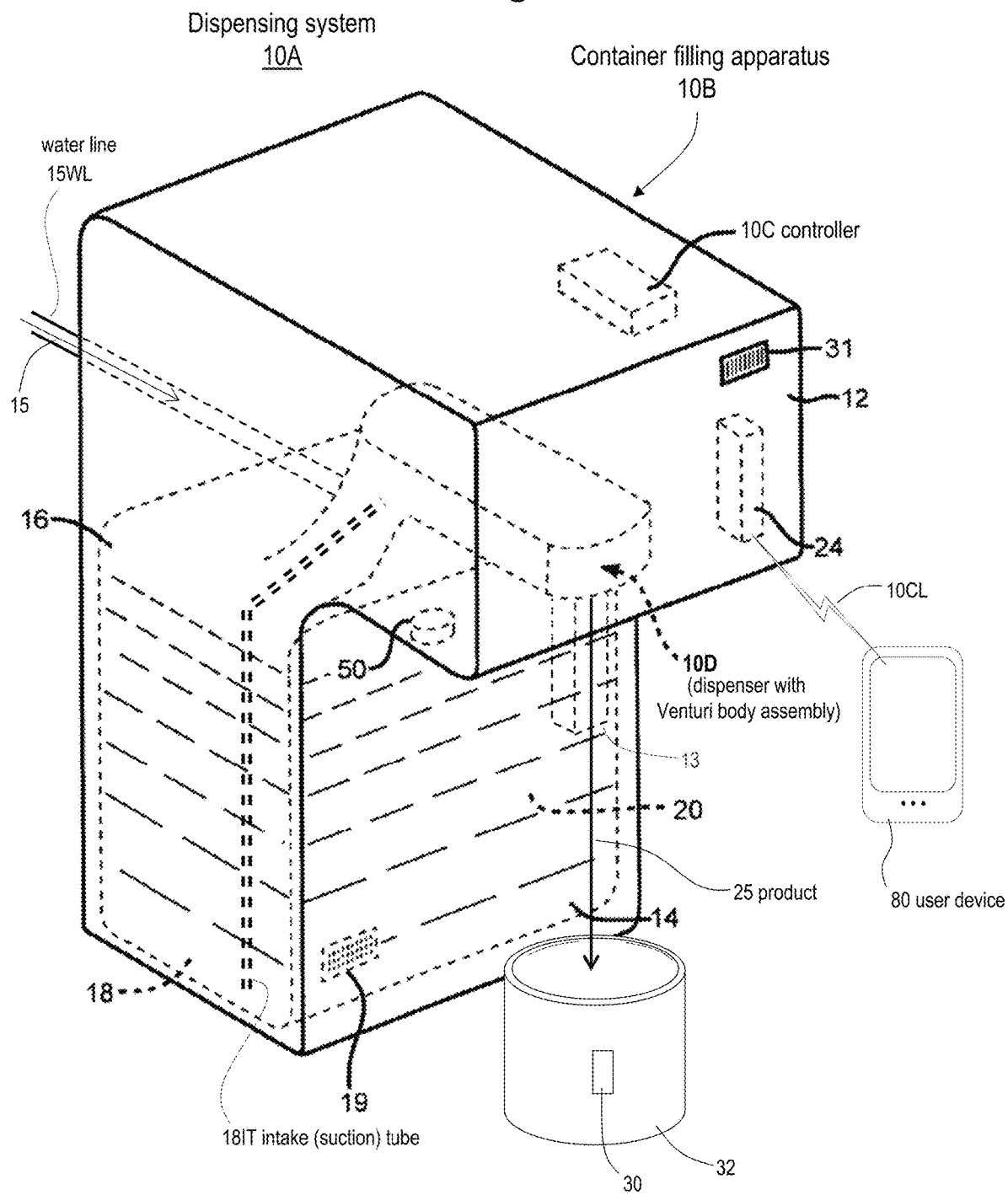
FIG. 2 is a perspective view of a source container dispensing apparatus, in accordance with principles of the disclosed subject matter.

The container filling apparatus 10B', shown in the schematic diagram of FIG. 1, can be provided in a variety of physical manifestations. FIG. 2 is a perspective view of a dispensing system 10A with a container filling apparatus 10B. i.e. a dispensing apparatus, for dispensing an additive, i.e. a substance, in accordance with principles of the disclosed subject matter. The dispensing system 10A can include the container filling apparatus 10B, a receiving container 32 (such as a mop bucket), and a user device 80. The container filling apparatus 10B can include a dispenser 10D with a Venturi body assembly. The container filling apparatus 10B can include various components providing similar structure to the container filling apparatus 10B' shown in FIG. 1. The container filling apparatus 10B as illustrated can have an inverted "L" shape, but the container filling apparatus 10B can have any suitable shape or configuration. As shown, the body of the container filling apparatus 10B has a generally rectangular upper portion 12 and lower portion 14. The lower portion 14 can act as a base and can have a cavity 16 formed therein such that a source container 18 can be positioned inside the apparatus 10. However, it should be understood that the source container 18 could be positioned at any suitable location within or outside the apparatus 10. Additionally, the container filling apparatus 10B could be adapted to have any size or shape. Therefore, the source container 18 could also have any size or shape, wherein the size or shape of the container 18 corresponds to or can be connected to the container filling apparatus 10B. Alternatively, the source container 18 could be smaller than the cavity 16 of the container filling apparatus 10B so that multiple source containers 18 could be positioned therein. The source container 18 preferably contains a substance 20, i.e. an additive, that is to be mixed with water 15 and dispensed from the container filling apparatus 10B as product 25. When the contents 20 of the source container 18 have been depleted, the container filling apparatus 10B could be opened, and the source container 18 replaced or refilled. In an embodiment, the source container 18 is a replaceable cartridge.

The upper portion 12 of the container filling apparatus 10B can have the capacity to receive a control device or controller 10C, a reading mechanism 24 and a dispenser 10D. The dispenser 10D of the apparatus, can be located inside and on the underside of the upper portion 12 of the container filling apparatus 10B, can include a nozzle, valve or tap 13, akin to the product line 35' of FIG. 1. The dispenser 10D can be connected to the source container 18 in any manner, e.g. a tube, such that when the dispenser 10D is activated, the dispenser 10D can discharge the substance 20 mixed with water 15, provided by a water line 15WL, to provide a product 25. Various appurtenances can also be attached to the body of the container filling apparatus 10B such as a hose connected to the dispenser 10D or a mechanism to allow the container filling apparatus 10B to be connected to a receiving vessel, such as an a mop bucket, a maintenance cart, an auto scrubber, or some other receiving vessel.

Figure 3:
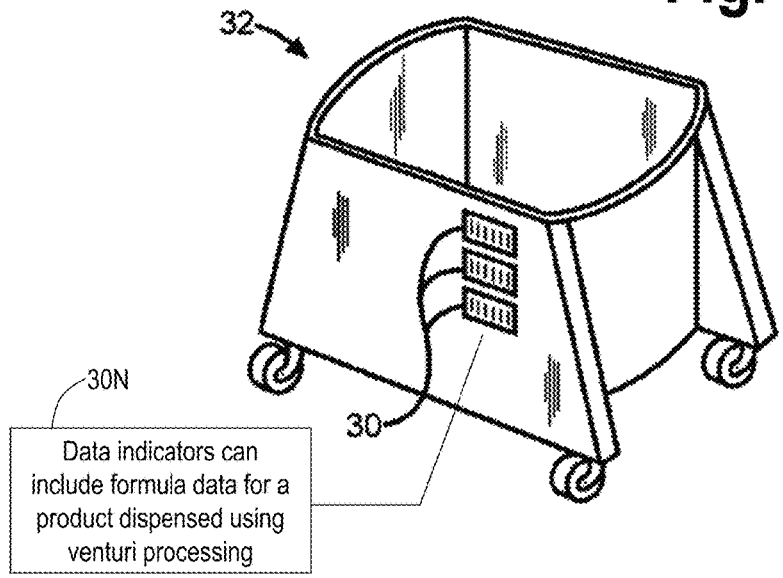
FIG. 3 is an enlarged perspective view of a first receiving container, in accordance with principles of the disclosed subject matter.

The control device or controller 10C of the container filling apparatus 10B is preferably a microchip, a computer or any other controlling device that acts as a controller for the apparatus 10. The controller 10C operates a program that can be enabled to control how and when the container filling apparatus 10B dispenses the product 25. It may be preferred that the controller 10C be programmed such that the dispenser 10D can only be activated when the controller 10C allows the dispenser 10D to operate, regardless of whether an operator attempts to operate the dispenser 10D. Therefore, it may be preferred that the controller 10C be connected to the dispenser 10D. It may also be preferred that the controller 10C be connected to the reading mechanism 24, which can be an RF (radio-frequency) receiver, a bar code scanner, a magnetic strip reader, a fingerprint reader, a retinal scanner, a Near Field Communication (NFC) reader, or any other suitable reading mechanism or communication mechanism that is capable of reading data on sources of data. Sources of data can include data indicators 19, 30, 31, which can be attached to the container filling apparatus 10B, the source container 18 and a receiving container 32, as shown in FIG. 3. An NFC reader can allow the reading mechanism 24 to talk to a user device 80, for example.

FIG. 3 is an enlarged perspective view of a first receiving container. As illustrated in FIG. 3, an example of a receiving container 32 is a mop bucket. The bucket 32 can have any volume, shape or size, but it may be preferred that the bucket 32 be appropriately sized such that a mop head or any other type of brush can be positioned inside the bucket 32 to gain access to the materials contained therein. Positioned on the bucket 32, at a convenient location such as on the top of one of the sides or on at least one of the sides, is at least one data indicator 30 for providing information about the bucket 32. Data indicators can include formula data for a product dispensed by the container filling apparatus 10B of the disclosure, using what can be described as "venturi processing." As described above, the bucket 32 can be adapted to be positioned next to the container filling apparatus 10B so that the product 25, to be dispensed, can be easily discharged into the bucket or receiving container 32.

Figure 4:
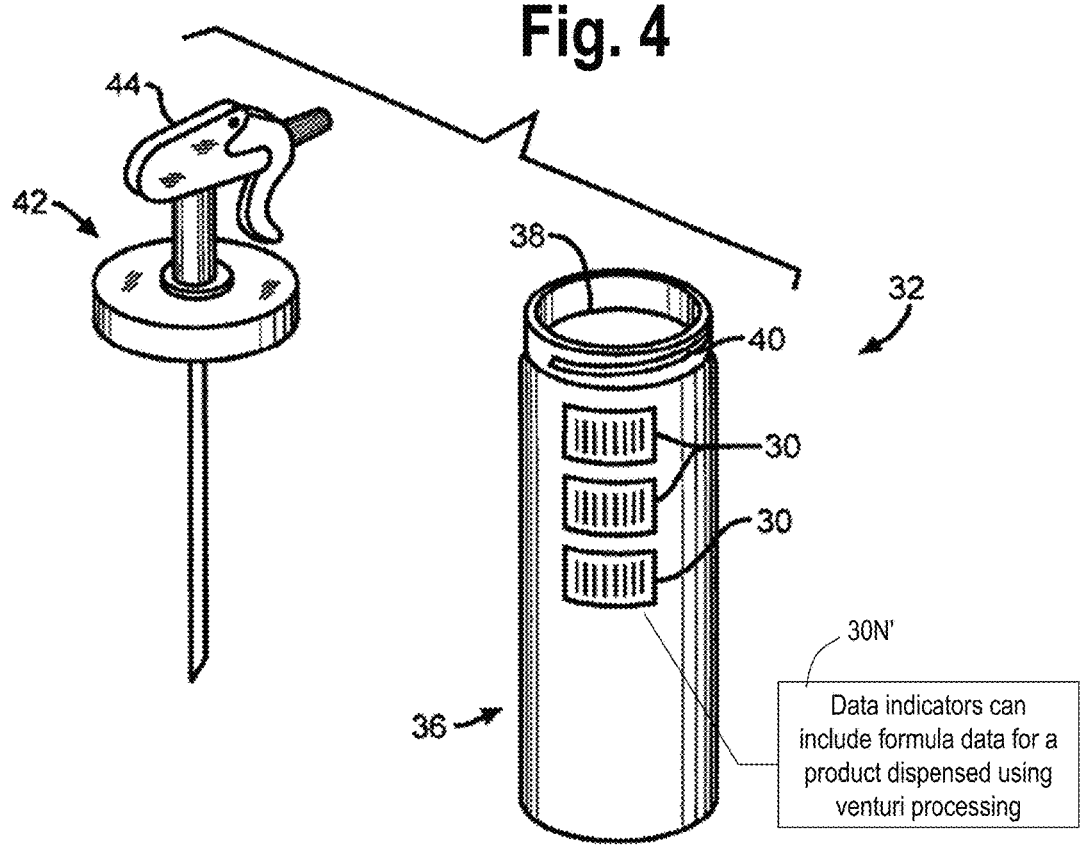
FIG. 4 is an enlarged perspective view of a second receiving container, in accordance with principles of the disclosed subject matter.

FIG. 4 is an enlarged perspective view of a second receiving container. As shown in FIG. 4, a second example of a receiving container is shown in the form of a spray bottle 32 having a cylindrical body 36 with an opening 38 at the top end. The top end can be provided with threads 40 that mate with a corresponding cap 42. The threads 40 could also be used to position the bottle 32 with respect to the container filling apparatus 10B. The cap 42 can include an apparatus that allows for easy discharge of the fluid from the bottle 32, such as a trigger sprayer 44. Positioned on the body 36 of the bottle 32, at a convenient location, is at least one data indicator 30. The data indicator 30 can include formula data for a product dispensed by the container filling apparatus 10B using venturi processing of the disclosure. Although two embodiments of receiving containers have been illustrated, it should be understood that any suitable receiving container could be used with the container filling apparatus 10B.

As shown in FIG. 2, a reading mechanism or reader 24 is adapted to read the data indicators 19, 30, 31. Depending on the reading mechanism 24, the data indicators 19, 30, 31 could be an RF chip (or transmitter), a NFC chip (or Transmitter), a bar code, a magnetic strip, or any other data indicator that corresponds to the type of reader 24 that is being used. The data contained on the data indicators 19, 30 can include data about the source container 18 or receiving container 32, respectively. The source container data indicator 19, i.e. the data indicator on the source container 18, can contain data identifying the substance 20 contained within the source container 18, the amount of the substance 20, i.e. additive, that is to be dispensed, the frequency with which the substance 20 can be dispensed, the operating personnel that are permitted to dispense the substance 20, or any other information about the substance 20 or accessibility to the substance. The amount of substance 20 to be dispensed can be based on a volume of substance 20 to be dispensed, on an amount of time the dispenser 10D remains open with product flowing, a volume of the receiving container, or any other suitable measuring parameter. The receiving container data indicator 30 can contain data identifying the substance 20 (or substances) that the container 32 is capable of receiving, the amount of the substance 20 that is to be received, the frequency with which the receiving container 32 can receive the substance 20, who can fill the receiving container 32, or any other desired information about the receiving container 32.

Figure 5:
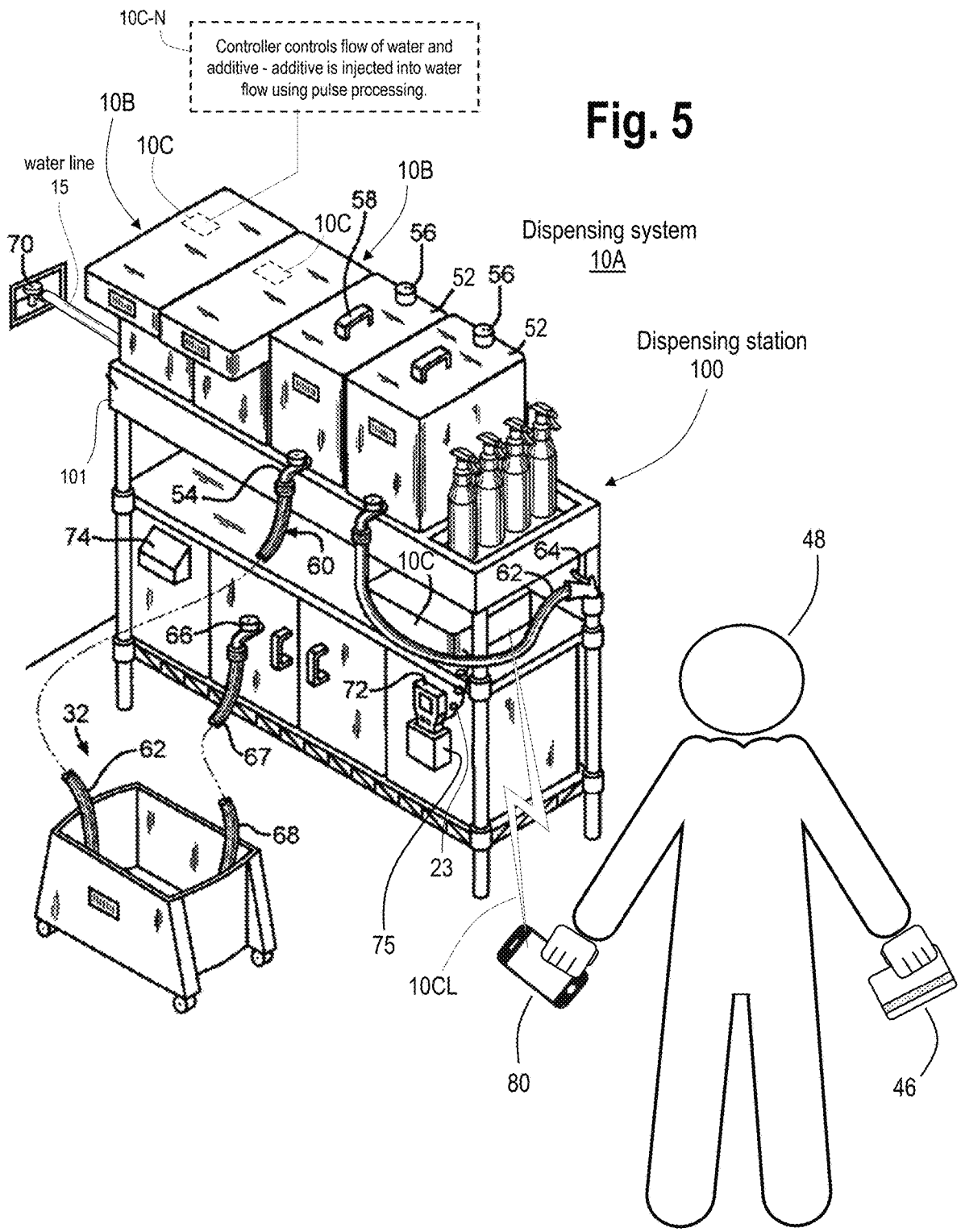
FIG. 5 is a perspective view of an alternate embodiment of a dispensing apparatus, in accordance with principles of the disclosed subject matter.
Figure 38:
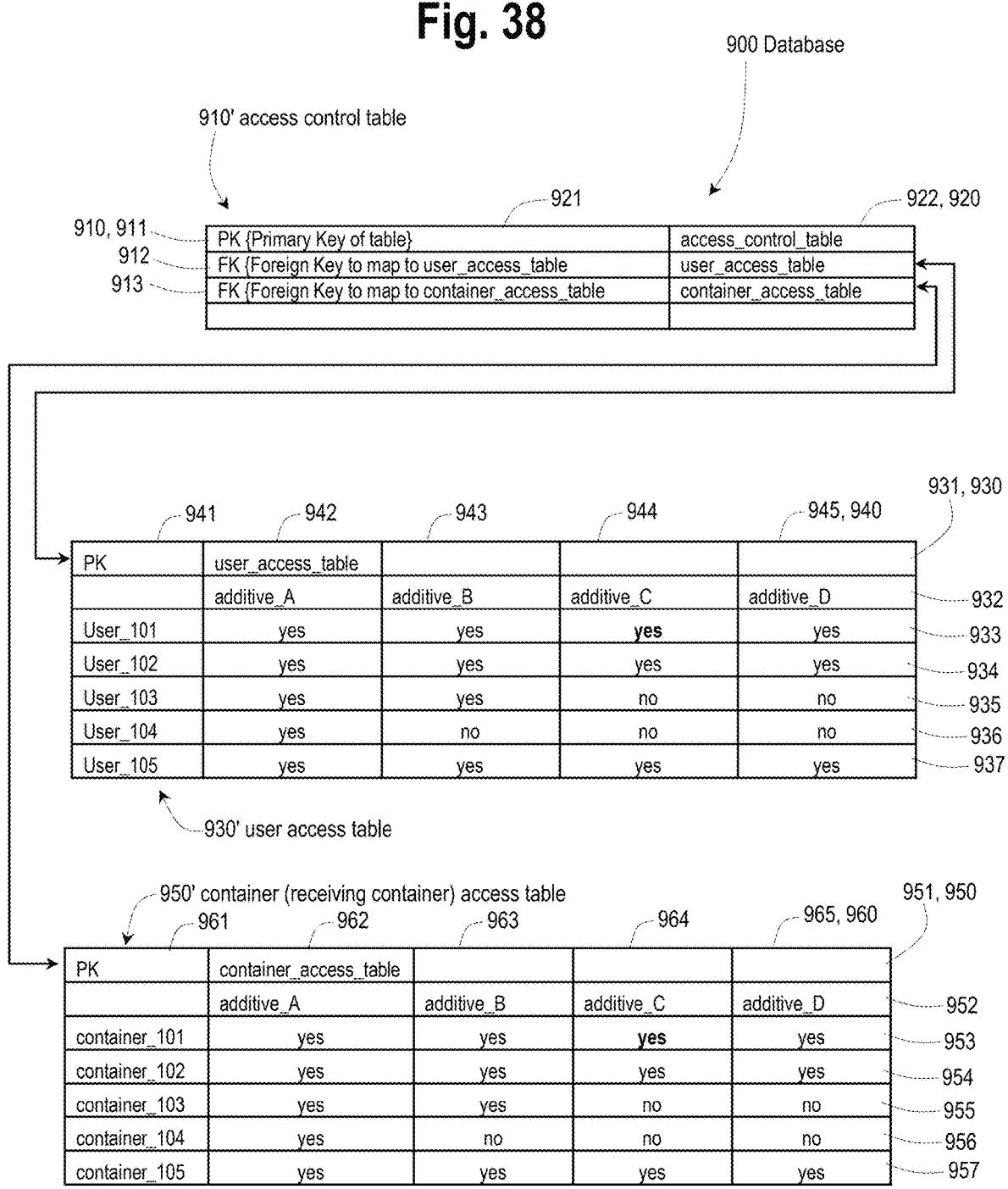
FIG. 38 is a schematic diagram showing database 900, which can be used in the processing of FIG. 37, in accordance with principles of the disclosed subject matter.

As described above, the dispensing apparatus can include a controller 10C. The controller 10C can be programmed such that when certain dispensing conditions are met, the controller 10C will allow the dispenser 10D, of the container filling apparatus 10B, to discharge an amount of the substance. The dispensing conditions can be based on the data that is contained in the data indicators 19, 30. Particularly, the controller 10C could allow the dispenser 10D to activate when the receiving container data indicator 30 is read by the reading mechanism 24 and is a match to a pre-established condition. For example, an RF chip on the receiving container 32 can register with an RF reading mechanism on the container filling apparatus 10B and indicate that the receiving container 32 is the correct container to receive the substance 20 contained in the container filling apparatus 10B (and the source container 18). Alternatively, the receiving container data indicator 30 could be a bar code and the reading mechanism 24 could be a bar code scanner. If the bar code that is read by the scanner matches a code programmed within a database in the program of the controller 10C, the controller 10C would allow the dispenser 10D to activate. As described above, a data indicator 19 could be located on the source container 18. The reading mechanism 24 could then be used to read both the source container data indicator 19 and the receiving container data indicator 30. If the control program detects that both the source data indicator 19 and receiving data indicator 30 correspond to each other, i.e. that they match, the controller 10C would then allow the dispenser 10D to activate. Other dispensing conditions could include a data indicator match between the source 18 and receiving containers 32, and a match between the source or receiving container data indicators 19, 30 and a personnel identification indicator 46, as shown in FIG. 5 where a person 48 is illustrated holding the indicator 46. The personnel identification indicator 46 is a data indicator that contains information about the person 48 attempting to operate the container filling apparatus 10B. A plurality of data indicators 19, 30 could be affixed to the source container 18 and receiving container 32 thereby allowing multiple substances 20 (mixed with water to provide a product) to be dispensed, respectively, from or into a container 32. Although it has been described that the source data indicators 19 and the receiving data indicators 30 "match", it should be understood that the term "match" can include any type of correspondence or satisfaction of constraints and/or satisfaction of rules that permits the program of the controller 10C to recognize that a dispensing condition(s) is satisfied thus authorizing activation of the dispenser 10D. FIG. 38, described below, shows an example of such correspondence, in the form of data values dictating that a requested dispense event should be allowed. Dispensing condition(s) can be dependent on attributes of the source container 18, attributes of the particular receiving container 32, and attributes of the personnel identification indicator 46 (representative of a human operator 48).

It may be preferred that the controller 10C be programmed to process the information from the data indicators 19, 30, 46 to determine whether the dispensing conditions are satisfied. Therefore, the control program can receive information from the reading mechanism 24 (or from multiple reading mechanisms), process the received data and determine whether to activate the dispenser 10D based on the data received. For example, based on data from the data indicators 19, 30, the control program can identify the amount of the substance 20 that is to be dispensed from the source container 18 and the amount of product 25 to be received in the receiving container 32 and determine whether there is a match between the data indicators 19, 30. Additionally, the controller 10C can be programmed to record the amount of substance 20 discharged per operation of the dispenser 10D, the number of receiving containers 32 processed, the frequency with which receiving containers 32 are filled, the amount of substance in the product, the ratio of substance to water, the operator 48 of the container filling apparatus 10B, and/or the time of day the container filling apparatus 10B is accessed. To prevent theft or waste, the program of the controller 10C can also detect and record whether an operator 48 of the container filling apparatus 10B attempted to dispense a substance 20, in a product, at a frequency that exceeds an allowable amount, into an unauthorized container, in a greater amount than permitted, whether an unauthorized operator attempted to use the container filling apparatus 10B, who operates the container filling apparatus 10B and when it is operated. It can be appreciated that the controller 10C can be programmed to include a greater or lesser number of parameters, including any other suitable types of information desired to be detected and recorded by the users of the container filling apparatus 10B.

In an embodiment, the container filling apparatus 10B has a locating mechanism 50 that can determine whether the receiving container 32 is properly positioned with respect to the dispenser 10D or source container 18. This is to prevent product 25 from being dispensed while the receiving container 32 is not appropriately placed. The locating mechanism 50 can be a movable tab or other mechanism that authorizes or enables the dispenser 10D when displaced by the receiving container 32. In an embodiment, the locating mechanism 50 is an optical or infrared scanner. It is further preferred that the locating mechanism 50 also be connected to the controller 10C so that the controller 10C can prevent the dispensing of the substance 20 if the scanner 50 sends a signal to the controller 10C indicating that the receiving container 32 is improperly positioned. Alternatively, the container filling apparatus 10B can be adapted to lockingly receive the receiving container 32 by using a threaded attachment or snap-in mechanism. Then, the locating mechanism 50 could detect the position of the receiving container 32 (by a push button that is pushed and activated, for example) and notify the controller 10C that a container 32 is in the proper position for dispensing the product 25.

The controller 10C could then check the data indicator 30 to ensure that the receiving container 32 is the proper one and that any other dispensing condition(s) is also satisfied prior to activating the dispenser 10D to dispense product 25. In an alternate embodiment, the container filling apparatus 10B could include a combination of the sensors described above and have an actuator such that when the data and position indicators verify that a data and position match has occurred, the operator of the container filling apparatus 10B can depress a button to trigger the container filling apparatus 10B to dispense the product 25.

FIG. 5 is a perspective view of a dispensing system 10A including a dispensing station 100 in accordance with an embodiment. The system 10A can include various features as described below, including the receiving container 32.

The dispensing station 100 can include a container filling apparatus 10B as described above, and preferably a plurality of container filling apparatuses 10B. Also, alongside, source containers 52 can be provided to directly dispense a substance 20, i.e. without the addition of water or other base ingredient. For example, a worker might require a product from a container filling apparatus 10B, as well as a substance directly from one of the containers 52, such as, for example, a floor cleaning solution and a glass cleaner. For example, a source container 52 could be a generally hollow container 52, such as a tank, having an independent outlet 54 or dispenser. Each container 52 could be filled with a liquid, solid or powder material. The dispenser 54 could include any type of release mechanism such as a spigot, valve, faucet, tap, or nozzle. The source container tanks 52 could optionally have an inlet 56 in order to allow for refilling of the container 52. The containers 52 can be made of a generally clear material so that the quantity of the substance 20 remaining therein is easily discernable by observing the outside of the container 52.

Additionally, the source containers 52 can be sized to have a multi-gallon capacity. However, the containers 52 can have any size or shape and can be made of any material. The source container or tank 52 can also optionally have handles 58, multiple outlets or inlets, feet or any other appurtenances suitable for use with source containers. Any other suitable source containers, such as jugs, bags or lined boxes may also be used. Attached to each outlet 54 of the source container 52 could be a spigot or a flexible hose 60 such that one end of the hose 60 is connected to the outlet or spigot 54 and the other, dispensing end 62 is adapted to be positioned in or above a receiving container 32. At the dispensing end of the hose 62, there can optionally be a dispenser such as a trigger sprayer 64, tap or nozzle. Alternatively, each source container 52 can dispense directly into a receiving container 32 from the spigot or outlet 54.

In the case of receiving a substance from the containers 52, i.e. the substance is not being mixed with water by a container filling apparatus 10B, the receiving containers 32 can contain water or another diluent prior to receiving the substance. Also, a diluent can be added to the receiving container 32 after the container receives the substance 20. The receiving container 32 carrying a solution of the substance 20 and diluent can then be used at any location such as a different room, floor, or building as needed. Alternatively, product can be dispensed using a container filling apparatus 10B, as described herein. That is, a diluent (e.g. water from a water source 70) could be mixed with additive from the source container 52, by a container filling apparatus 10B, such that upon activation of the container filling apparatus 10B, the diluent mixes with additive from the source container 52 prior to being dispensed into the receiving container 32. The mixing could be done by a container filling apparatus 10B using a venturi body assembly (VBA), as shown in FIG. 1. Additionally, a plurality of source containers 18, such as four (4) source containers, could be connected to a VBA and mix a plurality of substances 20 (including a diluent) prior to discharging a mixture of substances into the receiving container 32.

The source containers 18, 52 can be positioned at the dispensing station 100, as shown in FIG. 5. The dispensing station 100 can include a cart 102 that is optionally mounted on wheels. This would allow the station 100 to be positioned at a central location or moved as needed. In an alternate embodiment, the station 100 can be a permanent, unmovable structure. The source containers 18, 52 can be loosely positioned on or securely fastened to the cart 102 such that they can be refilled, removed, or replaced as needed. The station 100 can also include a hose 67 that is attachable to a diluent source 66 on one end with a nozzle attached to a dispensing end 68. The diluent source can be a permanent source, such as the wall outlet 70 (also can be used by the CFA 10B), water tap or sink, or a movable source, such as diluent tank 66 supplied on the station 100 or a loose tank (not shown). The dispensing end 68 of the diluent hose 67 is preferably adapted to dispense water or another diluent into the receiving container 32 with ease and efficiency.

Figure 6:
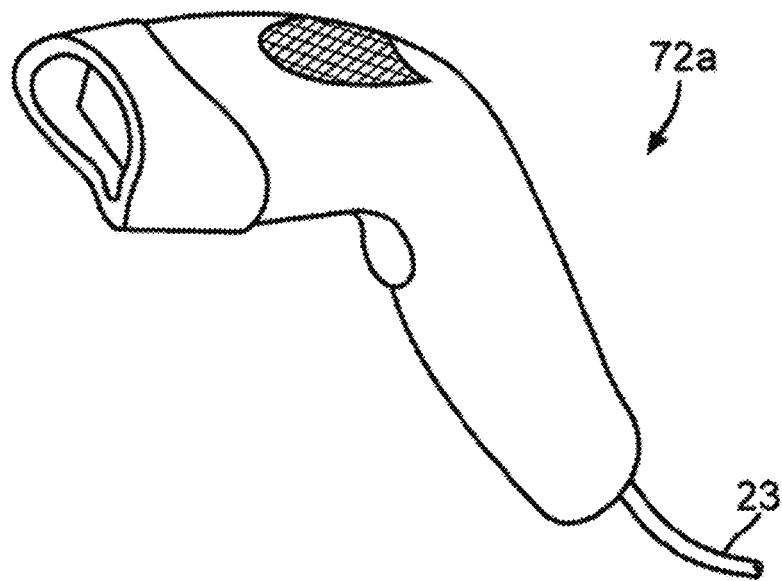
FIG. 6 is an enlarged view of a first handheld reading device, in accordance with principles of the disclosed subject matter.
Figure 7:
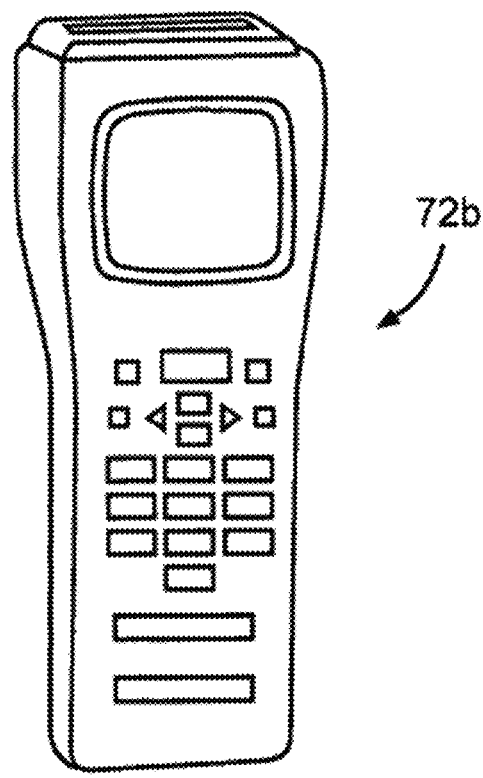
FIG. 7 is an enlarged view of a second handheld reading device, in accordance with principles of the disclosed subject matter.

For safety and cost reasons, it may be preferred that only a specified amount of substance 20 and/or product 25 be dispensed into a particular receiving container 32. As described above, the operation of a container filling apparatus 10B can be managed by programming a controller 10C to process data from the data indicators 19, 30. Such data indicators 19, 30 on the receiving container 32 and source container 18, 52 can be a magnetic strip, bar code, colored tag, pre-printed instruction label, or any other identifying indicia. It may be preferred that the data indicator 19, 30 be a magnetic strip, bar code or RF system so that a controller 10C operating a data matching and tracking program can determine when and whether a substance 20 is dispensed (in a product 25) and thus, removes any potential user confusion. Therefore, it is also preferred that the dispensing station 100 have a reading device 72, 74 (as shown in FIG. 5) such as a magnetic strip reader or scanner device so that the information on the data indicators 19, 30 can be transmitted to the controller 10C of a container filling apparatus 10B. The reader 74 can be permanently affixed to the cart as shown in FIG. 5. The receiving container 32 can then be moved to the reader 74 in order to be read. It may be preferred that the reader 72 be movable relative to the cart 102. This would allow the reader 72 to be moved toward the item to be read, and thus would be easier to handle by the user. Movable readers 72, such as those shown in FIGS. 5 and 6, are shown as conventional scanning devices. Any suitable scanning/reading device can be used. The handheld reader 72a as shown in FIG. 6 is preferably adapted to be physically connected to a controller 10C by a cable 23. Relatedly, as shown in FIG. 5, the controller 10C can be distributed over different physical components. Many reading devices come with a cable 23 that allows data to be transferred from the reading device 72 to a controller. Alternatively, the reading device 72b can be wireless, such as the device shown in FIG. 7. If the wireless reading device 72b is used, there can be a stand or holster 75 of some sort that retains the device 72b with the station. Alternatively, a portable reader 72 could be connected to a receiving container 32 such that the reader 72 travels with the receiving container 32.

The controller 10C can be a part of each container filling apparatus 10B and/or attached to the cart 102 of the station 100 and adapted to process the data read by the reader 72, 74 to determine whether a requested dispensing process should commence. The controller 10C can be programmed similarly to the controller described with respect to the other embodiments. This can prevent a user 48 from siphoning off or pilfering the substance 20 and/or product 25, which in many cases can be very expensive. Therefore, in any of the embodiments described herein, the station 100 or CFA 10B can be equipped with an alarm (not shown) so that the person 48 using the station 100 or container filling apparatus 10B and others know when an attempt is made to dispense the substance 20 at a frequency faster than a preset rate. An alarm can also be set for attempts to fill an improper receiving container 32, to dispense from a source container 18 to a non-matched receiving container 32, to dispense a greater than authorized amount of the substance 20, to indicate a lack of pre-filling of the receiving container 32 with diluent, and to operate the container filling apparatus 10B or station 100 in violation of the control program, and/or in response to other anomalies. The controller can be programmed to disable a container filling apparatus 10B or dispenser to prevent dispensing of the substance when the alarm is sounded. The controller 10C should also be adapted to store in a memory device the data read by the reading mechanism 72, 74. The memory device could be made integrally with the controller 10C. The information collected by the controller 10C can be downloaded or transmitted to a central computer or master control device for the purpose of inventory control, use information, ordering information, and quality control. The data is preferably stored in the controller 10C using random access memory, read only memory, or on a transferable or portable memory device such as a CD-ROM, flash-ROM chip, floppy disk, or any other suitable computer memory device. Alternatively, the controller 10C can transmit the data from a stored medium to another computer, master control device or memory storage device via a modem, a plug-in connection to a portable controller, a radio transmitter and receiver system, infrared means (such as via a PALM® operated device or a similar handheld computing device), or any other means. Additionally, the controller 10C could operate as the master control device allowing direct printing or downloading of information from the controller 10C.

In a further preferred embodiment, the controller 10C operates a control program that is enabled to determine whether an individual 48 (see FIG. 5) attempting to use the container filling apparatus 10B or station 100 is authorized to do so. This is to prevent theft or misuse of a substance 20 contained in a source container 18 by an untrained individual or a person who should not be accessing the substance. Such a program can be implemented to read a personnel data indicator 46, such as a bar code or magnetic strip, on an individual's nametag, uniform, or personnel identification card 46, or communicate with a user device (of the user) via a communication line or channel 10CL. Alternatively, more sophisticated systems, such as fingerprint or retinal scanning, can also be used. The reading device for identifying purposes can be the same as the reader 24, 72, 74 for the source container data indicator 19 and receiving container data indicator 30, but different readers could also be used. It may be preferred that the personnel identification reading mechanism be connected to the controller 10C such that the controller 10C can record and track which personnel used the station 100 or container filling apparatus 10B, when the station 100 or container filling apparatus 10B was used, and whether an attempt was made to use the station or apparatus improperly. As described above, an alarm (using lights and sound) can be used to indicate to the user 48 and others if someone attempts to access the station 100 or container filling apparatus 10B without authorization or attempts to use it incorrectly.

The method and apparatus have been described as dispensing a generic substance 20 in the form of a product 25 using a container filling apparatus 10B and directly from a container 52. The apparatus of the disclosure can be used for dispensing chemical concentrates or any other liquid into any type of receiving container. The method and apparatus are particularly adapted for the dispensing of concentrated cleaning chemicals into a diluent-filled dispensing bottle. The method and apparatus can be used to dispense many other substances including ketchup, soda, and fruit juices as well as non-food substances. Also, the dispensing apparatus could dispense a powder such as hot chocolate powder, instant coffee and lemonade powder. Additionally, a dispensing mechanism of the disclosure could be adapted to dispense any type of substance, including solids and powders, such as prescription pills, pesticides or any other material where measured dispensing is advantageous. For example, a product can be output into a receiving container 32 (using a container filling apparatus 10B that combines a substance/additive) and such product can then be combined with a substance from a source container 52.

Figure 8:
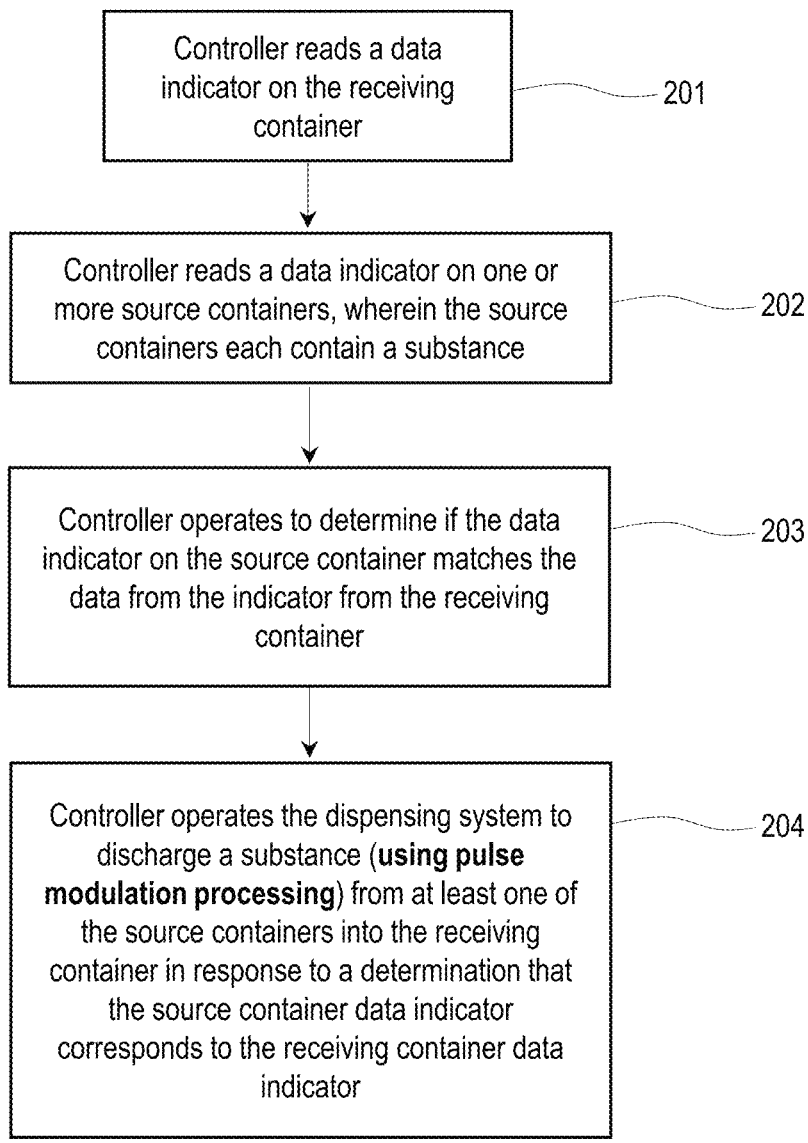
FIG. 8 is a process diagram of the steps of a method of operating an apparatus, in accordance with principles of the disclosed subject matter.

Shown in FIG. 8 is a flow chart depicting a method of operating a dispensing apparatus. The method of dispensing a substance into a receiving container can include: in a first step 201 (*a*) reading a data indicator on the receiving container; in a second step 202 (*b*) reading a data indicator on one or more source containers, wherein the source containers each contain a substance; in a third step 203 (*c*) operating a controller to determine if the data from the indicator on the source container matches the data from the indicator from the receiving container; and in a fourth step 204 (*d*) operating a dispensing system to discharge a substance from at least one of the source containers into the receiving container in response to a determination that the source container data indicator corresponds to the receiving container data indicator. The controller is programmed to determine when a dispensing condition is satisfied, based on the data from the receiving container, and to generate a signal when the dispensing condition is satisfied. The dispenser is configured to discharge the substance into the receiving container in response to the signal from the controller. The step 204 can be performed by a container filling apparatus 10B using pulse modulation processing, in accordance with principles of the disclosed subject matter. The method can optionally include, individually or jointly, the steps of: (e) operating the controller to dispense an amount of the substance (combined with water so as to provide a product 25) based on data contained on the data indicator; (f) operating the controller to record the amount of the substance discharged, the number of receiving containers filled, the frequency with which receiving containers are filled, and the number of discharges made from a container filling apparatus 10B; (g) operating the controller to record at least one of the total amount of the substance discharged and the amount of the substance discharged per operation of the dispensing system; (h) operating the controller to limit the frequency with which receiving containers can be filled; (i) operating the controller to communicate the recorded data to a master control device, so as to provide aggregation of data across a facility; and (j) operating a mechanism for personnel identification such that the dispensing system and/or container filling apparatus 10B is operable only when the system recognizes the personnel as being authorized.

In a particular embodiment, there is provided a system for controlling a plurality of chemical substance applicators, such as the receiving containers 32 disclosed above, in a facility, such as a factory or hotel. A common problem with the use of receiving containers, particularly of spray bottles of cleaning solution, is that some of the spray bottles are not properly returned for refilling and reuse. Instead, some of the spray bottles are either improperly taken and removed from the factory for personal use, or are thrown in the trash in the facility and not recovered or reused. A large factory can have hundreds of these spray bottles in operation at any one time, and a substantial percentage never make it back for refilling.

Figure 9:
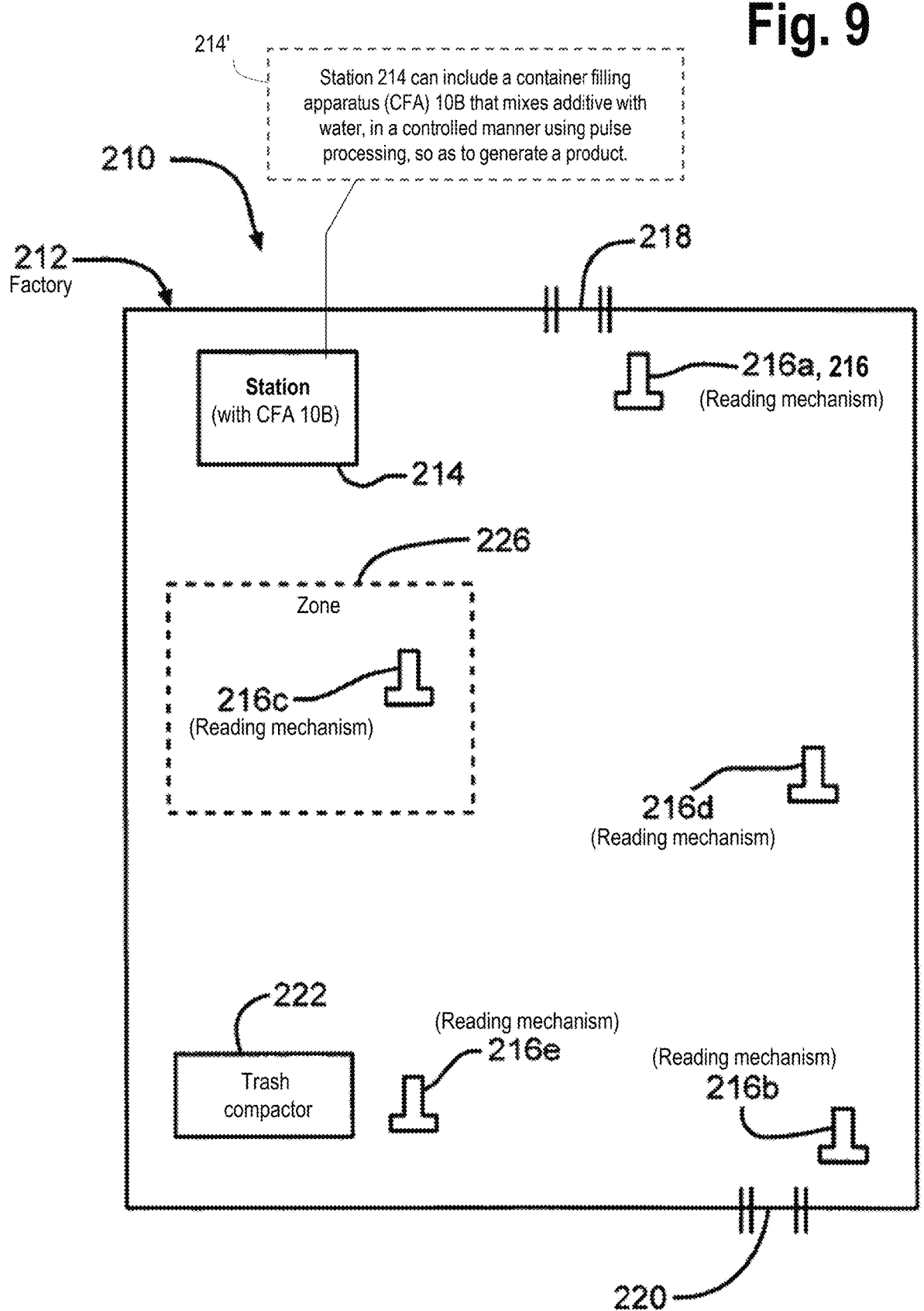
FIG. 9 is a schematic plan view of a facility into which a plurality of chemical substance applicators of the disclosure can be introduced, in accordance with principles of the disclosed subject matter.

As shown in FIG. 9, a system 210 is set up to control a plurality of chemical substance applicators, such as spray bottles containing liquid chemical substances. The system 210 is shown as being is operated in a facility 212 that includes one or more stations 214 for filling the chemical substance applicators. The stations 214 can be similar to those disclosed above, or can be of a different configuration. As noted at 214', a station 214 can include a container filling apparatus (CFA) 10B that mixes additive with water, in a controlled manner using pulse processing, so as to generate a product.

The stations 214 supply a collection of chemical substance applicators that are introduced into the facility 212. The chemical substance applicators can be introduced to the facility 212 in any suitable manner. The applicators are configured to contain the chemical substance, such as a chemical concentrate and a diluent (product), and to enable the chemical substance to be applied at various locations within the facility. The chemical substance applicators have data indicators identifying data about the chemical substance applicators. The data indicators can identify the chemical substance applicators as one of the plurality of chemical substance applicators that are part of the system 210.

One or more reading mechanisms, indicated generally at 216, are positioned at one or more locations within the facility. The reading mechanisms 216 are capable of reading data from the data indicators on the chemical substance applicators. The reading mechanisms 216 can be RF receivers or any other suitable reading mechanisms. Likewise, the data indicators on the chemical substance applicators can be an RF chip or any other suitable indicator as long as it is compatible with the reading mechanism.

The reading mechanisms 216 are strategically placed in the facility 212. For example, the reading mechanisms 216*a* and 216*b* are placed near building exits 218 and 220, respectively. Other reading mechanisms 216*c*, 216*d*, and 216*e* are placed strategically around the facility. It can be seen that when someone attempts to remove one of the chemical substance applicators from the facility 212 via either exit 218 or exit 220, the reading mechanisms 216*a* and 216*b*, respectively, will recognize or detect the chemical substance applicators and will activate an alarm or other signal indicating the presence of one or more of the chemical substance applicators. In this manner, the movement of chemical substance applicators within the facility 212 is controlled by monitoring data from the chemical substance applicators using the reading mechanisms 216. The system can be configured so that the detection of a chemical substance applicator by a reading mechanism 216*a*, 216*b* at the exit 218, 220 of the facility is recorded on a recording mechanism connected to the reading mechanism.

Another prime location within the factory 212 for placement of a reading mechanism is at a location within the facility where waste material is accumulated. As shown in FIG. 9, there is a location where all or a substantial portion of the waste from the facility 212 is directed and accumulated. Typically, there will be a waste facility, such as a trash compactor 222 or similar device, at such a location. A reading mechanism 216e is strategically positioned at the trash compactor 222 to detect any of the chemical substance applicators that are included in the trash being directed to the waste facility. When the reading mechanism 216e detects one of the chemical substance applicators, an alarm or other signal can be set off, providing a notice for an operator to retrieve the chemical substance applicator from trash. In this way, the system is controlling the movement of chemical substance applicators within the facility.

According to the system described above, the reading mechanisms 216 can detect the presence of the chemical substance applicators. The reading mechanisms can also be configured to distinguish between different kinds of chemical substance applicators, and this can be used to control the movement of the chemical substance applicators within the facility. If there is a particular substance in some of the chemical substance applicators that must be prevented from entering a specific portion of the factory 212, then the system can beneficially control the movement of the chemical substance applicators. For example, if certain substances contained in some of the chemical substance applicators are required to be kept out of a zone 226 of the factory 212, then the reading mechanism 216c can be used to prevent the introduction of such chemical substance applicators into the zone 226.

Figure 10:
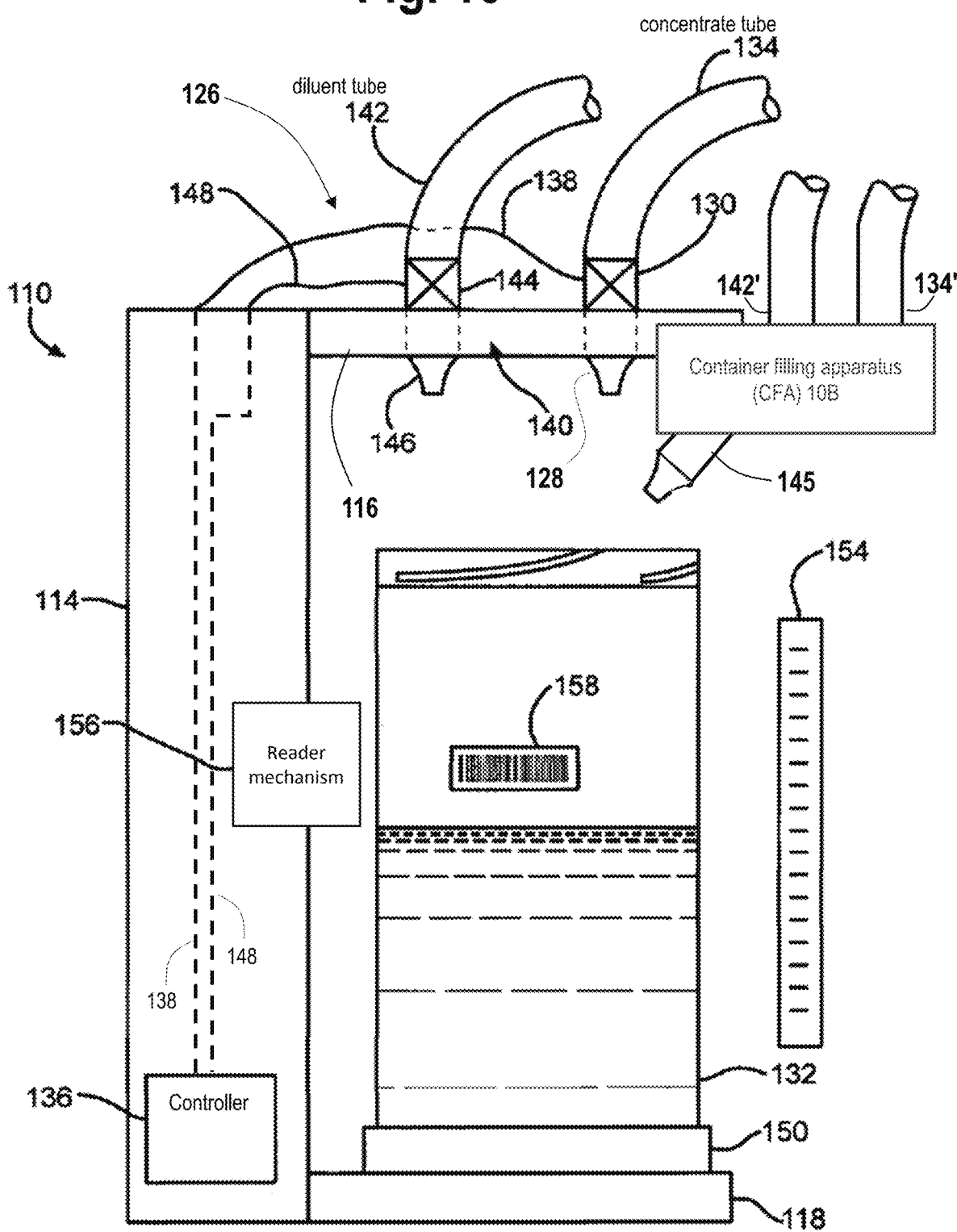
FIG. 10 is a schematic diagram of a container filling apparatus for topping off receiving containers, in accordance with principles of the disclosed subject matter.

In another aspect of the dispensing apparatus, shown in FIG. 10, there is provided a container filling system or apparatus 110 for topping off receiving containers 132 that are partially filled with an initial amount of a previously formulated solution of a concentrate and a diluent. It can be seen that the receiving container 132 is initially partially filled. The apparatus 110 includes a housing 114 having an upper section 116 and a base 118. The upper section 116 includes a dispenser 126 for discharging additional concentrate into the receiving container 132. The dispenser 126 includes a nozzle 128 and a valve 130. The concentrate dispenser 126 is connected to a source of concentrate, not shown, by means of a concentrate tube 134. Operation of the valve 130 opens the valve to discharge additional concentrate into the initially partially filled receiving container 132.

The housing 114 of the apparatus 110 includes a controller 136 configured to operate the apparatus 110. The controller 136 can be connected to the source of the concentrate by means of the concentrate dispenser 126. More specifically, the controller 136 can be connected to the concentrate dispenser 126 by hard wire 138. Other types of connections, such as wireless connections, could also be used. The controller 136 is programmed to determine the amount of the solution initially in the partially filled receiving container 132, and to discharge concentrate into the receiving container 132 in an amount sufficient to provide a desired concentration of solution for a full receiving container of the solution.

In a specific embodiment of the invention, the apparatus 110 includes an optional diluent supply mechanism 140. The diluent supply mechanism 140 is connected to a source of the diluent via diluent tube 142, and is configured to deliver diluent to the receiving container 132. Operation of a valve 144 opens the valve to discharge diluent via a nozzle 146 into the initially partially filled receiving container 132. The controller 136 is connected to the diluent supply mechanism 140 by any suitable means, such as hard wire 148. The controller 136 is programmed to discharge diluent via the diluent supply mechanism 140 into the receiving container 132 in an amount sufficient to substantially fill the receiving container. The determination of when the receiving container 132 becomes substantially full can be made by a level sensor, not shown, or by visual inspection, or by any other suitable means.

The diluent supply mechanism 140 is optional in that it is possible for the diluent to be added by hand from any source of diluent, and not added by means of the apparatus 110 for topping off receiving containers. Also, optionally, the valve 144 can be operated manually.

In one embodiment, the controller 136 is programmed to first substantially fill the initially partially full receiving container 132 with diluent, and then discharge concentrate into the receiving container to provide the desired concentration for the solution in the receiving container 132. The diluent can be added by having an operator open valve 144 until the receiving container is substantially full. Alternatively, the system can be provided with an automatic diluent filling mechanism, that fills the bottle with diluent in the amount sufficient to substantially fill the bottle.

In order for the controller to signal the concentrate dispenser 126 to discharge the proper amount of concentrate, the apparatus must be able to determine how much of the solution is initially in the receiving container 132 prior to topping off. Several methods can be used to determine the amount of the solution initially in the partially filled receiving container 132. One method is to measure the amount of diluent required to be added to the initially partially full receiving container 132 to substantially fill the receiving container with diluent. This measurement can be by volume or by weight. The actual measurement of the amount of diluent added to the partially filled receiving container 132 by volume can be made by the flow valve 144, which can be configured to measure flow, or by any other suitable flow measuring device.

The actual measurement of the amount of diluent added to the partially filled receiving container 132 by weight can be made by using a weight sensor, such as the scale 150 on base 118. The scale 150 is connected to the controller 136 and the controller can determine the amount of diluent added, i.e., the weight of the added diluent, by comparing the weight of the receiving container 132 before and after the delivery of the additional diluent to the receiving container. While the controller can be programmed to first discharge diluent into the receiving container to substantially fill the receiving container 132, and then discharge concentrate into the receiving container to provide the desired concentration, the order can be reversed, with the controller programmed to first discharge concentrate into the receiving container to provide the desired concentration, and then substantially fill the initially partially full receiving container with diluent.

The apparatus 110 can be provided with a level sensor, shown schematically at 154, to sense or determine the level of the solution in the initially partially filled receiving container 132. The level sensor can be any suitable level sensor, several of which are known in the art. The controller 136 can be programmed to determine the amount of solution initially in the partially filled receiving container by means of the level sensor 154, and use this level of the solution in the partially filled receiving container 132 to determine the amount of concentrate necessary to achieve the desired concentration of the solution in the ultimately full receiving container. The container filling apparatus 110 can be provided with a reading mechanism, such as an RF receiver indicated at 156, capable of reading data from a data indicator, such as RF chip 158, on the receiving container. The data indicator (RF chip) identifies data about the receiving container, and more particularly can identify the size of the container. The controller 136 can use this data as one factor in calculating the amount of concentrate necessary to discharge into the receiving container 132 to provide the desired concentration of solution in the receiving container when it gets filled up or topped off. Any suitable reading mechanism and any suitable data indicator can be used.

It is to be understood that the concentrate can be a particulate solid, such as a powder, or a liquid, such as a chemical concentrate. For example, the concentrate can be a concentrated cleaning detergent. The apparatus 110 can be used in combination with one or more receiving containers to reliably and repeatedly top off the receiving containers, such as, for example, spray bottles of cleaning solution. It is to be understood that the apparatus 110 can be configured to mix diluent with the concentrate, and to discharge this mixture into the receiving container 132, rather than discharging the concentrate and diluent separately into the receiving container 132. More specifically, the apparatus 110 can include a container filling apparatus (CFA) 10B that mixes additive with water, in a controlled manner using pulse processing as described herein, so as to generate a product. The product can be dispensed into the receiving container 132, as shown in FIG. 10, via a nozzle 145. The CFA 110B can be connected to a source of diluent (e.g. water) by a water tube 142' and to a source of concentrate or additive by a concentrate tube 134'. The CFA 10B can be similar in structure to the arrangement of FIG. 1, for example, except in the arrangement of FIG. 10, the concentrate can be supplied via tube 134', rather than the concentrate being stowed in the container filling apparatus 10B. That is, for example, the concentrate could be supplied from a central location or from a common location that is shared with other CFAs 10B.

In a specific embodiment, the controller can be programmed to discharge, in response to the amount of diluent discharged from the diluent supply mechanism, concentrate into the receiving container in an amount sufficient to provide a desired concentration of solution for a full receiving container of the solution. Further, the controller can be further programmed to close the valve when a condition of an overflowing receiving container is sensed. The sensing of an overflow condition can be detected in any suitable manner, such as by means of a weight sensor configured to determine the amount of liquid in the receiving container, or by means of a volume sensor configured to determine the amount of liquid in the receiving container.

Figure 11:
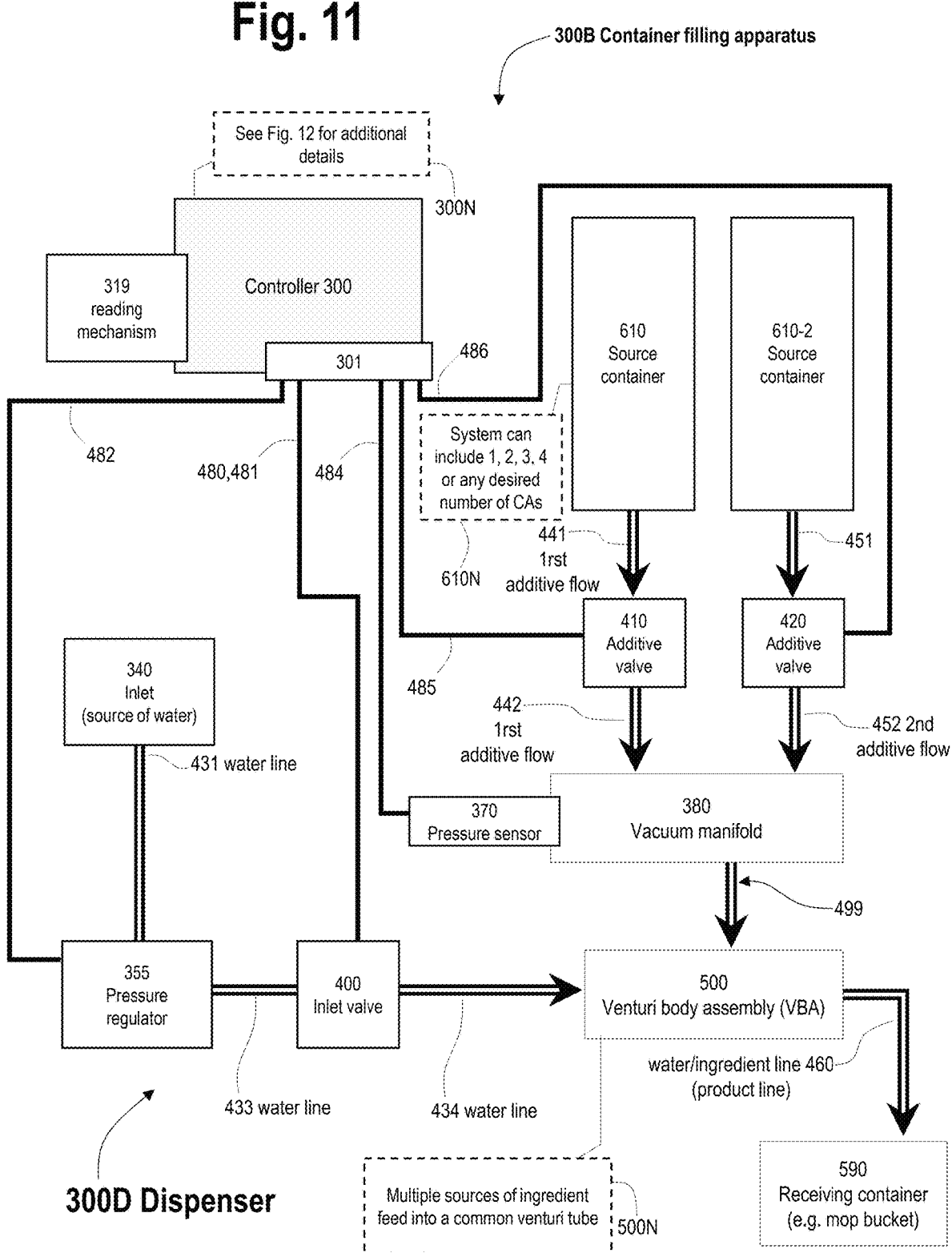
FIG. 11 is a schematic diagram of a container filling apparatus in a dispensing system, in accordance with principles of the disclosed subject matter.

FIG. 11 is a schematic diagram of a container filling apparatus (CFA) 300B, in a dispensing system 300A, in accordance with principles of the disclosed subject matter. The CFA 300B can be similar in arrangement to the container filling apparatus 10B' of FIG. 1, for example.

In a manner similar to the container filling apparatus 10B', the CFA 300B can combine a base ingredient, such as water, with an additive, such as a cleaning concentrate. The dispensing system 300A can include a receiving container 590. The dispensing system 300A can also include other components such as a user device, a central database to aggregate or collect data, various data resources, and other components as described below.

The container filling apparatus 300B, i.e. a dispensing apparatus, can include a dispenser 300D, a controller 300 that controls the dispenser 300D, and one or more source containers 610, 610-2. The controller 300 can control the dispenser 300D to mix water (or other base ingredient) to an additive in a source container 610 so as to generate a product. The product can be output to the receiving container 590. As described in detail below, the dispenser 300D can include a Venturi body assembly (VBA) 500. The VBA 500 can be used to combine water with the additive from the source container 610. The dispenser 300D can include a container engagement assembly that engages or mates with the source container 610, as described in detail below. The VBA 500 can also be described as including a "tee pipe".

The dispenser 300D can also include an attachment adapter that engages or mates with the container engagement assembly. That is, the attachment adapter can serve to attach the container engagement assembly to a solenoid valve, i.e. an additive valve 410, as shown in FIG. 11. The container engagement assembly can include an attachment collar and a connection assembly that is attached to the source container 610. The source container 610 and the container engagement assembly can be collectively described as a container assembly. Details of such container assembly, are described in detail below.

As shown in FIG. 11, a solenoid valve or additive valve 410 controls flow of additive out of the source container 610. That is, when the additive valve 410 is open, additive can flow out of the source container 610, through an attachment adaptor, and into a vacuum manifold 380 (as illustrated by additive flows 441 and 442). The additive can subsequently flow into a Venturi body assembly (VBA) 500 as illustrated by additive flow 499. Accordingly, when the additive valve 18' is open, additive flows through the vacuum manifold 380 and into the VBA 500 so as to be mixed with water or other base ingredient.

Source container 610-2, can contain a different additive from source container 610. As shown in FIG. 11, an additive valve 451 controls flow of additive out of the source container 610-2. That is, when the additive valve 420 is open, additive can flow out of the source container 610-2, through an attachment adaptor, and into a vacuum manifold 380 (as illustrated by additive flows 451 and 452). The additive can subsequently flow into a Venturi body assembly (VBA) 500 as illustrated by additive flow 499. Accordingly, as noted at 500N, multiple sources of ingredient can feed into a common venturi tube.

With further reference to FIG. 11, as additive flows to the vacuum manifold 380 and into the VBA 500, pressure of the flow in the vacuum manifold 380 can be measured. Such measurement can be performed by a pressure sensor 370. The pressure sensor 370 can send pressure data back to the controller 300. As described in detail below, the pressure data can be used to monitor and control the flow of additive and subsequent mixing of the additive with water. The controller can control the flow of water and additive. Additive can be injected into a water flow using pulse processing, with modulation of the pulses based on integration of a pressure curve observed in prior pulses. After the additive is mixed with water in the VBA 500, the mixture, i.e. product, can be output via a product line 460. The product can flow into a suitable receiving container 590. The receiving container 590 can be a mop bucket, spray container, or other container as desired.

As shown in FIG. 11, water can be provided from an inlet 340. Flow of water into the VBA 500 can be controlled by an inlet or water valve 400. The water valve 400, as well as other valves described herein, can be a solenoid valve or any other suitable valve. A pressure regulator 355 can be included in the water flow line. Accordingly, the water line 431 can connect the pressure regulator 355 to the inlet or source of water 340. Water line 433 can provide flow of water from the pressure regulator 355 to the water valve 400. A further water line 434 can provide flow of water from the water valve 400 into the VBA 500. The pressure regulator 355 could be positioned downstream of the water valve 400, rather than upstream as shown in FIG. 11. The pressure regulator can provide a constant pressure of water into the VBA 500. For example, the pressure regulator 355 might provide 30 psi (pounds per inch) of pressure in water flowing into the VBA 500. Such constant water pressure can thus be a constant, rather than a variable, to assist in processing of pressure data (from the pressure sensor 370) by the controller 300. A quick disconnect valve or disconnect valve can be provided in any of the fluid lines as described herein.

The various components of the dispensing system 300A and the container filling apparatus 300B can be connected via suitable communication lines 480, including communication lines 481, 482, 484, 485 and 486, as shown in FIG. 11. The communication lines 480 can carry control signals, data signals, and/or any other data as desired. In particular, the controller 300 can be connected via communication lines 485, 484, 481 to the additive valve 410, the pressure sensor 370, the water valve 400, and also connected to reading mechanism 319. As described herein, the reading mechanism 319 can input data, which can be communicated to the controller 300, regarding if a dispensing event is authorized. As noted at 300N, further details of the controller are described below with reference to FIG. 12.

In accordance with principles of the disclosed subject matter, architecture of a dispensing system can be provided as follows. A dispensing system can include a container filling apparatus, a user device, a central processor/central database to aggregate (i.e. collect) data, various data resources, and a receiving container that is to be filled with product, for example. The container filling apparatus (i.e. dispensing apparatus) can include (1) a dispenser, (2) a controller (processor(s)+database(s)) that controls the dispenser; and (3) one or more source containers, such as for example four (4) source containers. The dispenser can include a container engagement assembly that engages or mates with the source container, as well as an attachment adaptor that engages or mates with the container engagement assembly. The source container and container engagement assembly can collectively provide a container assembly, i.e. an "additive cartridge" or cartridge". The controller of the container filling apparatus can push data to the central database for data aggregation. A dispensing station or station can include one or multiple container filling apparatuses.

Figure 12:
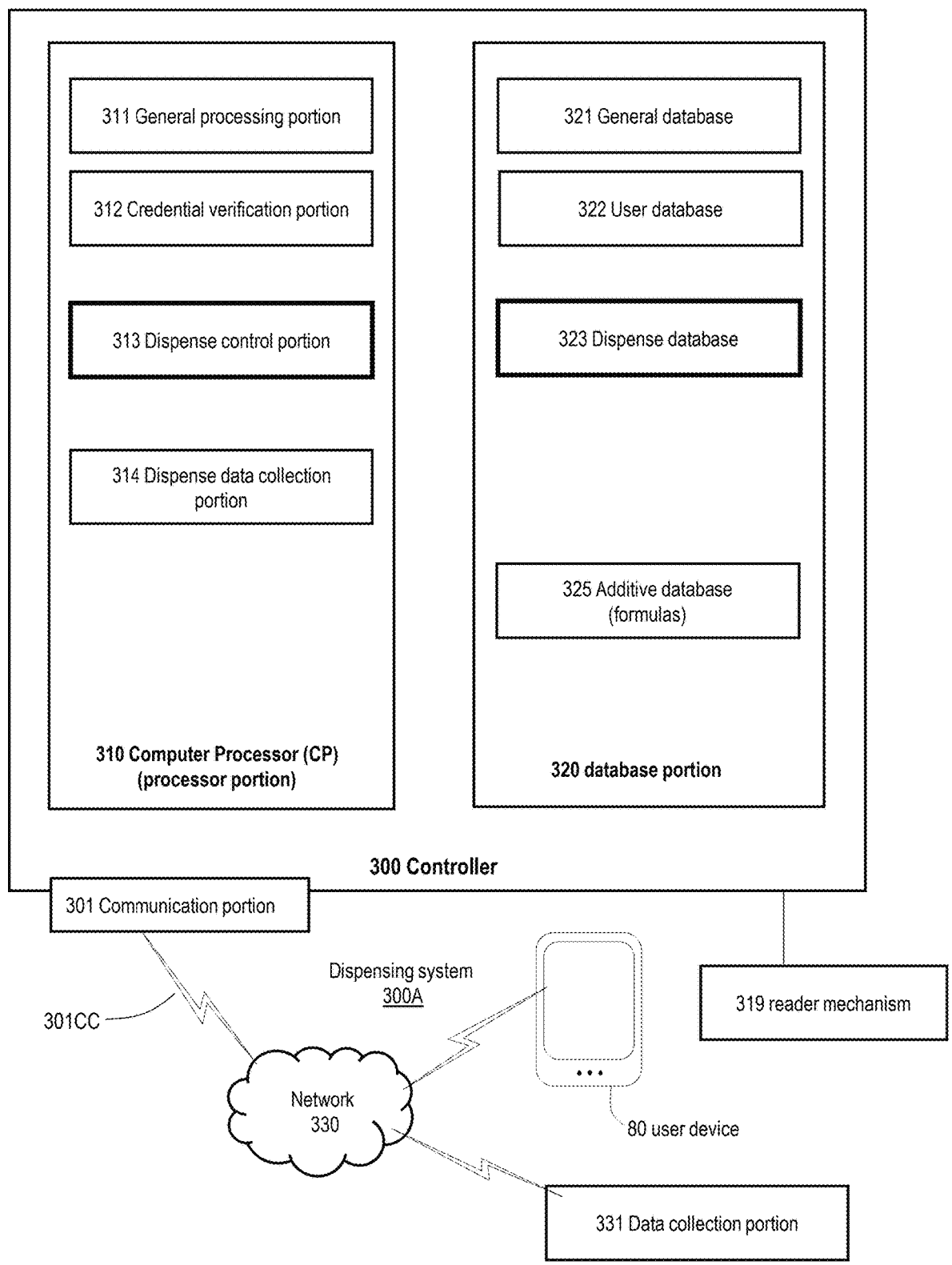
FIG. 12 is a block diagram of the dispensing system showing further details of the controller 300, in accordance with principles of the disclosed subject matter.

FIG. 12 is a block diagram of the dispensing system 300A showing, in particular, further details of the controller 300. As shown in FIG. 12, the controller 300 can include a computer processor (CP) 310 and a database portion 320. The CP 310 can include a variety of computer processing portions as illustrated. Additionally, the database portion 320 can include a variety of database portions as illustrated.

The CP 310 can include a general processing portion 311. The general processing portion 311 can perform various general processing so as to perform general operations of the dispensing system 300. The general processing portion 311 can perform processing based on instructions contained in the general database portion 320. The general processing portion 311 can perform any of the processing required or desired (so as to provide functionality of the controller 300) that is not handled by the more specialized processing portions 312-314. However, it should be appreciated that the processing performed by the general processing portion 311 can be specialized in and of itself so as to provide the various functionality described in this disclosure. The CP 310 can also include a credential verification portion 312. The portion 312 can perform various processing related to verifying the credentials of a user using the dispensing system. For example, if the user requests a dispense of a particular substance, then the portion 312 can perform processing to determine if the user is authorized to perform such dispense. The portion 312 can use data associated with a user such as data from the personal identification indicator 46 shown in FIG. 5. Such data can be input through one or more reading mechanisms 319, which can be electronically in communication with the controller 300.

The CP 310 can also include a dispense control portion 313. The portion 313 can control overall operations of the CFA 300B including whether a dispense is authorized based on various input data. Such input data can include data from the data indicator of a source container, data indicator of a receiving container, data received from the credential verification portion 312 as to whether a user is authorized to dispense a particular additive/product, and other data, for example. The dispense control portion 313 can receive input from a user regarding what product is requested. Based on that input, portion 313 can then map to a formula upon which the CFA 300B then uses to generate the requested product. The portion 313 can present product options to a user based on the credentials of a user, as processed by the credential verification portion 312. For example, the portion 313 can only present certain "lit" buttons based on the particular user interfacing with the system. The portion 313 can also perform "pulse processing" related to operation of the Venturi body assembly "VBA" 500, as described in detail below. For example, the portion 313 can perform pulse modulation based on feedback from the pressure sensor 370, during a dispense event. Various other processing performed by the portion 313 are described below.

The CP 310 can also include a dispense data collection portion 314. The portion 313 can collect data regarding a dispense event either during the dispense event or after the dispense event. For example, the portion 313 can collect data stored in RAM (random access memory) by the dispense control portion 313. The portion 314 can store and aggregate collected data. The portion 314 can output the data to a central data collection processor or server, such as data collection portion 331 shown in FIG. 12. Such data can then be aggregated with other data to capture dispense data across a work floor, a facility, and/or a company, for example. The portion 314 can segregate and aggregate collected data in predetermined manners.

The controller 300 can include the database portion 320. The database portion 320 can include a general database 321. The general database 321 can include various data used by and/or generated by the general processing portion 311.

The database portion 320 can include a user database 322. The user database 322 can include data regarding users who are authorized to use a dispensing apparatus. The database 322 can store data generated by or used by the credential verification portion 312. The database 322 can record usage of the dispense system by a user.

The database portion 320 can also include a dispense database 323. The dispense database 323 can store various data used by and/or generated by the dispense control portion 313. For example, the dispense database 323 can store operational data retrieved for operation of a requested dispense event. The database 323 can also store data accumulated over the course of a dispense event. The operational data can be compared to the accumulated data, i.e. the feedback from the pressure sensor 370, for example. Adjustment or modulation of the dispense event can then be performed by the dispense control portion, based on such feedback data. Further details are described below.

The database portion 320 can also include an additive database 325. The additive database 325 can store various data regarding the various additives or concentrates utilized by the CFA 300B. The database 325 can include formula information that is used by the dispense control portion 313 to generate a requested product, for a user. The formula information can include ratio or percentage information for the generation of a product based on additive in water. For example, formula information can include parts per concentrate and parts per water. The dispense control portion 313 can then execute on such formula data using Venturi processing, including pulse modulation, as described herein.

Accordingly, the controller 300 can be in the form of or include one or more computer processors and one or more database portions. The controller 300 can include or be in the form of a server. The controller 300, processors of the controller, and databases of the controller can be provided in one physical location and/or distributed over multiple physical locations. Various further details of the controller 300 and the processing performed thereby are described below. As illustrated in FIG. 12, the controller 300 can also include a communication portion 301. The communication portion 301 can provide communication to various electronic components as shown in FIG. 11 and FIG. 12. Dispensing system 300A can include or utilize a network 330 as shown in FIG. 12. The network 330 can connect the controller 300 with the various components illustrated in FIG. 11 and FIG. 12 utilizing respective communication channels 301CC.

Figure 13:
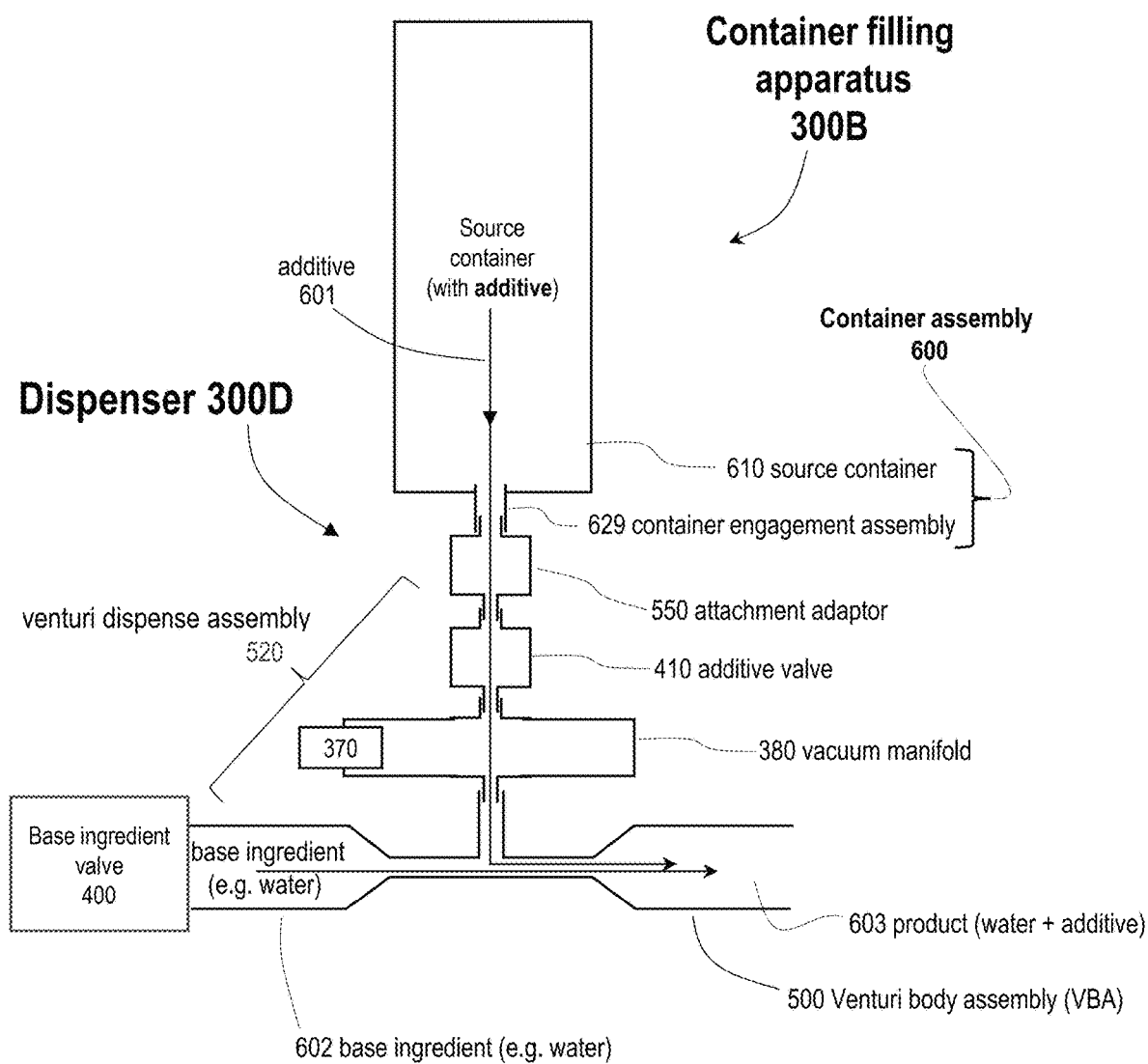
FIG. 13 is a schematic diagram showing a container filling apparatus, in accordance with principles of the disclosed subject matter.

FIG. 13 is a schematic diagram showing a CFA 300B, in accordance with the disclosure. In particular, the schematic diagram of FIG. 13 shows the various parts of a CFA 300B, in accordance with one embodiment. Various physical manifestations of the arrangement shown in the schematic diagram of FIG. 13 are illustrated in various figures of the application, including FIG. 25, for example. The CFA 300B can include a source container 610 that contains additive 601. The source container 610 can be attached to a container engagement assembly 629. The source container 610 and container engagement assembly 629 can collectively be described as a container assembly 600. Relatedly, the container engagement assembly 629 can include a connection assembly 640 and an attachment collar 630 that serves to secure the connection assembly 640 onto the source container 610.

The CFA 300B can include an attachment adapter 550. The attachment adapter 550 can be provided to attach the container assembly 600 to an additive valve 410. The additive valve 410 can be turned on or off to allow or not allow additive to flow into the vacuum manifold 380. The vacuum manifold 380 can be provided with one or more pressure sensors 370, which can sense pressure in the vacuum manifold 380 as the additive passes through the vacuum manifold 380. In turn, the vacuum manifold 380 can be attached to a Venturi body assembly (VBA) 500. The VBA 500 is described in detail below. A base ingredient 602, such as water, passes into the VBA 500 by the controller 300 opening base ingredient valve 400. As result of such flow, by construct of the VBA 500, additive is sucked into the VBA 500 from the vacuum manifold 380. The additive is thus mixed with the water in a predetermined and controlled manner using pulsing or pulse processing of the additive valve 410. The pulse processing can be adjusted based on feedback from the pressure sensor 370. As a result, product 603, i.e. water plus additive, is generated. Such product can be output to a receiving container as described in detail herein. In accordance with one embodiment, the additive valve 410, vacuum manifold 380, and VBA 500 can be described as a Venturi dispense assembly 520. Also, in one embodiment, the components (excepting the source container 610) illustrated in FIG. 13 can be described as a dispenser 300D that dispenses additive from the source container 610.

Figure 14:
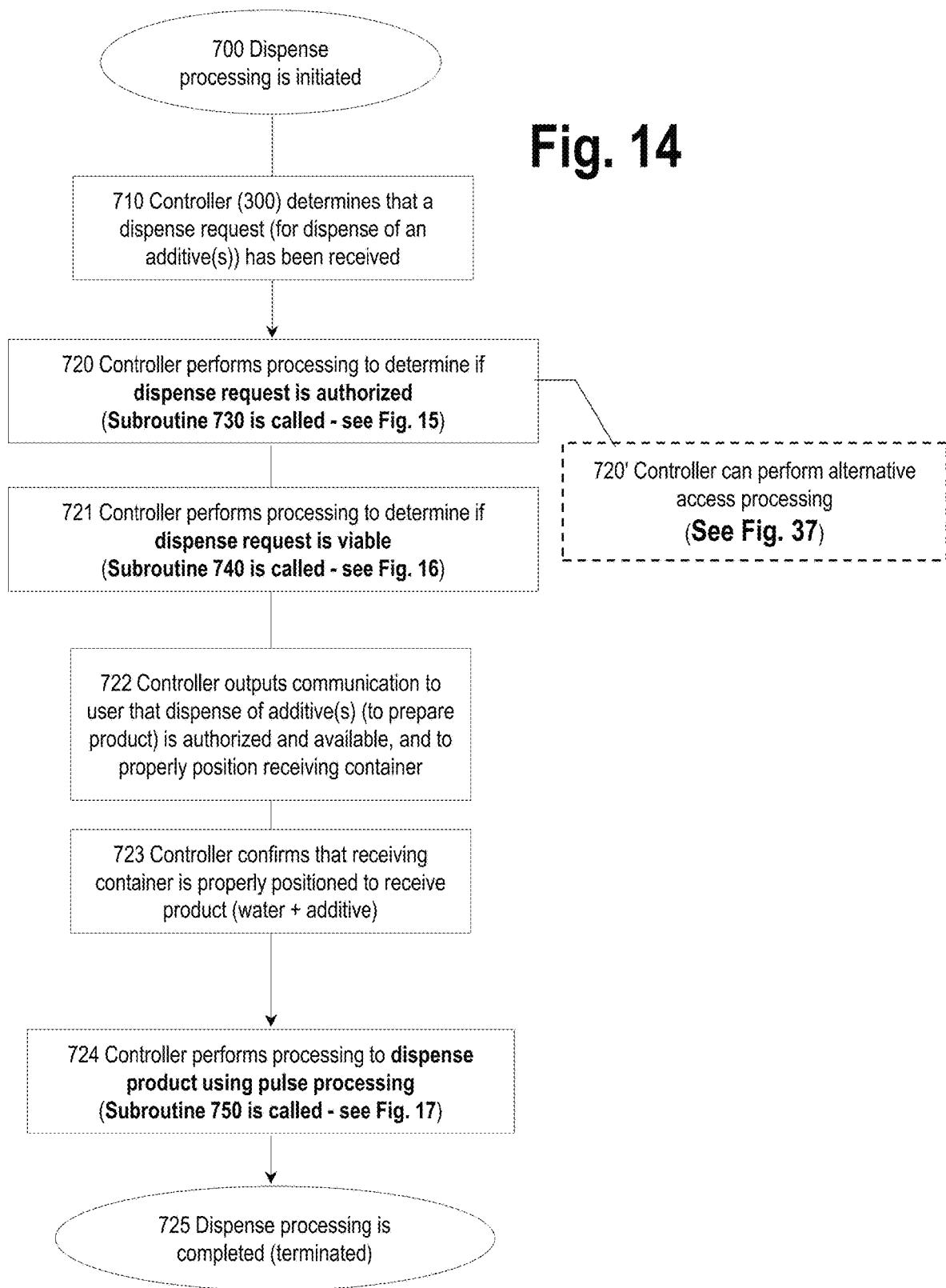
FIG. 14 is a high-level flowchart showing illustrative processing, in accordance with principles of the disclosed subject matter.
Figure 15:
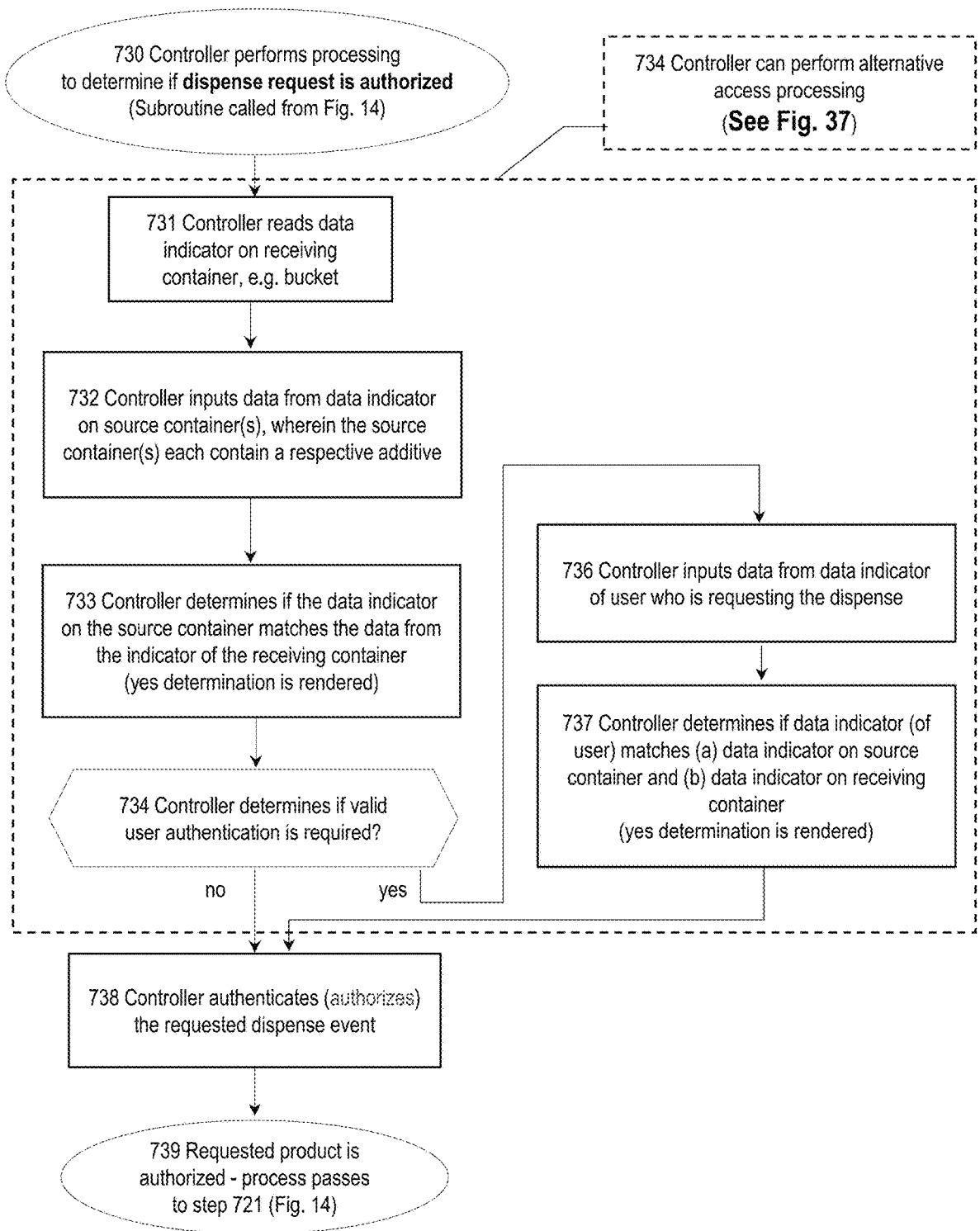
FIG. 15 is a flowchart showing in further detail the subroutine 730, controller performs processing to determine if a dispense request is authorized, as called from the processing of FIG. 14, in accordance with principles of the disclosed subject matter.
Figure 30:
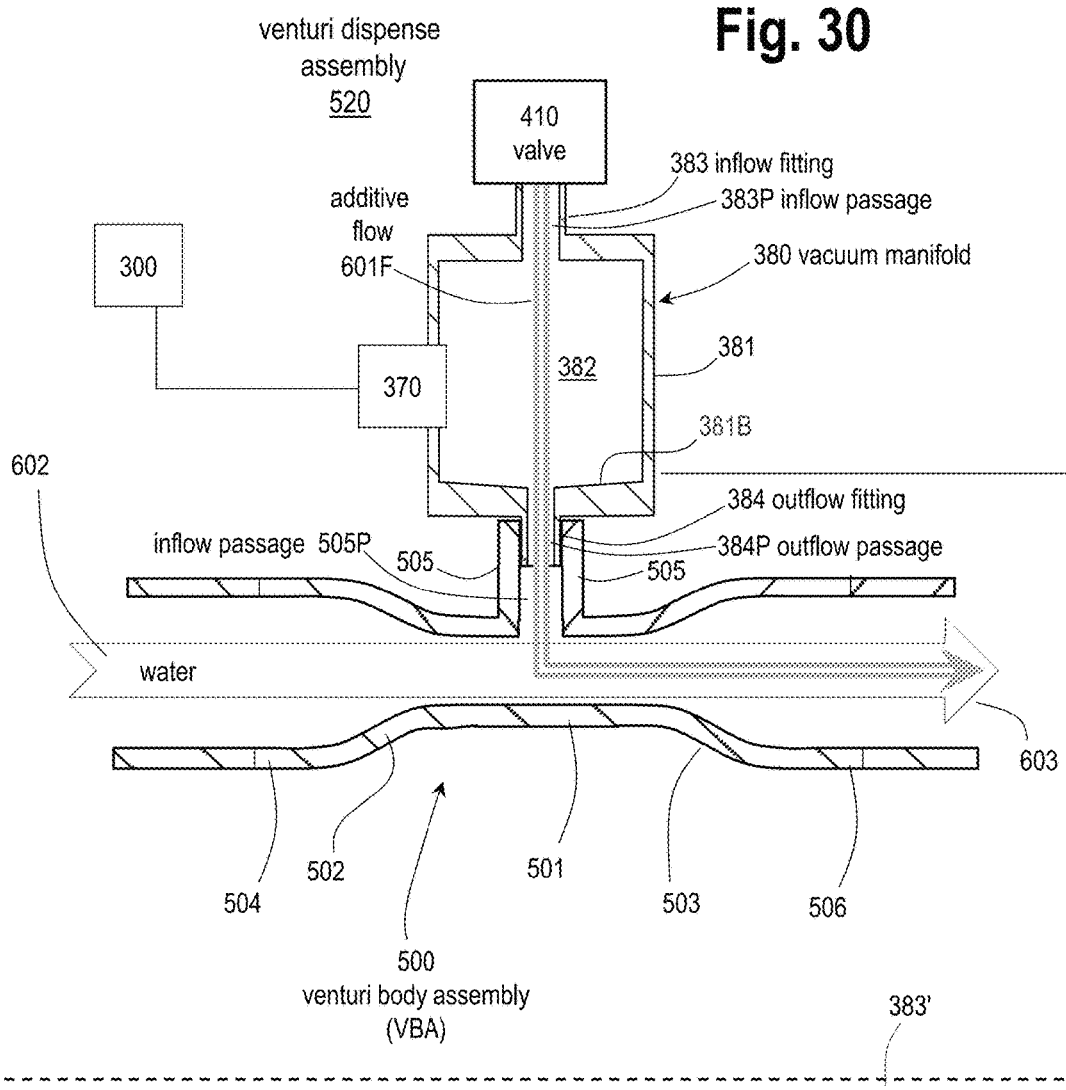
FIG. 30 is a cross-section view of a Venturi dispense assembly 520, as is schematically represented in FIG. 13, in accordance with principles of the disclosed subject matter.
Figure 36:
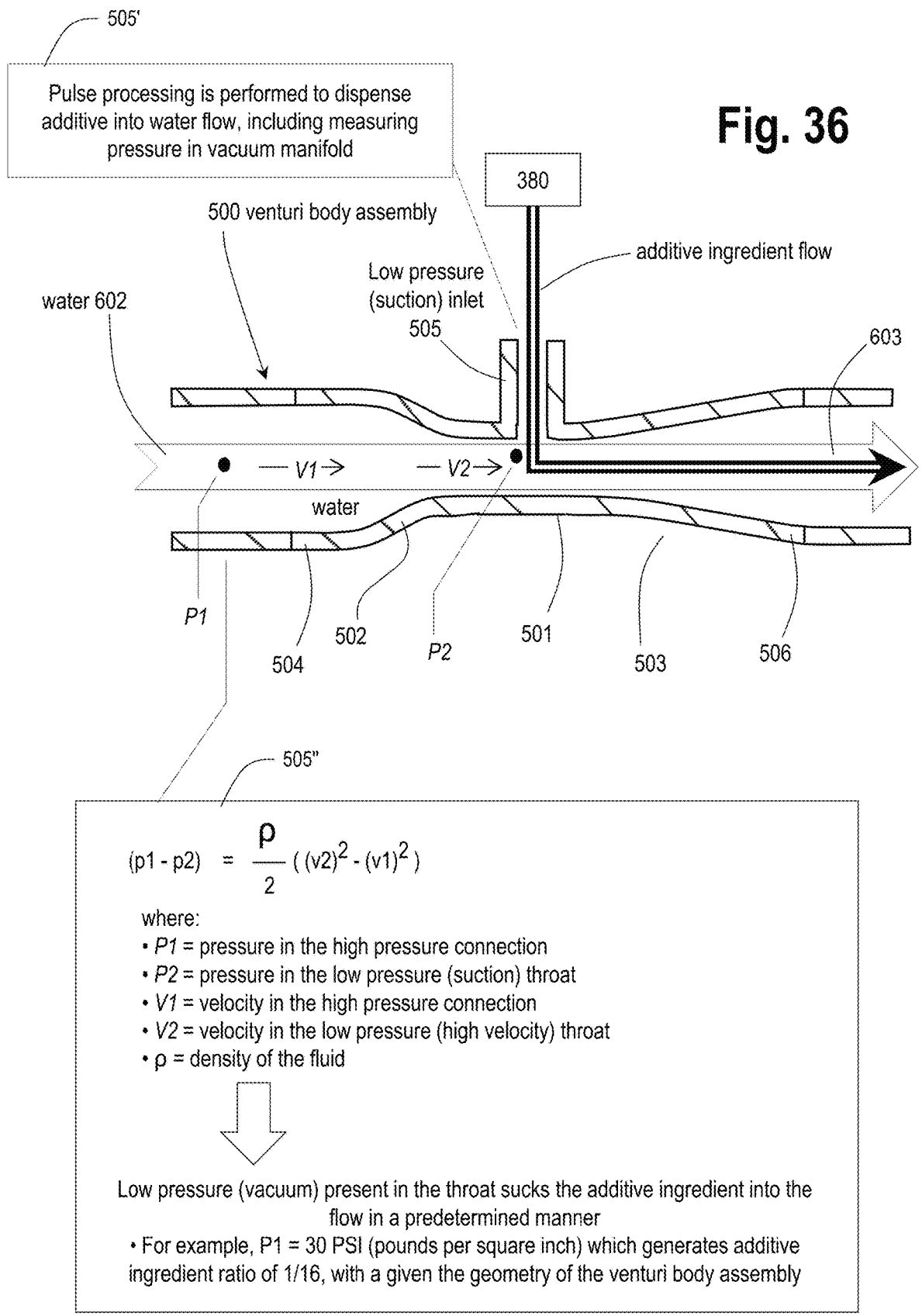
FIG. 36 is a cross-section view of a Venturi body assembly (VBA) 500, in accordance with principles of the disclosed subject matter.

FIG. 14 is a high-level flowchart showing illustrative processing in accordance with the disclosure. The processing of FIG. 14, and associated subroutines, can be performed by the dispense control portion 313, of FIG. 12, for example. The processing of FIG. 14 can be performed using the arrangement illustrated in FIG. 11. A VBA 500 can be used as illustrated in FIG. 30 and FIG. 36. The process starts in step 700 and passes onto step 710. In step 710, the controller determines that a dispense request (for dispense of an additive) has been received. Then, in step 720, the controller performs processing to determine if the dispense request is authorized. To perform such processing, subroutine 730 can be called as illustrated in FIG. 15. As noted at 720', the controller can also perform alternative access processing as described below with reference to FIG. 37. Then, the process passes onto step 721.

In step 721, the controller performs processing to determine if the dispense request is viable. For example, the controller can determine whether there is enough additive in a particular source container so as to perform the requested dispense event. To determine if the dispense request is viable, subroutine 740 can be called as described below with reference to FIG. 16. Then, in step 722, assuming that the dispense event is authorized and available, the controller outputs a communication to the user indicating such, and that the user should properly position a receiving container. If the dispense event is not authorized and available, then an alternative communication can be output to the user. In some embodiments, a sensor can be provided to confirm, to the controller, that the receiving container is properly position, as reflected in step 723. In other embodiments, the controller can simply request input from the user that the receiving container is properly positioned.

Then, in step 724, the controller performs processing to dispense the product using pulse processing of the disclosure. To perform such pulse processing, subroutine 750 can be performed as described below with reference to FIG. 17. Then, the process passes onto step 725. In step 725, the dispensing processing is completed or terminated.

FIG. 15 is a flowchart showing in further detail the subroutine 730, controller performs processing to determine if a dispense request is authorized, as called from the processing of FIG. 14. The subroutine is initiated and passes onto step 731. In step 731, the controller reads data from a data indicator on a receiving container, such as a bucket. Then, in step 732, the controller inputs data from a data indicator on a source container or multiple source containers. Each source container can contain a respective additive. Then, in step 733, the controller determines if the data indicator on the source container, or containers, "matches" the data from the indicator of the receiving container. As otherwise described herein, such matching can include a correspondence, association, satisfaction of rules, satisfaction of constraints and or some other satisfy criteria such that a yes determination is rendered to confirm a match. In this example, step 733 assumes that a match is determined, i.e. a yes value is rendered—and the process passes onto step 734. If a no value is rendered in step 733, a suitable communication can be output to the user.

In step 734, the controller determines if valid user authentication is required. That is, for some additives to be dispensed, the requesting user may need to be authorized. For other additives, it may be the case that no such authorization is required. If a no is rendered in step 734, then in step 738, the controller authenticates or authorizes the requested dispense event. On the other hand, if a yes is rendered in step 734, then the process passes onto step 736. In step 736, the controller inputs data from a data indicator of the user who is requesting the dispense event. Such data indicator of the user might be a electronic tag associated with the user, a magnetic card that is physically possessed and carried by the user, and/or data on the cell phone of the user that is communicated to the controller 300.

Then, in step 737, the controller determines if the data indicator (of the user) matches both the data indicator on the source container and the data indicator on the receiving container. Such can be varied based on the particular additive and/or the particular situation. For example, with some additives the data indicator of the user may only be required to match the data indicator of the source container. With other additives, the data indicator of the user may only be required to match the receiving container. Assuming a yes is rendered in step 737, the process passes onto step 738. Alternatively, if no in step 737, a suitable communication can be output to the user. As an alternative to the processing of step 731-737, as noted at 734, the controller can perform alternative access processing as described below with reference to FIG. 37.

In step 738, the controller authenticates or authorizes the requested dispense event. Then, in step 739, the requested product being authorized, the process passes back to the processing of FIG. 14, and to step 721.

Figure 16:
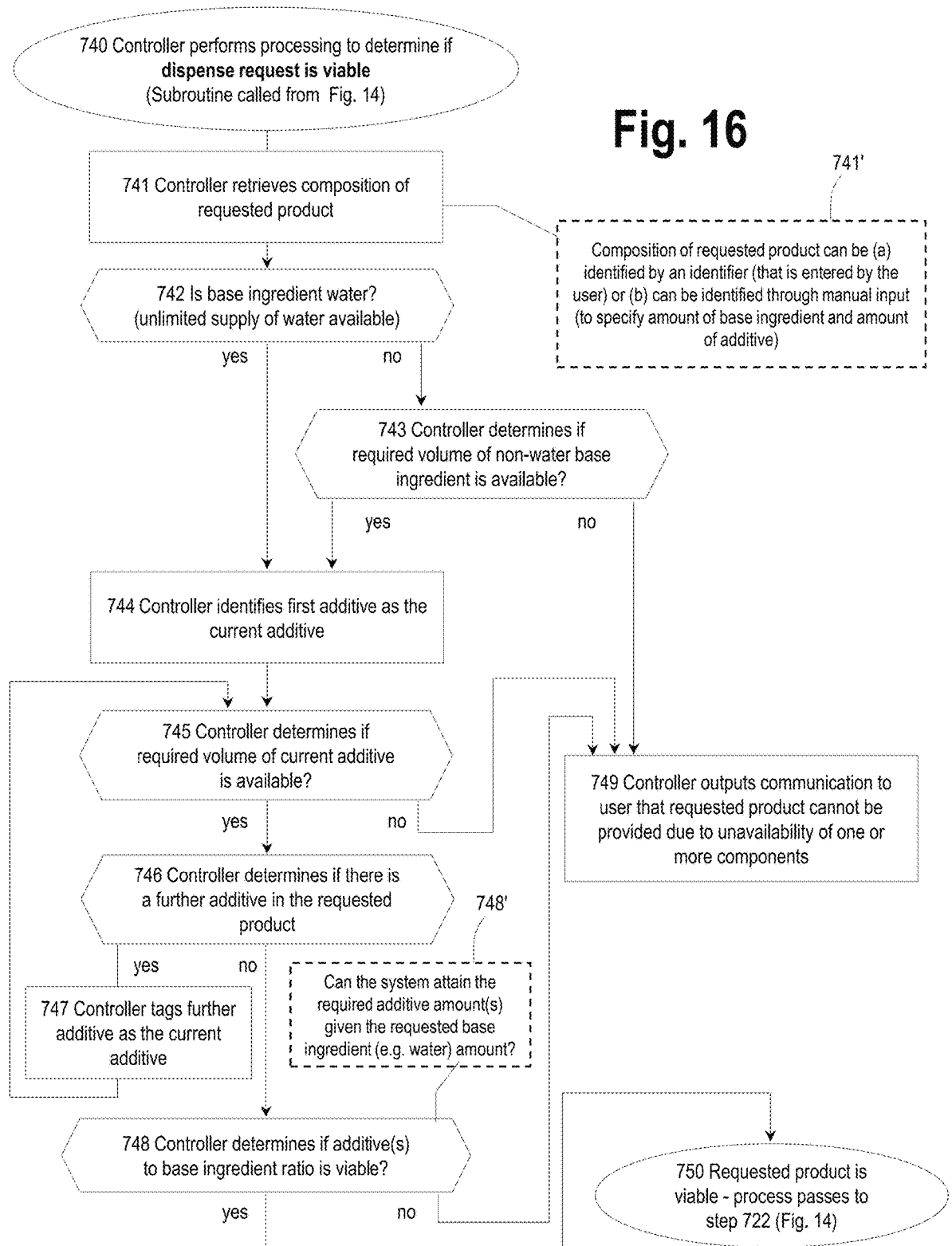
FIG. 16 is a flowchart showing in further detail the subroutine 740, controller performs processing to determine if a dispense request is viable, as called from the processing of FIG. 14, in accordance with principles of the disclosed subject matter.

FIG. 16 is a flowchart showing in further detail the subroutine 740, controller performs processing to determine if a dispense request is viable, as called from the processing of FIG. 14. In particular, such processing can relate to a determination if a sufficient amount of additive is available to support the requested dispense event. Relatedly, it is appreciated that the base ingredient, such as water, may be available in an unlimited quantity. The subroutine is initiated and passes onto step 741. In step 741, the controller retrieves the composition of the requested product. Such composition can be in the form of a formula that includes parts of additive(s) in parts of base ingredient, for example, such as a 1:30 ratio of parts. As noted at 741', composition of a requested product can be (a) identified by an identifier (that is entered by the user) or (b) can be identified through manual input (to specify amount of base ingredient and amount of additive). Also, the user might select an illuminated, labeled button, of a panel of buttons, that is mapped to a particular formula—that is then used for the dispense event.

After step 741, in step 740 to the controller determines if the base ingredient is water and if there is an unlimited supply of such water. If yes, the process passes onto step 744. If no in step 743, the controller determines if the required volume of non-water-based ingredient is available. If yes in step 743, the process passes onto step 744. If no in step 743, the process passes onto step 749. In step 749, the controller outputs a communication to the user that the requested product cannot be provided due to unavailability of one or more components.

With further reference to FIG. 16, after either of step 742 or 743, the process passes onto step 744. In step 744, the controller identifies the first additive, or only additive, in the selected formula as the current additive. Then, in step 745, the controller determines if the required volume of the current additive is available. If no, the process passes onto step 749—and a communication is output that the requested product cannot be provided. If yes in step 745, the process passes onto step 746. In step 746, the controller determines if there is a further additive in the requested product. If yes, then the process passes onto step 747. In step 747, the controller tags the further additive as the current additive. The process then passes onto step 745—and continues as described above, i.e. so as to determine if the required volume of the further additive is available.

If no in step 746, i.e. there is no further additive to assess whether there is sufficient volume, the process passes onto step 748. In step 748, the controller determines if the additive(s) to base ingredient ratio is viable. That is, as noted at 748', the controller can determine if the system can attain the required additive amount(s) given the requested base ingredient amount. For example, the processing of step 748 may include a determination by the controller of whether the requested formula, of the requested product, is able to physically be produced by the CFA 300B. In particular, such processing may be relevant in a situation where the user is provided the ability to manually enter a ratio of additive: base ingredient for a requested product. For products that are already programmed into the CFA 300B, and available, the formula for such available products may have been previously deemed viable. If no in step 748, the process passes onto step 749, with in "unavailable" communication output the user as described above.

Figure 17:
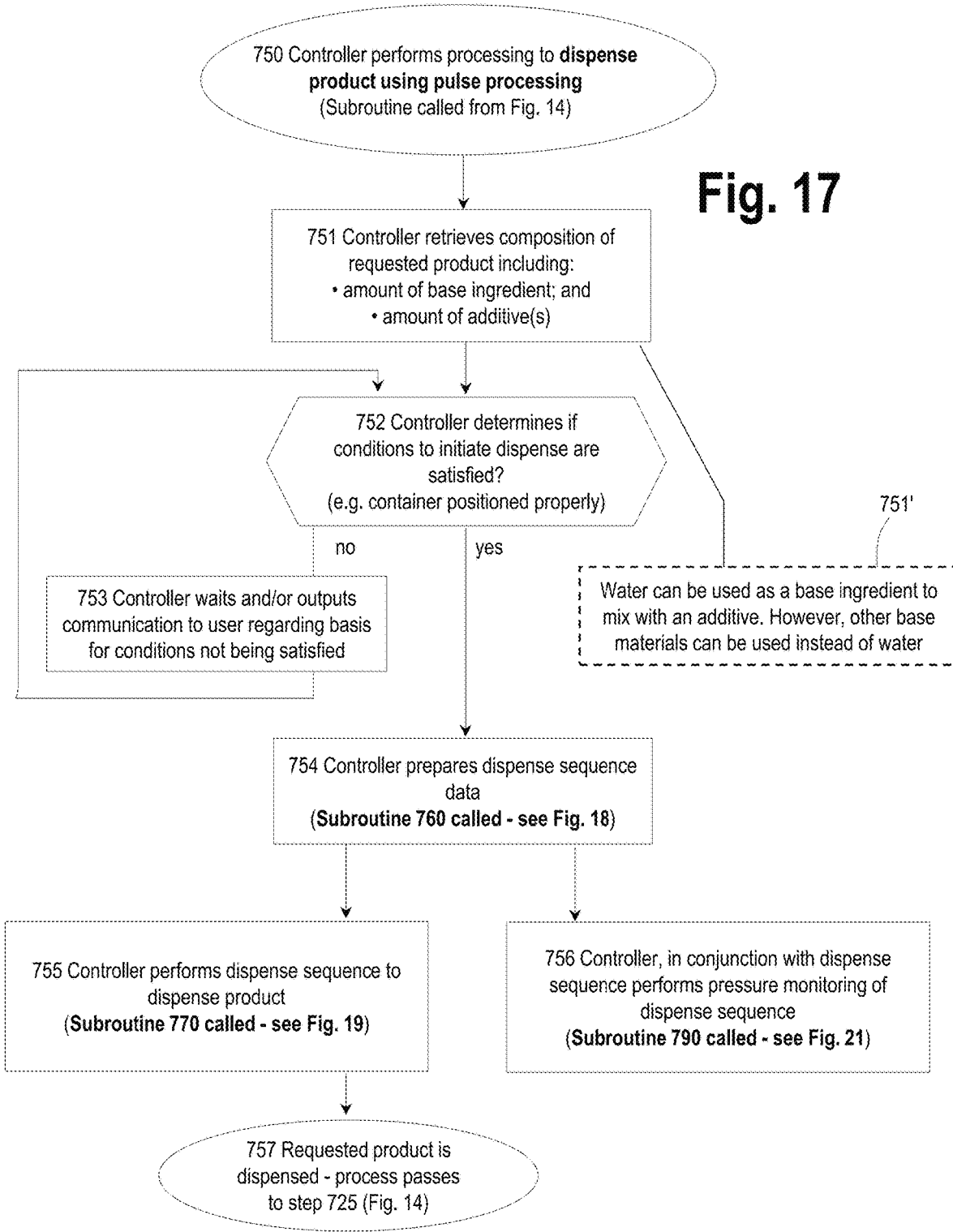
FIG. 17 is a flowchart showing in further detail subroutine 750, controller performs processing to dispense product using pulse processing, as called from the processing of FIG. 14, in accordance with principles of the disclosed subject matter.

If yes in step 748, the process passes onto step 750. In step 750, the requested product is deemed viable and the process passes back to FIG. 14, and specifically passes onto step 722 of FIG. 14. FIG. 17 is a flowchart showing in further detail subroutine 750, controller performs processing to dispense product using pulse processing, as called from the processing of FIG. 14. The subroutine is initiated in step 750 and passes onto step 751. In step 751, the controller retrieves the composition of the requested product including the amount of base ingredient in the amount of additive(s). The composition of the requested product may be in the form of a formula. As noted at 751', water or other base ingredient can be mixed with the additive. Then, the process passes onto step 752. In step 752, the controller determines if the conditions to initiate the dispense event are satisfied. For example, is the receiving container positioned properly. If no, then the process passes onto step 753. In step 753, the controller waits and/or outputs a communication to the user regarding basis for applicable conditions not being satisfied. Then the process returns to step 752 after the wait time has been exhausted, for example. If a yes is rendered in step 752, then the process passes onto step 754. In step 754, the controller prepares dispense sequence data. To perform such processing, subroutine 760 can be called or invoked, as described below with reference to FIG. 18. After step 754, the processing of step 755 in step 756 can be invoked. The processing of step 755, 756 can be run or performed in parallel to each other. In step 755, the controller performs a dispense sequence to dispense product. Subroutine 770 can be called as described below with reference to FIG. 19. In step 756, the controller, in conjunction with the dispense sequence being performed in subroutine 770, performs pressure monitoring of the dispense sequence. Such pressure monitoring can monitor the dispense event to confirm that observed pressure in the vacuum manifold 380 is within anticipated limits or within an anticipated window. To perform step 756, subroutine 790 can be called as described below with reference to FIG. 21.

The processing of step 756 can continue for the duration of the dispense sequence, i.e. the duration of the dispense event as performed in step 755 (subroutine 770). After step 755, the process passes onto step 757. In step 757, the requested product is dispensed. The process then passes back to FIG. 14, to step 725.

Figure 18:
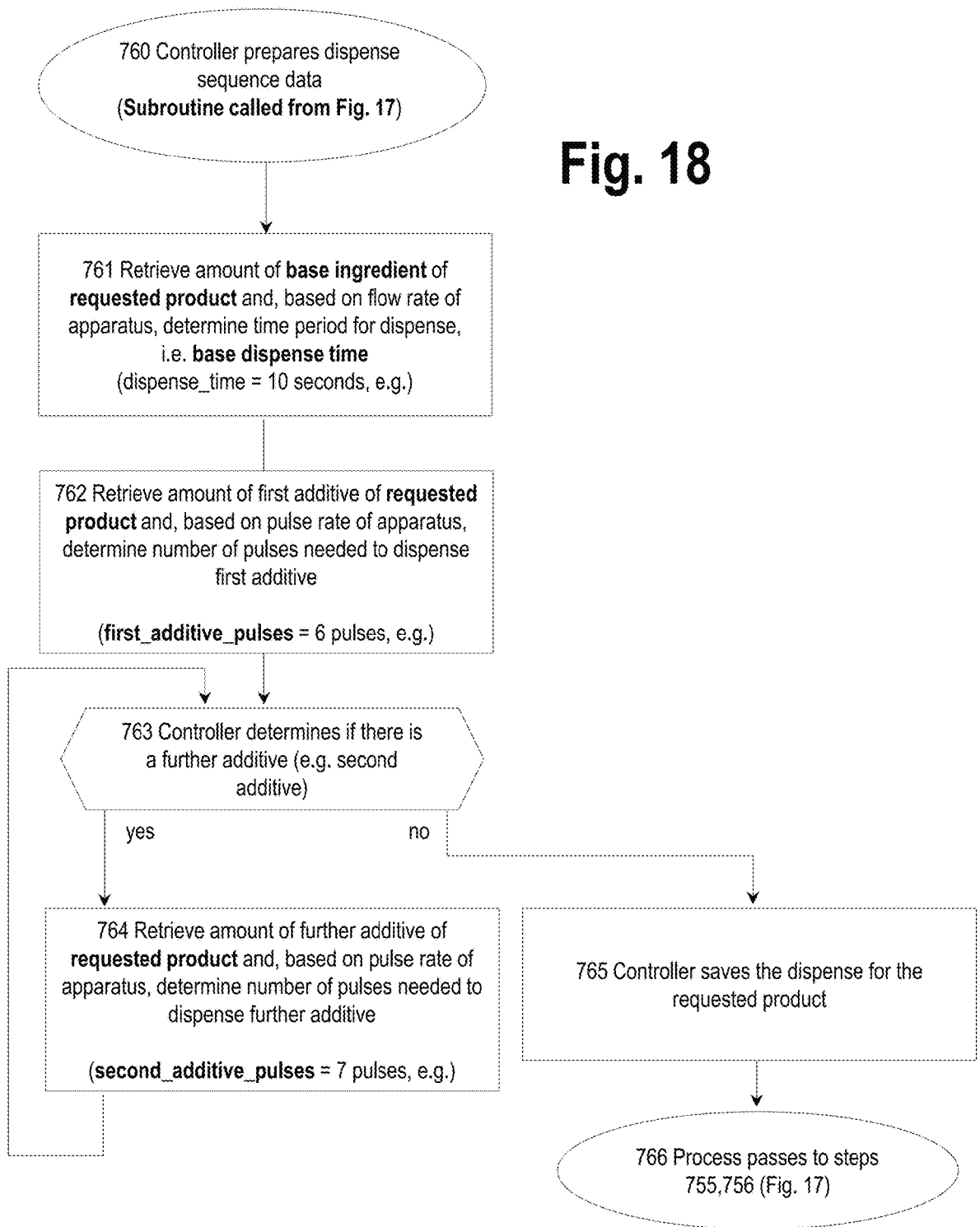
FIG. 18 is a flowchart showing in further detail subroutine 760, controller prepares dispense sequence data, as called from the processing of FIG. 17, in accordance with principles of the disclosed subject matter.

FIG. 18 is a flowchart showing in further detail subroutine 760, controller prepares dispense sequence data, as called from the processing of FIG. 17. As shown, the process is initiated in step 760 and passes onto step 761. In step 761, the controller retrieves the amount of base ingredient of requested product and, based on flow rate of apparatus, determines the time period for dispense, i.e. base dispense time. For example, dispense_time=10 seconds. Then, in step 762, the controller retrieves the amount of first additive of the requested product. The controller determines, based on the pulse rate of the system, the number of pulses needed to dispense the first additive. For example, first_additive_pulses=6 pulses. Then, the process passes onto step 763.

Figure 19:
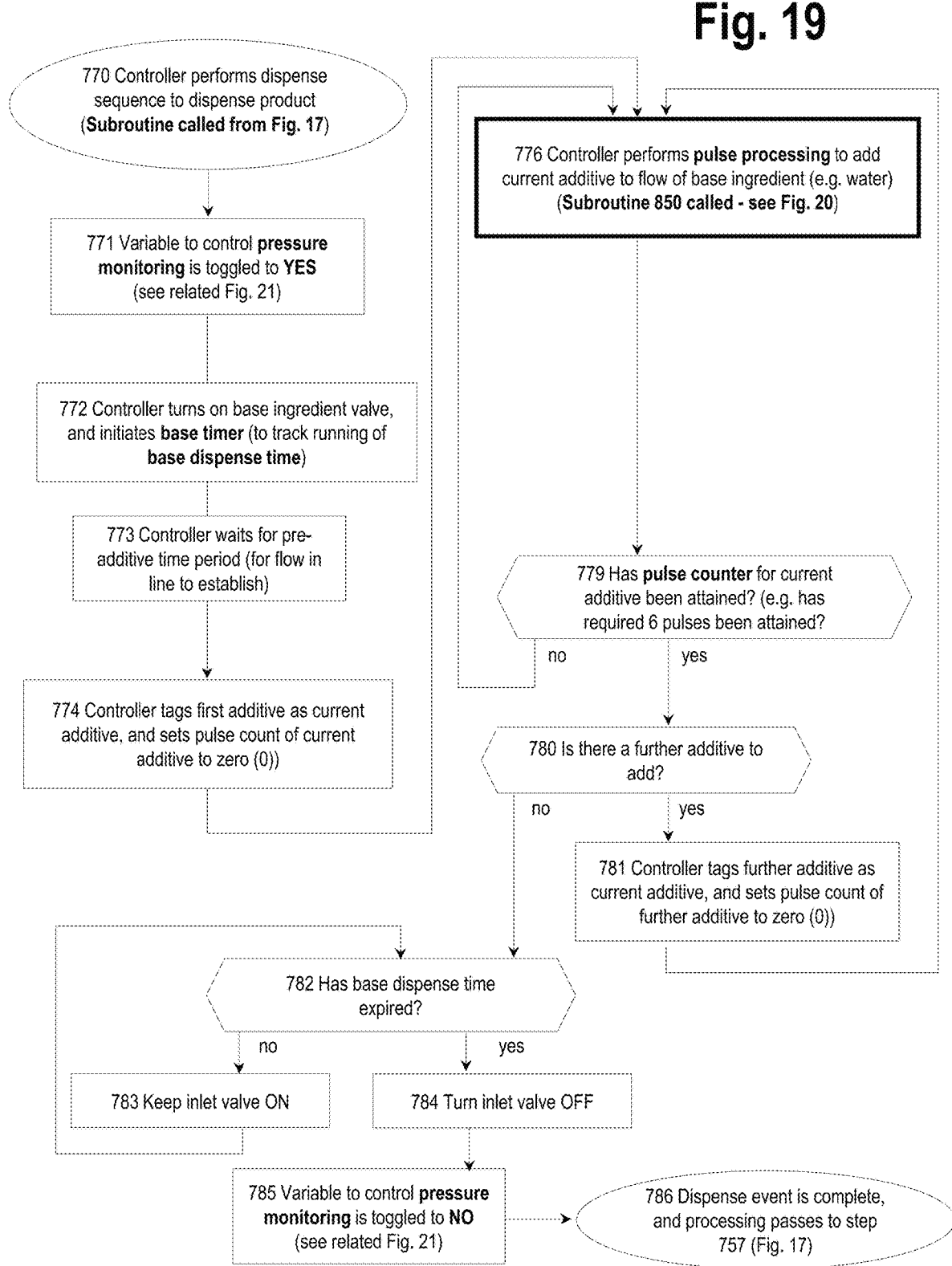
FIG. 19 is a flowchart showing in further detail subroutine 770, controller performs dispense sequence to dispense the requested product, as called from the processing of FIG. 17, in accordance with principles of the disclosed subject matter.
Figure 21:
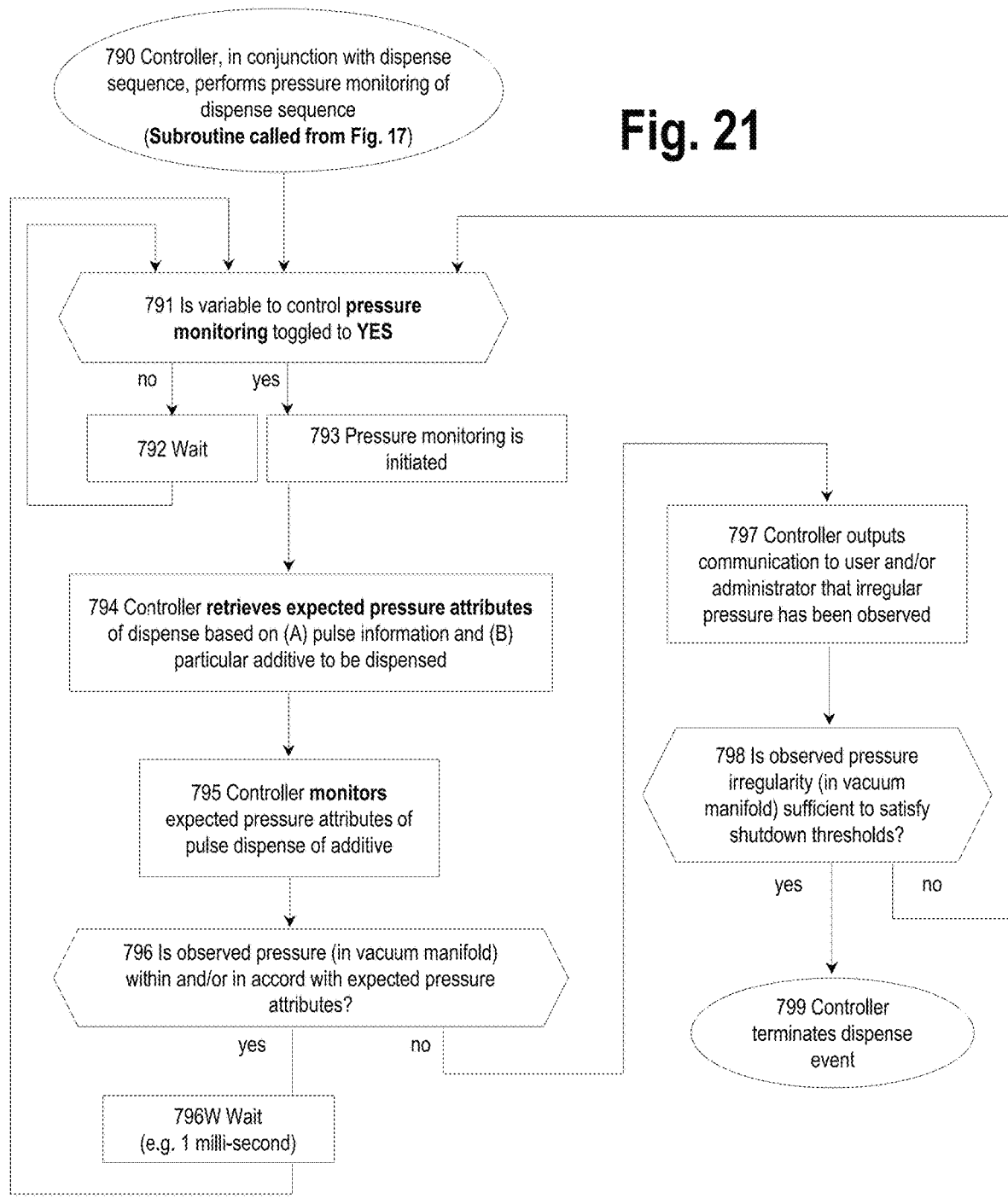
FIG. 21 is a flowchart showing in further detail subroutine 850, controller, in conjunction with dispense sequence, performs pressure monitoring of dispense sequence, as called from the processing of FIG. 19, in accordance with principles of the disclosed subject matter.

In step 763, the controller determines if there is a further additive. If yes, then the process passes onto step 764. In step 764, the controller retrieves the amount of the further additive of the requested product and, based on pulse rate of the apparatus, determines the number of pulses to dispense the further additive. For example, the number of pulses to dispense the further additive might be 7 pulses. Processing then passes back to step 763—and the controller determines if there is a yet further additive. If yes, then the process again passes to step 764. If a no is rendered in step 763, then the process passes onto step 765. In step 765, the controller saves the pulse data for the requested product. Then, in step 766, the process passes onto steps 755, 756 of FIG. 17. FIG. 19 is a flowchart showing in further detail subroutine 770, controller performs dispense sequence to dispense the requested product, as called from the processing of FIG. 17. The process is initiated in step 770 and passes onto step 771. In step 771, a variable to control pressure monitoring is toggled or changed to yes. FIG. 21 shows related processing as described below. Then, in step 772, the controller turns on the base ingredient valve, i.e. the inlet valve 400 as shown in FIG. 11, and initiates a base timer. The base timer tracks running of the base dispense time. Then, in step 773, the controller waits for a pre-additive time period to run. The pre-additive time period is provided so as to allow initial turbulence in water entering the VBA 500 to settle, and so as to provide a steady state flow from the inlet valve 400. For example, the pre-additive time period might be 50 milliseconds (ms), 100 ms, 200 ms, 300 ms, 400 ms, 500 ms, 600 ms, 700 ms, 800 ms, 900 ms, 1000 ms, 1500 ms, or some other desired time period.

After step 773, the process passes onto step 774. In step 774, the controller tags the first additive as the current additive. The controller sets the pulse count of the current additive to zero (0). Then, the process passes onto step 776. In step 776, the controller performs pulse processing to add the current additive to the flow base ingredient flowing through the VBA 500. To perform such processing, subroutine 850 can be called as described below with reference to FIG. 20. After step 776 and performing subroutine 850, the process passes onto step 779.

In step 779, the controller determines if the pulse counter for the current additive has been attained. For example, has the 6 pulses to dispense the first additive been performed by the CFA 300B. If no, then the process passes back to step 776—and of the controller opens the additive valve 410, for example, so as to execute a further "pulse" of the additive—in the processing of subroutine 850.

If a yes is rendered in step 779, then the process passes onto step 780. In step 780, the controller determines if there is a further additive to add. If yes, then processing passes onto step 781. In step 781, the controller tags the further additive as the current additive, and sets the pulse count of the further additive to zero (0). Processing then passes back to step 776 and continues with the execution of subroutine 850 for the further additive, which is now the "current" additive. If a no is rendered in step 780, i.e. there is no further additive to add, then the process passes onto step 782. In step 782, the controller determines if the base dispense time has expired for the base ingredient. If no, then in step 783, the controller keeps the water valve, e.g. inlet valve 400 as shown in FIG. 11, in an on or open state. On the other hand, if yes in step 782, then the controller turns the inlet valve off, i.e. to a closed state in step 784. For example, the dispense time might be 15 seconds, in which time an additive is added into the flow of water over the course of 3 seconds.

After step 7084, the process passes onto step 785. In step 785, the variable to control pressure monitoring is toggled to no. That is, pressure monitoring of the dispense event is terminated since the dispense event has concluded. Then, in step 786, the dispense event is deemed as completed, and the process passes onto step 757, FIG. 17.

Figure 20:
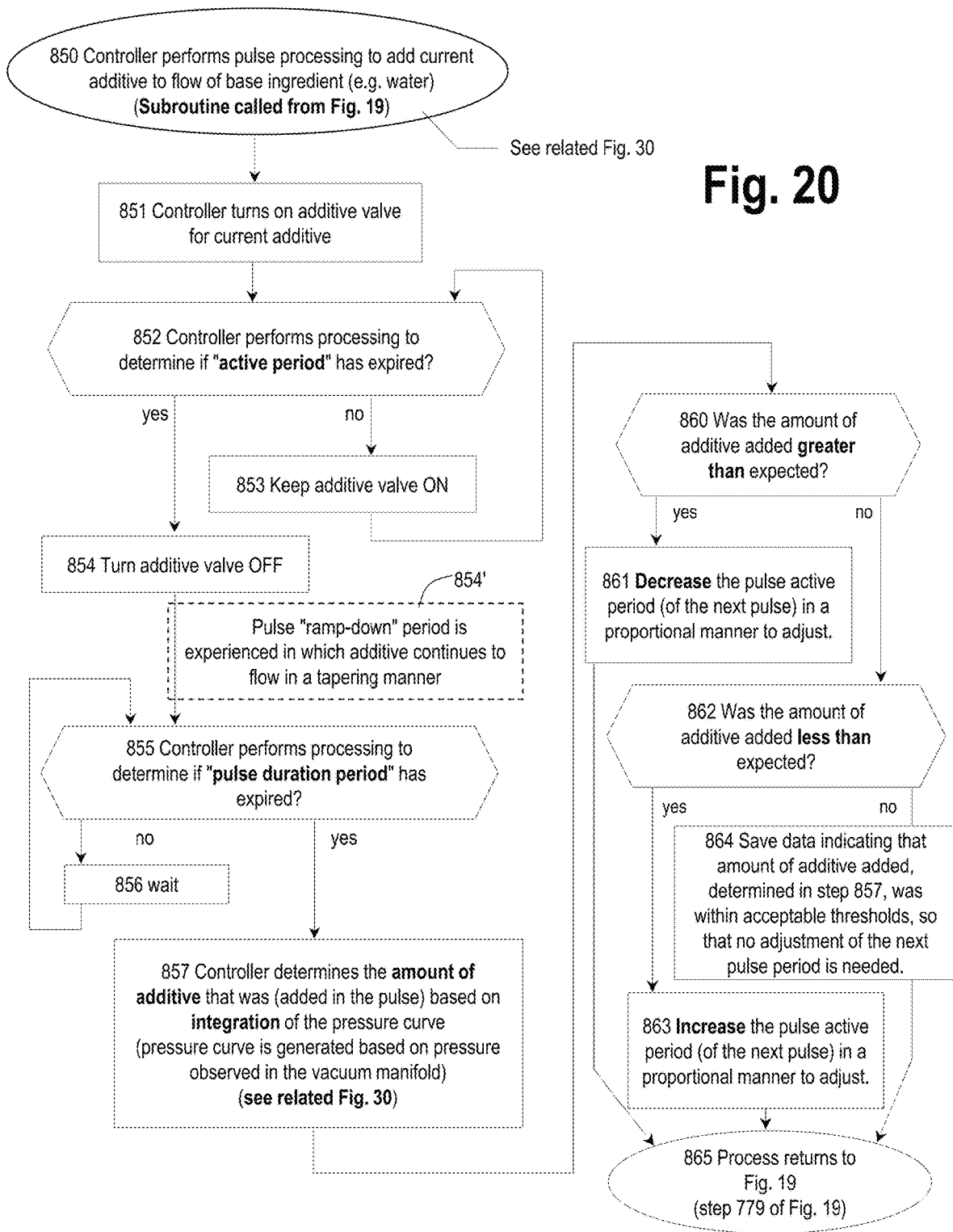
FIG. 20 is a flowchart showing in further detail subroutine 850, controller performs pulse processing to add current additive to flow of base ingredient (e.g. water), as called from the processing of FIG. 19, in accordance with principles of the disclosed subject matter.

FIG. 20 is a flowchart showing in further detail subroutine 850, controller performs pulse processing to add current additive to flow of base ingredient (e.g. water), as called from the processing of FIG. 19. The subroutine is initiated in step 850, and passes to step 851. In step 851, the controller turns on the additive valve for the current additive, such as, for example, turns on additive valve 410 (of the CFA 300B shown in FIG. 11) to dispense additive from the source container 610. After step 851, the process passes onto step 852.

Figure 32:
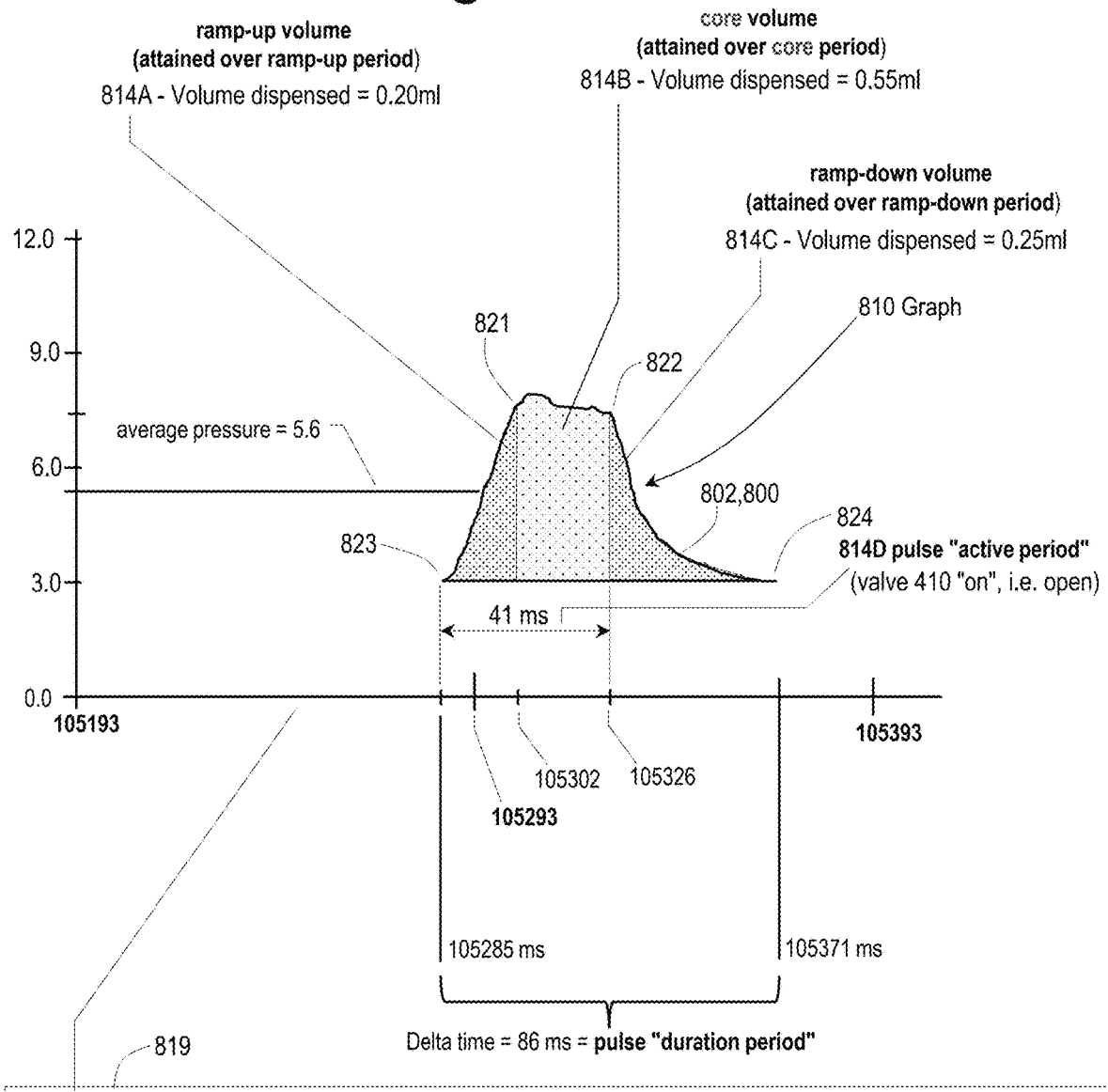
FIG. 32 is a schematic diagram, including graph 810, that shows additional aspects of pulse processing, in accordance with principles of the disclosed subject matter.

In step 852, the controller performs processing to determine if the "active period" of the pulse has expired. Further details are described below with reference to FIG. 32—regarding processing to determine if the active period of a pulse has expired. If NO, then the additive valve is kept "on" in step 853. Upon a YES being determined in step 852, the process passes onto step 854. Upon a yes being determined in step 852, the process passes onto step 854. In step 854, the additive valve, for the current additive being dispensed, is turned off. As reflected at 854', upon the additive valve being turned off (by the controller) a pulse "ramp-down" period is experienced in which the additive continues to flow in a tapering manner. Such ramp-down period is illustrated in FIG. 32.

Then, in step 855, the controller performs processing to determine if the "pulse duration period" has expired. The pulse duration period, in an embodiment, is the period of time that is allocated in the processing to perform one pulse of the additive. As described below, the pulse duration period can include a ramp-up period, a pulse core period, and a ramp down period. The pulse duration period, in an embodiment, can be based on a distinct period of time, such as 86 ms, as illustrated in FIG. 32. Once pulse duration period has expired, the controller will turn on the additive valve so as to initiate the next pulse.

Also, the pulse "active period" can be a distinct period of time that is programmed into the processing. The pulse active period is the time, in a pulse, in which the additive valve is turned on. The pulse active period includes both the ramp-up period and the core period. That is, once the pulse active period has run, the additive valve is turned off. Thereafter, the ramp down period is experienced, in the pulse, in which additive is depleted from the vacuum manifold and pressure, in the vacuum manifold, becomes less, i.e. more of a vacuum. In some embodiments, the pulse active period can be based on observing pressure thresholds in the vacuum manifold. Such observed pressure can include the controller observing pressure thresholds and/or observing pressure patterns, for example. Further details are described below with reference to FIG. 32.

Upon a yes being determined in step 855, the processing passes onto step 857. In step 857, the controller determines the amount of additive that was (i.e. added in the pulse) based on integration of the observed pressure curve. The pressure curve is generated based on pressure observed in the vacuum manifold during the pulse. Further details are described below with reference to FIGS. 31-33.

After step 857, the process passes onto step 860. In step 860, the controller, of the CFA 300B, determines if the amount of additive was greater than expected. If a yes is rendered, than the process passes to step 861. In step 861, the controller decreases the pulse active period (of the next pulse) in a proportional manner so as to adjust for the greater than expected delivery of additive in step 860. On the other hand, if no in step 8060, then the process passes onto step 862. In step 862, the controller determines if the amount of additive added, as determined in step 857, was less than expected. If yes, then in step 863, the controller increases the pulse active period (of the next pulse) in a proportional manner to adjust.

If a no is rendered in step 862, then the process passes to step 864. In step 864, the controller saves data indicating that the amount of additive added, as determined in step 857 of FIG. 20, was within acceptable thresholds, so that no adjustment of the next pulse period is needed. In other words, in step 864, the controller saves data indicating that the dispense of additive is "on track" and proceeding as anticipated. After any of steps 861, 863, 864, the process passes to step 865. In step 865, the process passes to step 779 (FIG. 19).

FIG. 21 is a flowchart showing in further detail subroutine 850, controller, in conjunction with dispense sequence, performs pressure monitoring of dispense sequence, as called from the processing of FIG. 19. The subroutine is initiated in step 790, and passes onto step 791. In step 791, the controller determines if the variable to control pressure monitoring is toggled to a yes value. Such value can be toggled in the processing of steps 771, 785 (FIG. 19) as described above. If no in step 791, then the process passes onto step 792. In step 792, the controller waits a predetermined wait time. That is, in one embodiment, the determination of step 791 is provided so that the controller knows if there is a pulse of additive currently being performed. If there is a pulse of additive, then the processing of FIG. 21 will be performed. If there is not a current pulse being performed, then the processing of FIG. 1 will not be performed, and will wait (step 792) until a further check determines that the variable to control pressure monitoring is indeed toggled to yes. Accordingly, at a point, the determination of step 791 will render a yes. The process will then pass onto step 793. In step 793, pressure monitoring is initiated. Accordingly, the process passes onto step 794.

In step 794, the controller retrieves expected pressure attributes of dispense based on (A) pulse information and (B) particular additive to be dispensed. Then, in step 795, the controller monitors the expected pressure attributes of the pulse dispense of the particular additive. In step 796, a determination is rendered in conjunction with the monitoring. The controller determines if an observed pressure (in the vacuum manifold) is within and/or in accord with expected pressure attributes. In other words, is the pulse of the particular additive advancing within expected pressure range(s), i.e. windows, or is the pressure deviating from the expected pressure. If the observed pressure is deviating sufficiently, outside of thresholds, from the expected pressure, then there may be a malfunction or problem with the dispense of the additive.

That is, to explain further, if a yes is rendered in step 796, then the process advances onto step 796W. In step 796W, the controller waits a predetermined amount of time. That is, the controller waits to check on the pressure a further time. Accordingly, after the wait time has expired, the process passes back to step 791. In step 791, processing advances as described above. It is also appreciated that once a pulse, i.e. a pulse event, has concluded, then the value determined in step 791 will be no, and further pressure checking will not be performed until the next pulse event, in at least one embodiment. Illustratively, the wait time provided in step 796W is 1 ms. The wait time, as with other wait times described herein, can vary depending on how many times it is desired for the controller to check, for example, pressure during a pulse event and the capacity of the processor. As the wait time decreases, then the load on the processor (and the number of times the pressure is checked) increases.

With further reference to FIG. 21, a no may be rendered in step 796. The process then passes onto step 797. In step 797, the controller outputs a communication to the user and/or administrator that irregular pressure has been observed in the dispense of the additive. Additional processing can be performed including step 798. In step 798, a determination is performed as to whether the observed pressure irregularity (in the vacuum manifold) is sufficient to satisfy shutdown thresholds. In other words, is the pressure irregularity sufficient enough that the dispense event should be shut down. In one aspect of the processing, shut down can be based on a determination of whether the irregularity in pressure, which is indicative of irregularity in the amount of additive dispensed, is so substantial that further pulses cannot be sufficiently adjusted to address the irregularity. For example, an observed pressure irregularity could be indicative of a malfunction or breakage in the system. Such breakage might be the vacuum manifold 380 being compromised or broken, or an additive line being compromised or broken. If a yes is rendered in step 798, then the process passes onto step 799—and the controller terminates the dispense event. If a no is rendered in step 798, then the processing passes back to step 791. Processing then continues as described above.

Figure 22:
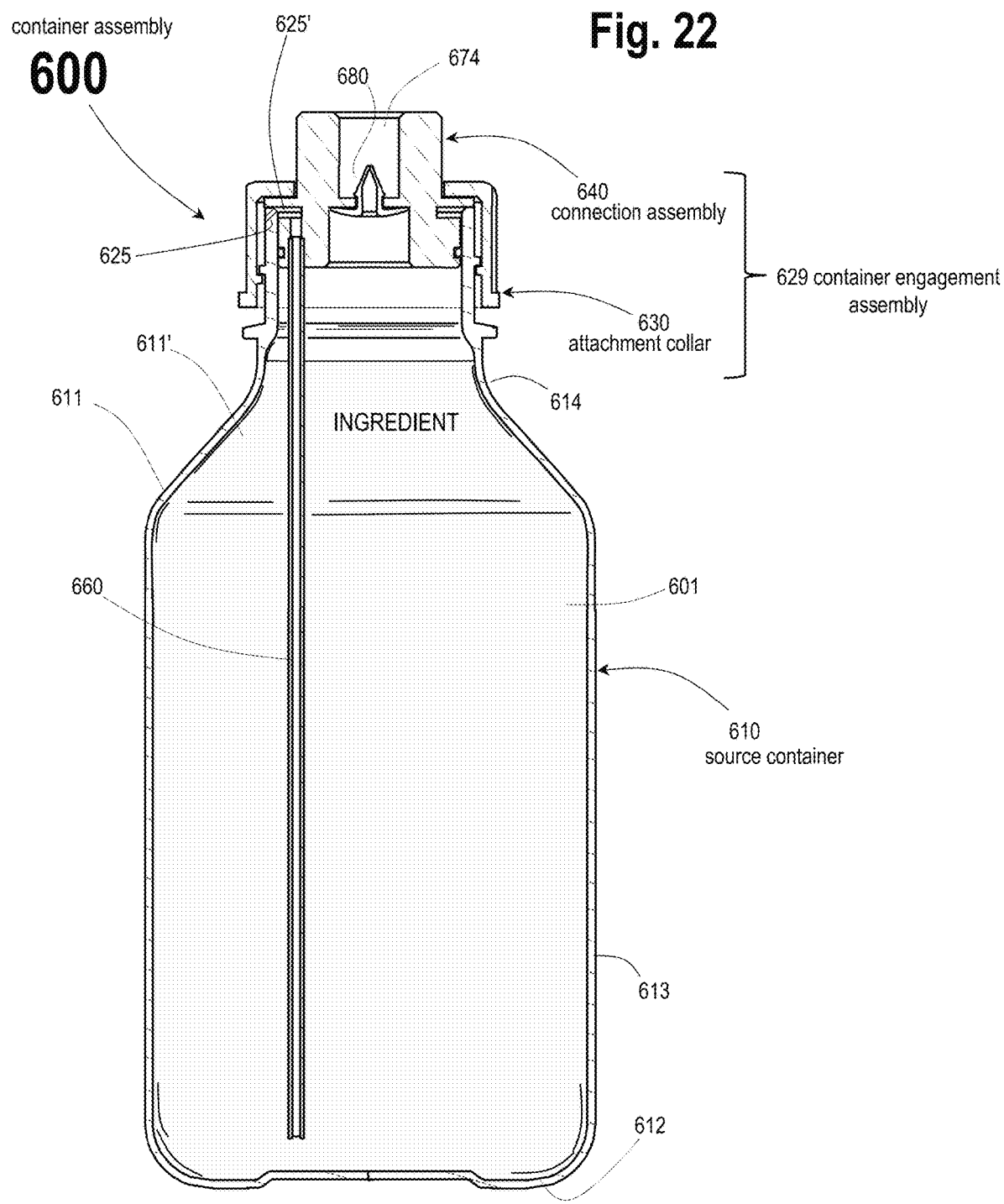
FIG. 22 is a cross-section view of a container assembly 600 that can be used in the pulse processing performed by the container filling apparatus, in accordance with principles of the disclosed subject matter.

Various features of processing performed by the CFA 300B are described above. FIG. 22 is a cross-section view of a container assembly 600 that can be used in the pulse processing performed by the CFA 300B. As shown in FIG. 22, the container assembly 600 can include a source container 610, a connection assembly 640, and an attachment collar 630. The source container 610 can include a container body 611 that forms an internal volume 611'. The source container 610 can include a bottom 612. An additive can be contained within the internal volume 611'. At the top of the body 611, the container assembly can include a neck 614.

The attachment collar 630 and connection assembly 640 can collectively form a container engagement assembly 629. The container engagement assembly 629 can serve to connect the source container 610 to an attachment adapter 550, as schematically shown in FIG. 13. The attachment adapter 515 10 in turn can be attached to additive valve 410, which provides flow into vacuum manifold 380.

The attachment collar 630 can attach the connection assembly 640 securely onto the source container 610. The connection assembly 640 can include an outlet chamber or bore 674 that can receive, and attach to, the attachment adapter 550. The connection assembly 640 can be provided with a one-way valve 680. The one-way valve 680 can allow flow of additive out of the source container when a suction is applied, but prevent inadvertent flow of the additive out of the source container 610.

The container assembly 600 can also include a vent tube 660. The vent tube 660 can allow airflow between the ambient, i.e. the air that surrounds the container assembly 600, and the internal volume 611'. Such airflow can be provided by a passage extending through the vent tube 660 and an upper end of the vent tube being connected to the ambient via suitable passages in the source container 610, the attachment collar 630 and/or the connection assembly 640. As shown, for example, the source container 610 can be provided with an air passage 625 (at the upper end of the lip of the source container) and the connection assembly 640 can be provided with a relief 625' (so as to not abut against the port 640—to allow airflow). In general, a passage 661 (through the vent tube 660), a passage, relief or recess 625 (in the source container 610), a passage, relief or recess 625' (in the connection assembly 640), and/or a passage, relief or recess (in the attachment collar 630) can be provided so as to provide fluid/air communication between the internal volume 611 of the container assembly and the ambient. That is, so that the internal volume of the container 610 is in airflow communication with the ambient. As a result, additive can be pulled out of the container 610 (via the one-way valve 680) without being hindranced or precluded by a suction buildup within the container 610.

Figure 23:
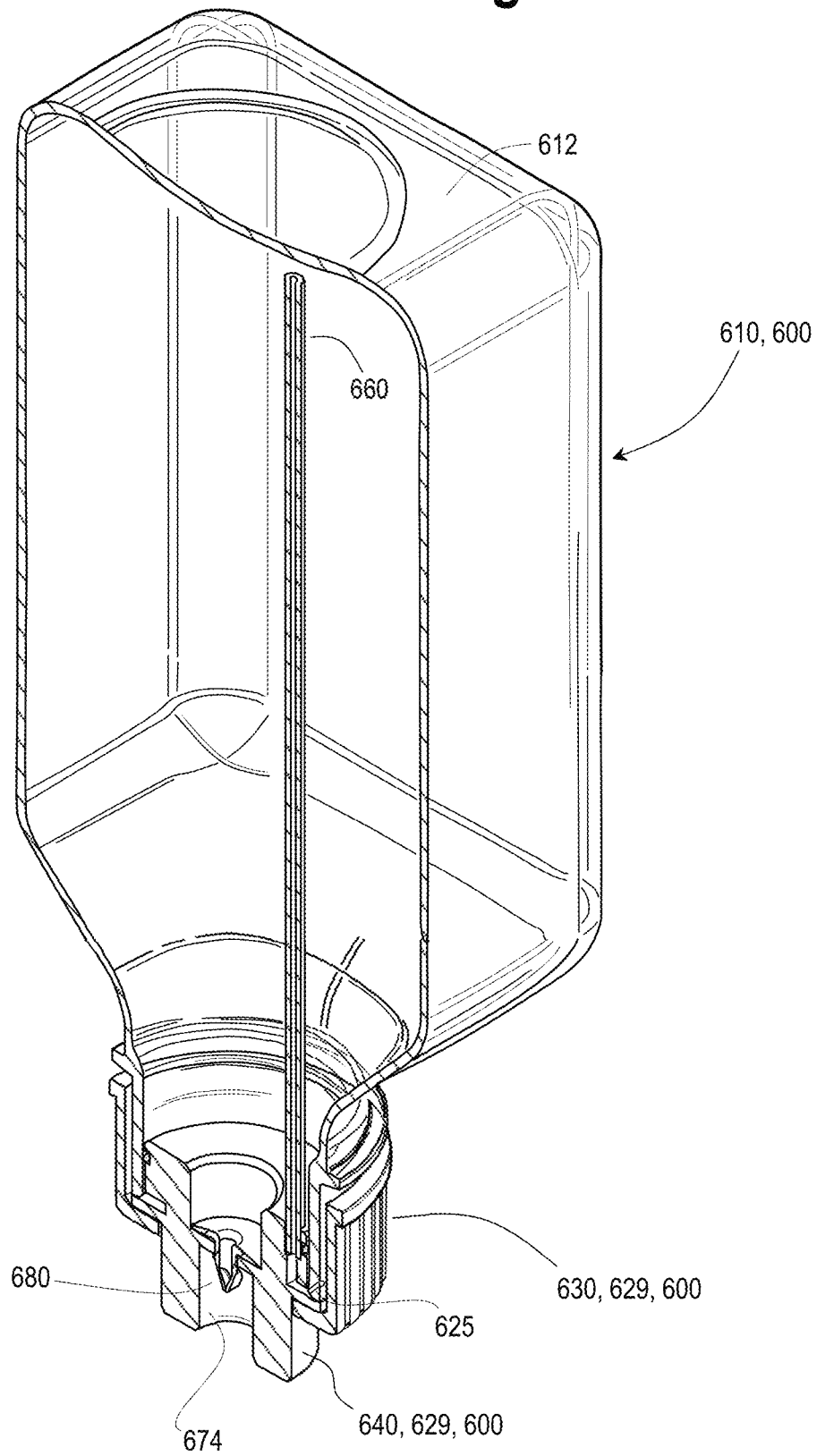
FIG. 23 is a cross-section perspective view of a container assembly 600, the same or similar to the assembly of FIG. 22, that can be used in the pulse processing performed by the container filling apparatus, in accordance with principles of the disclosed subject matter.

In different embodiments, the container assembly 600 can be used in an "upright" position as shown in FIG. 22 or flipped, and used in an "inverted" position as shown in FIG. 23. Relatedly, it is appreciated that the source container 610 can be connected to a vacuum manifold 380 in any suitable manner, and the connection arrangement is not limited to use of the container engagement assembly 629 or use of the attachment adapter 550. One or more hoses or tubes can be utilized so as to connect the source container 610 to the vacuum manifold 380. For example, in the arrangement of FIG. 5, a container assembly might be used in the upright position, and a tube used to suck additive out of the container assembly, and into a vacuum manifold 380. In other embodiments described below, the container assembly may be used in an inverted position, and additive flowed out through the container engagement assembly 629 and attachment adaptor 550.

FIG. 23 is a cross-section perspective view of a container assembly 600, the same or similar to the assembly of FIG. 22, that can be used in the pulse processing performed by the CFA 300B. As shown in FIG. 23, the container assembly 600 is in an inverted position or orientation. FIG. 23 shows the container engagement assembly 629 that can include the connection assembly 640 and the attachment collar 630. The one-way valve 680 allows additive in the source container 610 to flow out upon a predetermined amount of suction being applied to the one-way valve 680.

Figure 24:
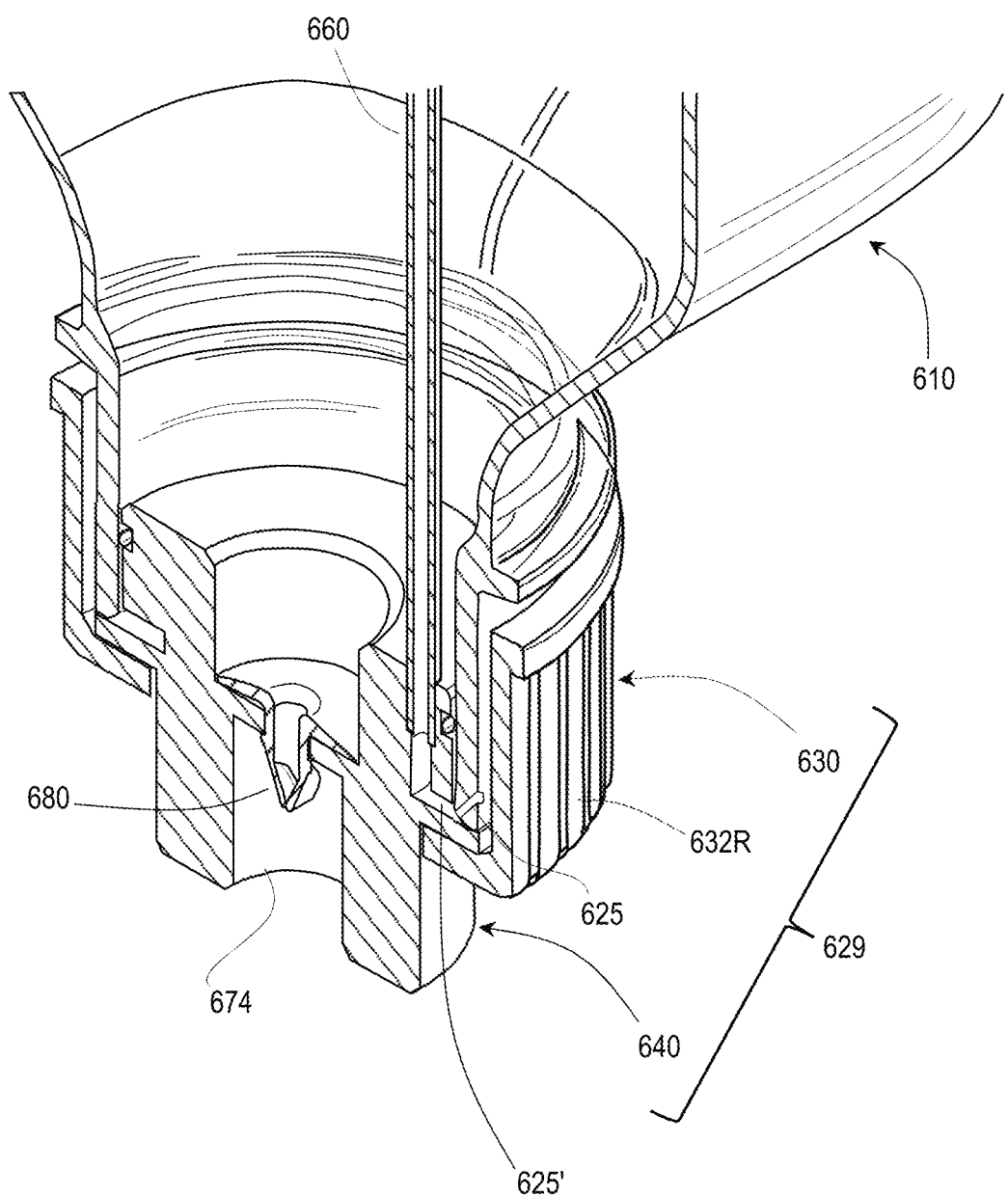
FIG. 24 is a perspective cross-section view of the container engagement assembly 629 on a source container, the same or similar to the assembly of FIG. 22, in accordance with principles of the disclosed subject matter.

FIG. 24 is a perspective cross-section view of the container engagement assembly 629 on a source container, the same or similar to the assembly of FIG. 22. FIG. 24 is provided to show an enlarged view of the structure of the assembly of FIG. 23. The connection assembly 640 is shown as including the one-way valve 680 and the outlet chamber or bore 674. The container 610 includes passage 625. The connection assembly 640 includes passage 625' to provide the internal volume 611' with access to the ambient as described above. FIG. 24 also shows that the attachment collar 630 can include ridges 632R on an outside surface thereof. The ridges 632R can assist a user to tighten the attachment collar 630, so as to secure the connection assembly 640 onto the container 610.

Figure 25:
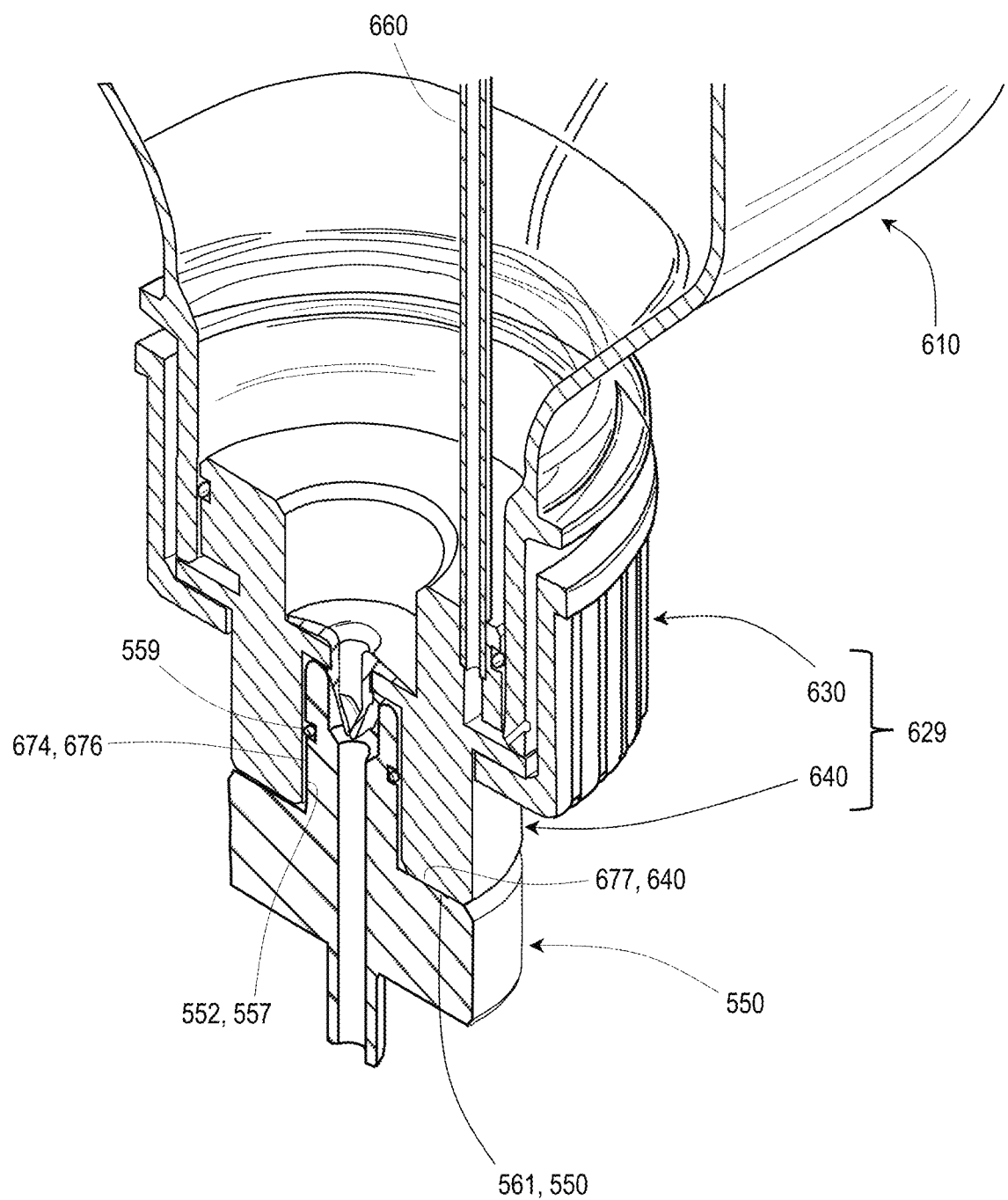
FIG. 25 is a perspective cross-section view of the container engagement assembly 629 on a source container, attached to the attachment adaptor 550, in accordance with principles of the disclosed subject matter.

FIG. 25 is a perspective cross-section view of the container engagement assembly 629 on a source container, attached to the attachment adaptor 550. The attachment adaptor 550 includes an upper engagement spout 552. The upper engagement spout 552 includes an outer surface that is provided with an O-ring 559. The upper engagement spout 552, in accordance with an embodiment, is received into the connection assembly 640. Outer surface 557 of the upper engagement spout 552 engages with the an inner surface 676 (of the outlet chamber or bore 674) of the connection assembly 640. The inner surface 676 can be described as a bore wall engagement surface 676. The O-ring 559 provides a watertight seal between the inner surface 676 and the outer surface 557. Accordingly, a fluid passage, for additive, is provided from the container 610, out through the one-way valve 680 (of the connection assembly 640), and through the attachment adaptor 550. The one-way valve 680 can also be described as a valve assembly 680. An upper surface 561 of the attachment adaptor 550 can abut against a lower surface or end annular surface 677 of the connection assembly 640. Further details of the attachment adaptor 550 are described below with reference to FIG. 29.

Figure 26:
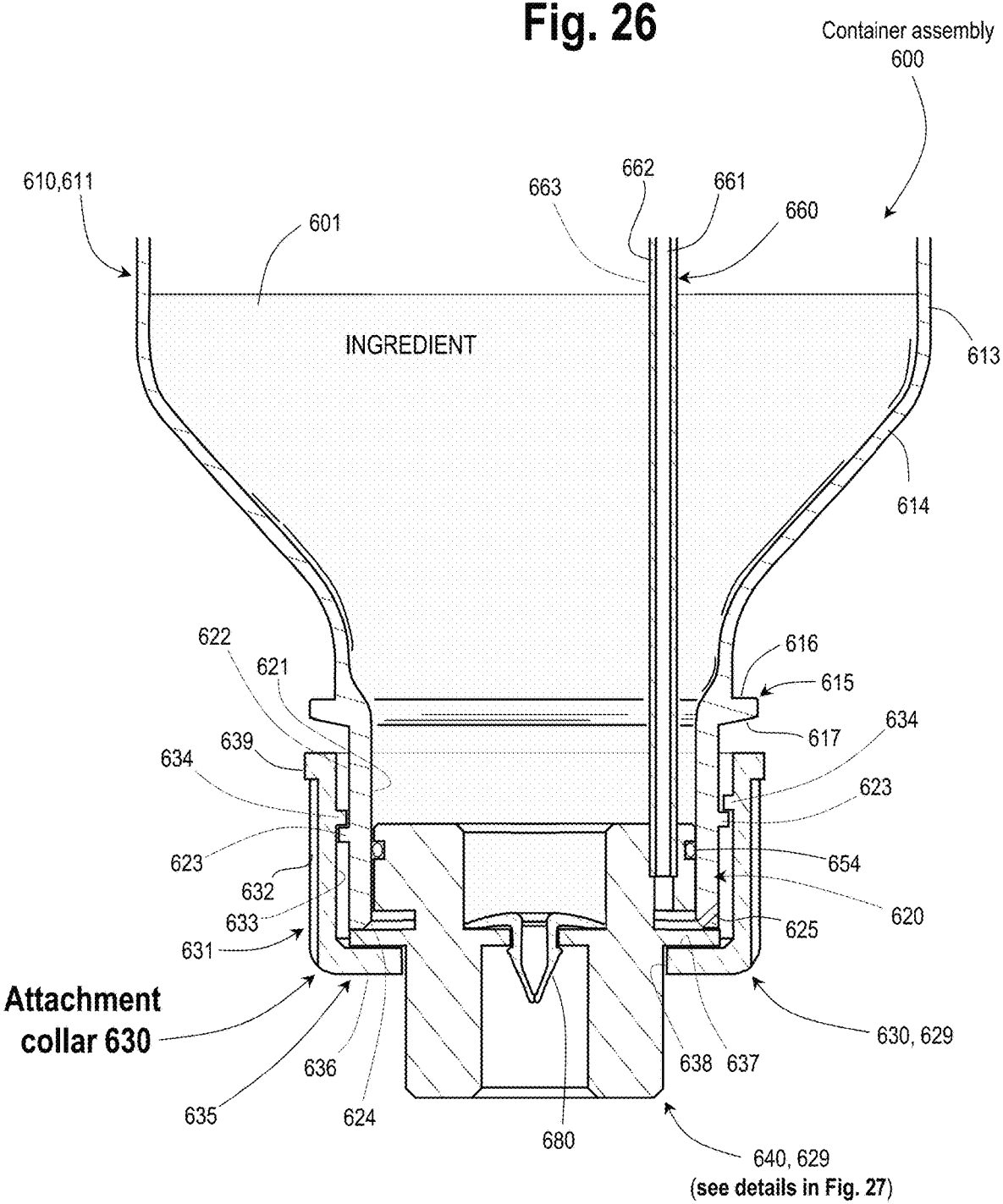
FIG. 26 is a cross-section view of a container assembly including container engagement assembly 629 (with attachment collar 630) and source container, the same or similar to the assembly of FIG. 22, in accordance with principles of the disclosed subject matter.

FIG. 26 is a cross-section view of a container assembly including container engagement assembly 629 (with attachment collar 630) and source container, the same or similar to the assembly of FIG. 22. As shown in FIG. 26, the container assembly 600 includes a container or source container 610. As described above, the source container 610 can include a container body 611. The container body 611 can include a side wall 613 and a bottom 612. The container body 611 can provide an internal volume 611' to contain an additive or additive ingredient 601. The container 610 can include a container neck 614. The container neck 614 can include a flange 615. The flange 615 can include an upper flange surface 616 and a lower flange surface 617, given the orientation of the container 610 as shown in the inverted position in FIG. 26.

The container 610 can include a lip 620. The lip 620 can include an inner surface 621 and an outer surface 622. The outer surface 622 can include threads 623 that engage with threads of the attachment collar 630, so as to threadably attach the attachment collar 630 onto the container 610. Other attachment mechanisms could be used such as a clip or other engagement mechanism so as to attach the attachment collar 630 onto the container 610. The inner surface 621 can be smooth and sized so as to receive the connection assembly 640. As described above, the lip of the container 610 can include an air passage, recess, relief, or opening 625 so as to allow the internal volume 610 to be in communication with the ambient. The lip 620 can include a chamfer 624 which can be helpful in aligning or guiding the connection assembly 640 into the lip 620 of the container 610.

FIG. 26 also shows attachment collar 630. In the illustrative embodiment of FIG. 26, the attachment collar 630 includes an outer wall 631. The outer wall 631 is provided with ridges or grip ridges 632R. The attachment collar 630 includes an inner surface 633. The inner surface 633 includes threads 634 or other engagement mechanisms that serve to removably attach the attachment collar 630 onto the container 610. The attachment collar 630 includes an engagement flange 635. The engagement flange 635 includes, with the orientation shown in FIG. 6, a lower surface 636 and an upper surface 637. The upper surface 637 engages with an engagement collar 641, of the connection assembly 640, so as to sandwich the engagement collar 641 between the attachment collar 630 and the container 610. In this manner, the connection assembly 640 can be removably attached onto the container 610. The attachment collar 630 can include an opening or flange opening 638. The opening 638 can receive the connection assembly 640. The attachment collar 630 can also include a rim 639.

Figure 27:
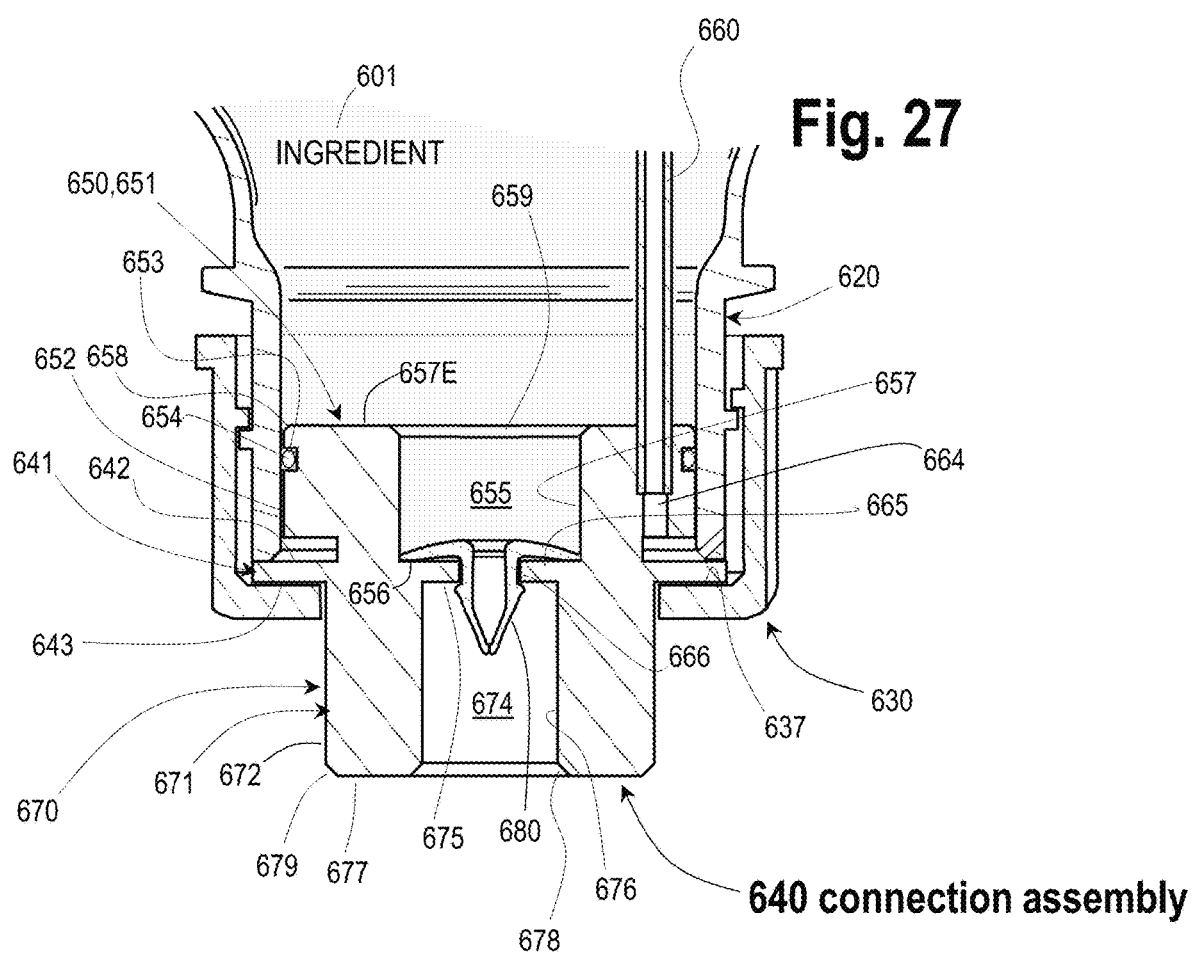
FIG. 27 is a cross-section view of a container assembly including container engagement assembly 629 (with connection assembly 640) and source container, the same or similar to the assembly of FIG. 22, in accordance with principles of the disclosed subject matter.

FIG. 27 is a cross-section view of a container assembly including container engagement assembly 629 (with connection assembly 640) and source container, the same or similar to the assembly of FIG. 22. As shown in the illustrative embodiment of FIG. 27, the connection assembly 640 includes the engagement collar 641. As described above, the engagement collar 641 is sandwiched between the container 610 and the attachment collar 630, so as to secure the connection assembly 640 onto the container 610. The engagement collar 641 includes an upper surface 642 and a lower surface 643.

The connection assembly 640 includes a bottle attachment collar 650, which is received into the container 610. The bottle attachment collar 650 includes an engagement wall 651, with an outer surface 652. The outer surface 652 is provided with a gasket recess 653, with O-ring 654, so as to provide a watertight seal between the connection assembly 640 in the container.

The connection assembly 640 includes an inlet chamber or bore 655, with end bore surface 656. The bore 655 includes a bore wall surface (i.e. inner surface) 657. The engagement wall 651 includes an end surface 657E. The end surface 657E includes an outer chamfer 658 and an inner chamfer 659. The outer chamfer 658 can assist with aligning or guiding the connection assembly 640 so as to be received into the container 610.

As described above and illustratively shown in FIG. 26 and FIG. 27, the connection assembly 640 can include a vent tube 660. The vent tube 660 includes a tube wall 662 that provides and defines an inner passage 661. The tube wall 662 includes an outer surface 663. The vent tube 660 can be received into all or part of a passage or hole 664 that passes through the bottle engagement collar 650. As shown in FIG. 27, the hole 664 can be sized so as to accept the vent tube into a portion of the hole 664. The hole 664 can form, in part, the passage so as to connect the internal volume of the container 610 to the ambient, as otherwise described herein.

The connection assembly 640 also includes an adapter collar 670. The adapter collar 670 can be described as positioned on a first or lower end of the connection assembly 640 and the bottle attachment collar 650 positioned on a second door upper and of the connection assembly 640. The attachment collar 670, in the embodiment shown in FIG. 27, includes an engagement wall 671 with an outer surface 672. The adapter collar 670 passes through the attachment collar 630, and specifically through the flange opening of the attachment collar 630. The adapter collar 670 includes an outlet chamber or bore 674. The bore 674 includes an end bore surface 675 and a bore wall engagement surface 676. The engagement surface 676 defines an inner surface of the engagement wall 671. The attachment adaptor 550, as otherwise described herein, is removably received into the outlet chamber 674.

The adapter collar 670 includes an end annular surface 677, with inner chamfer 678 and outer chamfer 679. The inner chamfer 678 can assist with guiding and aligning the connection assembly 640 so as to receive the attachment adaptor 550.

The connection assembly 640 can also include a valve assembly 680. The valve assembly 680 can be in the form of a one-way valve 680. Further details of the valve assembly are described below with reference to FIG. 28. The valve assembly 680 can be supported on a separating flange 665. The separating flange 665 serves to separate the inlet chamber 655 from the outlet chamber 674. The separating flange 665 includes a pass-through opening 667. The pass-through opening 667 can receive and support the valve assembly 680. In operation, the valve assembly 680 allows flow of fluid, e.g. additive, from the inlet chamber 655, through the pass-through opening 667, and into the outlet chamber 674. Thereafter, additive can pass into the attachment adaptor 550, which is received into the outlet chamber 674. Additive can then be flowed to the vacuum manifold.

Figure 28:
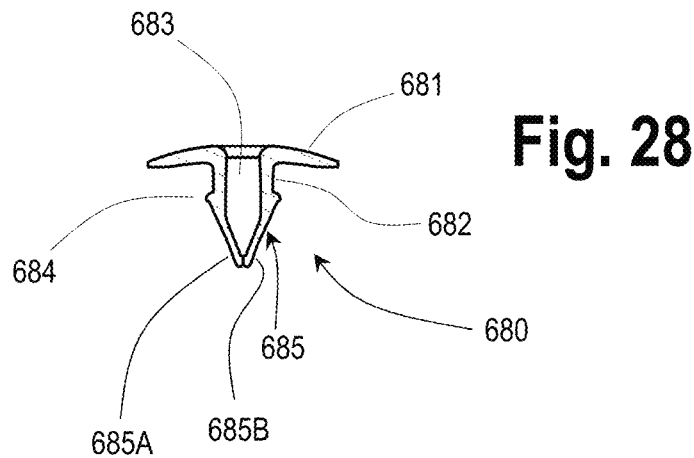
FIG. 28 is a cross-section view of a valve assembly, in accordance with principles of the disclosed subject matter.

FIG. 28 is a cross-section view of a valve assembly 680, which can be in the form of a one-way valve 680. The valve assembly 680 can be constructed of rubber or other elastic material. In the embodiment of FIG. 28, the valve assembly 680 includes an upper retaining collar 681 and a lower retaining collar 684. The neck 682 serves to connect the upper retaining collar 681 and the lower retaining collar 684. An aperture 683 extends through the valve assembly 680. The aperture 683 can be described as a flow-through aperture 683. The valve assembly 680 includes a one-way valve portion 685. The valve portion 685 can be constructed of two sides (685A, 685B) that are biased together, so as to provide a seal in the situation that the valve assembly 680 is not under a suction pressure. However, upon the valve assembly 680 being exposed to a suction pressure, pulling out of the container 610, then the sides 685A, 865B of the valve portion are forced apart, and fluid is allowed to pass through the aperture 683. The valve assembly 680 might also be described as a "duck valve". It is appreciated that other one-way valves can be used in the connection assembly 640, in lieu of the specific construct shown in FIG. 28.

Figure 29:
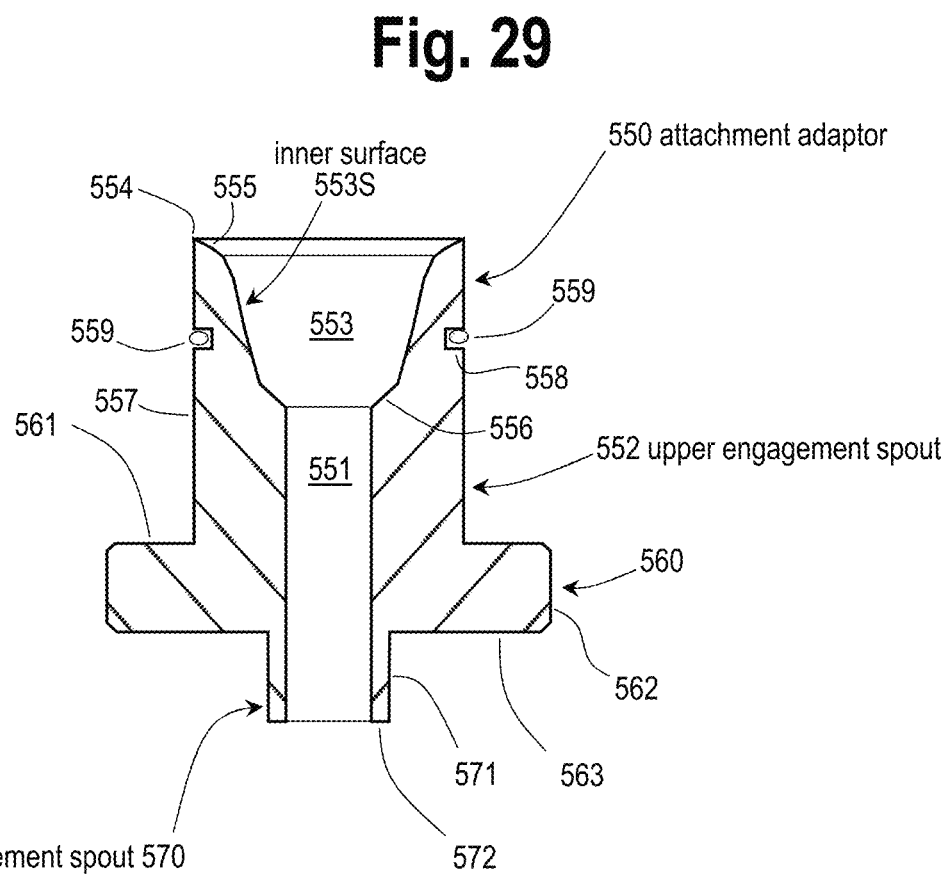
FIG. 29 is a cross-section view of an attachment adapter 550, the same or similar to the attachment adaptor 550 shown in FIG. 25, in accordance with principles of the disclosed subject matter.

FIG. 29 is a cross-section view of an attachment adapter 550, the same or similar to the attachment adaptor 550 shown in FIG. 25. It is appreciated that the size and dimensions of the various components of the CFA 300B can be varied as desired. The size and dimensions of the various components can be varied based on a variety of considerations including spatial constraints, volume requirements, and other factors.

In the embodiment shown in FIG. 29, the attachment adaptor 550 includes an internal passage or conduit 551 with a valve receiving chamber 553. The internal passage 551 with chamber 553 can provide for the flow of additive through the attachment adaptor 550. The attachment adaptor 550 includes an upper engagement spout 552 through which the internal passage 551 with chamber 553 passes. The upper engagement spout 552 can be removably received into the outlet chamber 674. The upper engagement spout 552 includes an inner surface 553S that defines the valve receiving chamber 553. The inner surface 553S can be in the form of an annular tapered wall. The inner surface 553S includes an upper edge 554, upper chamfer 555, and a lower chamfer 556. The inner surface 553S can define the valve receiving chamber 553 so as to be geometrically shaped to closely receive the valve assembly 680. In embodiments, the chamber 553 can be shaped so as to closely correspond with a geometry of the valve assembly 680. The upper engagement spout 552 includes an outer surface 557. The outer surface 557 includes an O-ring annular recess, in which an O-ring can be provided. Such O-ring provides a seal between the upper engagement spout 552 and the inner surface of the outlet chamber 674, of the connection assembly 640. As described above, the attachment adaptor 550 also includes an engagement shoulder 560. The engagement shoulder 560, in the orientation shown in FIG. 29, includes an upper surface 561, a lower surface 563, and an outer surface 562. The upper surface 561 (of the engagement shoulder 560) can abut against and engage with the end annular surface 677 of the connection assembly 640.

The attachment adaptor 550 includes a lower engagement spout 570. The lower engagement spout 570 includes an outer surface 571, and a lower edge 572. The lower engagement spout 570 can be received into the additive valve 410 (see FIG. 13) or a further attachment or adapter so as to connect the attachment adaptor 550 with the additive valve 410.

FIG. 30 is a cross-section view of a Venturi dispense assembly 520, as is schematically represented in FIG. 13. The Venturi dispense assembly 520, in this embodiment, includes the additive valve 410, vacuum manifold 380, and Venturi body assembly (VBA) 500. The vacuum manifold 380 includes a housing 381. The housing 381 defines an interior volume 382. The interior volume 382 can be described as a vacuum chamber. The bottom of the housing 381 can include a collection pan or housing bottom 381B. The collection pan 381B can be bowled, i.e. concave and geometry, so that additive introduced into the vacuum manifold 380, in an additive flow 601F, can flow to the center of the bottom of the vacuum manifold, so as to flow out via the outflow passage 384P. Relatedly, the vacuum manifold 380 is provided with an outflow fitting 384, through which the outflow passage passes. Additive flow 601F can come into the vacuum manifold 380 via an inflow fitting 383, which includes an inflow passage 383P. The inflow fitting 383 can be attached to the valve 410. The valve 410 can be any suitable valve so as to control the additive flow 601F from the source container 610 into the vacuum manifold 380. A pressure sensor or pressure sensor assembly 370 is provided so as to measure pressure within the vacuum manifold 380—so as to perform pulse processing of the disclosure.

The outflow fitting 384 of the vacuum manifold is attached onto the Venturi body assembly (VBA) 500. Specifically, the fitting 384 can be attached onto a low-pressure connection 505 of the VBA 500. The low-pressure connection 505 can provide an inflow passage 505P.

In the embodiment of FIG. 30, the VBA 500 includes the low-pressure connection 505. The VBA 500 includes throat 501, upstream cone 502, and downstream cone 503. The geometry of the upstream cone 502 can be different from the geometry of the downstream cone 503. For example, the angle of the cone 502 can be different from the angle of the cone 503. In other words, the tapering of the cone 502 can be different from the tapering of the cone 503. Cone 502 can be tapered at a shallower angle versus the taper of cone 503. Alternatively, cone 503 can be tapered at a shallower angle versus the taper of cone 502. As shown in FIG. 30, the VBA 500 can provide or include what can be described as "tee pipe".

The geometry of the throat 501, with cones 502, 503 creates a Venturi effect as water flows through the throat 501, as represented in the flow of base ingredient 602 and FIG. 30. Further details are described below. As result, additive is sucked out of the low-pressure inlet 505, by virtue of a vacuum being created in the low-pressure connection, so as to mix the additive with the flowing water.

The VBA 500 can include a higher pressure connection 504 that connects to a water source, such as shown schematically in FIG. 11. The VBA 500 can include an output connection 506. The output connection 506 can output the generated product (of water+additive) to a receiving container, such as the receiving container 590 schematically shown in FIG. 11.

As noted at tag 383' of FIG. 30, as illustrated, the vacuum manifold 380 provides for one inflow fitting to input one additive. However, any number of inflow fittings can be provided, with each of such inflow fittings being connected to a source container, i.e. to an additive. For example, a container filling apparatus can include four (4) source containers, with respective valves 410, which each feed into the vacuum manifold 380. Such additives can be added into a product in a desired sequential order. For example, a particular formula might call for both additive 1 and additive 4, i.e. call for a blended product with multiple additives. Accordingly, additive 1 can be added into the product in a pulse sequence, followed by additive 4 added into the product in a subsequent pulse sequence. Water (or other base ingredient) can then continue to flow until the dispense event has completed.

Figure 31:
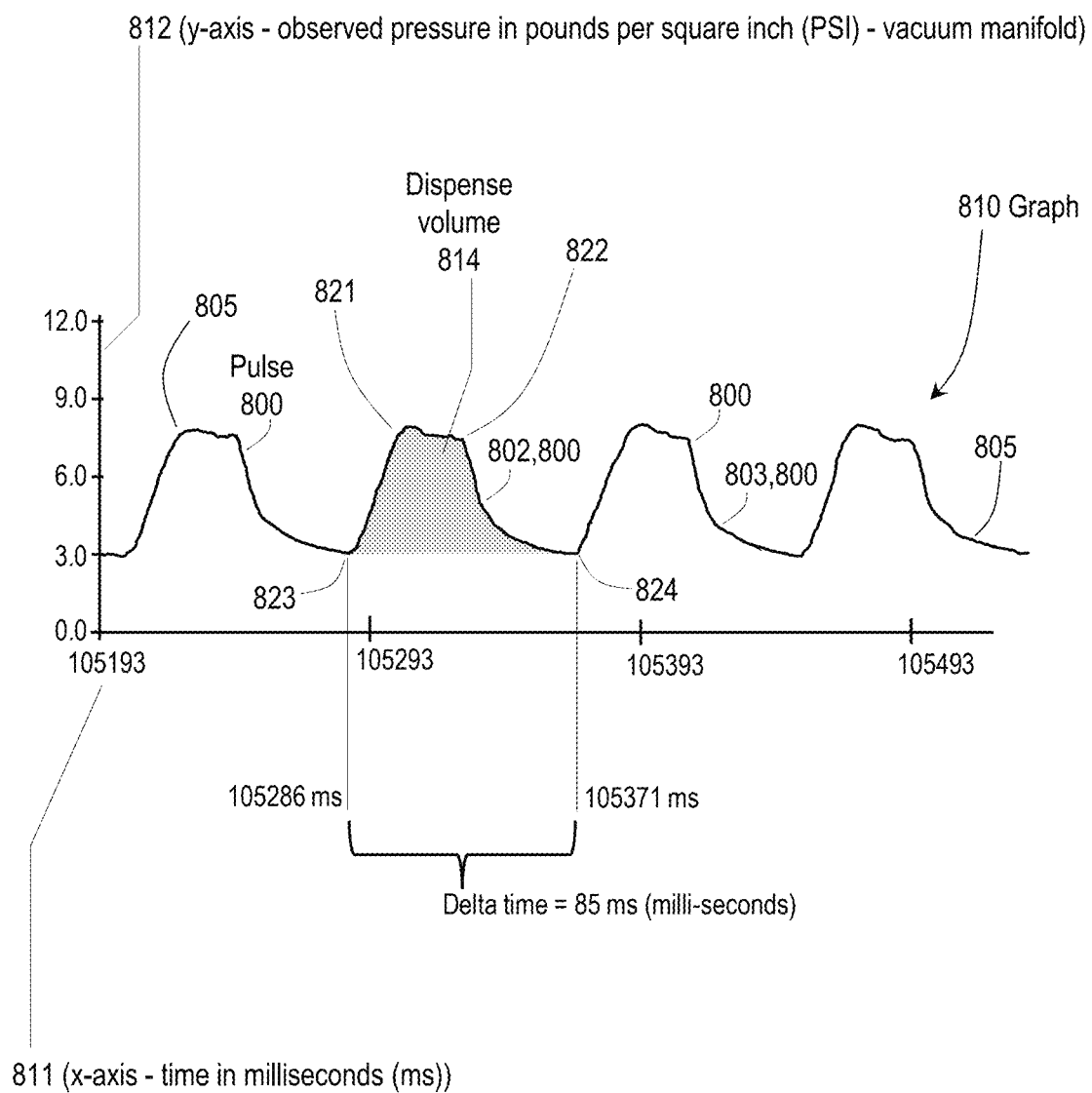
FIG. 31 is schematic diagram showing a graph 810 that shows aspects of pulse processing, in accordance with principles of the disclosed subject matter.

FIG. 31 is schematic diagram showing a graph 810 that shows aspects of pulse processing of the disclosure. The graph 810 includes y-axis 812, which represents observed pressure in pounds per square inch (PSI)), in the vacuum manifold, as measured by the pressure sensor 370. The graph 810 includes X-axis 811. The x-axis represents time in milliseconds (ms).

The graph 810 includes curve 805. Accordingly, the curve 805 represents the observed pressure over time. The curve 805 shows pulses 800, which include pulse 802. Pulse 802 has been highlighted, in the diagram of FIG. 31, so as to show dispense volume 814. That is, dispense volume 814 represents the amount of additive dispensed in pulse 802.

In general, with reference to FIG. 31 and FIG. 11, as the controller 300 opens the additive valve 410, additive will start to flow, so as to result in a pulse of additive. Pressure in the vacuum manifold 380 will increase, as shown, illustratively. In the example of FIG. 31, pressure increases from around 3 PSI to around 8 PSI. In such pulse, additive flows into the vacuum manifold 380, and is sucked out by virtue of the water flow in the VBA 500. Specifically, additive is sucked out via the inflow passage 505P. That is, when there is no additive present in the vacuum manifold, the presence of only air in the vacuum manifold exerts a first pressure as a result of the flowing water through the VBA 500. As a result, the vacuum pressure of around the 3 PSI is generated. However, once the additive is introduced into the vacuum chamber, the presence of the additive results in a second pressure, i.e. less of a vacuum in the pressure manifold 380 as observed by the pressure sensor 370. The pressure observed in the vacuum manifold 380 can be measured and correlated with the amount of additive that has been flowed through the vacuum manifold 380. To explain further, with reference to FIG. 31, curve 805 shows a first low-pressure point 823, as to pulse 802. Such low-pressure point 823 represents a time immediately before the additive valve 410 is turned on, by the controller 300. Once the additive valve 410 is turned on, pressure in the vacuum manifold 380 quickly increases, as shown, so as to be at a first high-pressure point 821. As illustratively shown in FIG. 31, such "ramp-up" of pressure takes about 7 ms, in this example. After the first high-pressure point 821, the observed pressure is maintained at somewhat of a steady-state prior to a second high-pressure point 822, as shown in FIG. 31. Pressure point 822 represents the end of the "active period" of the pulse 802. In accordance with this embodiment, the active period of the pulse 802 corresponds to the time duration at which the additive valve 410 is turned ON. As shown in FIG. 31, the sudden drop in pressure after point 822 occurs because the additive valve 410 has been turned off. However, such "ramp-down" (after the additive valve 410 is closed) represents additional volume of additive that has flowed into the water flow, passing through the VBA 500.

As a result, the curve 805 associated with the pulse 802 represents volume of additive that has been dispensed during the pulse 802. It is this volume of additive that can be processed in the processing of step 857 (FIG. 20) described above-so as to determine if the anticipated volume of additive dispensed was the same as anticipated, less than anticipated, or greater than anticipated. Based on such feedback, adjustment of the next pulse active period can be performed in the processing of steps 860-863 of FIG. 20.

As shown in FIG. 31, after a ramp down of the pressure, a second low-pressure point 824 is generated. Such second low-pressure point 824 thus becomes the first low-pressure point of the next pulse 803. As shown, the time duration or Delta time of the pulse 802, in this example, is around 86 ms. Further details are described below with reference to FIG. 32.

FIG. 32 is a schematic diagram, including graph 810, that shows additional aspects of pulse processing of the disclosure. As described above, the pulse 802 can include a ramp-up period, a core period, and a ramp down period. During the ramp-up period, a ramp-up volume 814A is dispensed. During the core period, a core volume 814B is dispensed. During the ramp-down period, a ramp down volume is dispensed. The ramp-up period, the core period, and the ramp down period collectively constitute a pulse "duration period", as reflected in FIG. 32.

Relatedly, the ramp-up period and the core period collectively constitute a pulse "active period" 814D. Such is the period of time in which the additive valve 410 is open, i.e. turned ON. Further features of the pulse processing will now be described with reference to note 819 of FIG. 32. That is, illustratively, note 819 relates to the manner in which the controller 300 determines the volume dispensed in a pulse. Volume of additive dispensed in a pulse can be based on observed pressure (i.e. observed vacuum pressure) over the course of a time period, multiplied by the time period over which the pressure was observed, multiplied by an adjustment factor. Such an adjustment factor can be utilized so as to adjust or "tune" the processing for different VBAs 500 and/or for different arrangements.

In the example of FIG. 32, the average pressure experienced during the ramp-up period, as observed in the vacuum manifold 380, is 5.6 psi. Such pressure was observed over 17 ms, i.e. (timeclock=105302)−(timeclock=105285). That is, for example:

volume of additive=5.6 PSI·17 ms·(0.0021 ml/(PSI·ms))=0.20 ml where:
5.6 PSI is the average pressure over the time period being considered;
17 ms is the duration of the time period being considered, e.g. the ramp-up period;
0.0021 ml/(PSI·ms) is the adjustment factor, which is applied.

Such processing can be described as being performed at a macro level, in that pressure might be taken over the course of the 17 ms, and based on the observed pressure readings input (over the course of the 17 ms), the average pressure 5.6 psi is determined. However, the processing of the controller, to perform pulse processing, can be performed at a more "micro" level. For example, pressure during the ramp-up period, and in general over the course of the pulse, might be taken every millisecond.

That is, as reflected at 819 in FIG. 32, at a more micro level, the controller can input an observed pressure reading from the vacuum manifold in a predetermined periodic manner, and multiply that pressure by the time period and adjustment factor. For example, the controller can input an observed pressure reading from the vacuum manifold every 1 ms. Based on such time period, the observed pressure, and the adjustment factor, the controller can determine the volume of additive that has been added into the flow of water (over such time period). That is, the controller can determine the area under the pressure curve using integration.

Over the course of a pulse, the controller might input pressure at time intervals as desired and/or upon predetermined pressure events being observed. The controller might input pressure every 0.1 ms, 0.2 ms, 0.3 ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2.0 ms, 3.0 ms, 4.0 ms, 5.0 ms, 6.0 ms, 7.0 ms, or any other period of time as may be desired. It is appreciated that as the pressure is taken more often, over shorter time periods, accuracy of the processing can increase. That is, the controller can more accurately determine the amount of additive that was dispensed over the course of a pulse. However, relatedly, it is appreciated that as the pressure is taken more often, processing power or bandwidth required to perform such processing increases. Also, it is appreciated that the input of pressure might not only be dictated by some time periodicity. Also, the controller can be programmed to input pressure upon some sequence or pattern of pressure inputs or readings being observed.

Also, the periodicity of pressure input over the course of a pulse need not be constant. For example, pressure over a ramp-up period could be taken every 0.1 ms. However, once the controller observes a predetermined pressure, indicating that the core period has been attained, then the controller might take pressure readings every 0.5 ms, for example. The periodicity of pressure input readings could also be varied upon the end of the pulse active period 814D being attained. For example, after the pulse active period is attained, the controller might take pressure readings every 0.3 ms (in the ramp down period). In an embodiment, pressure readings might be taken more often in the ramp-up period and the ramp down period, in that the variability of pressure in such periods is greater, as compared to the core period. That is, the core period can provide a more steady state, such that pressure inputs may not be required as often as in the ramp-up period and the ramp down period.

With regard to length of time of the pulse active period 814D, such pulse active period 814D can be based on some predetermined time period. However, in some embodiments, the pulse active period can be based on observing pressure in the vacuum manifold. Such observed pressure can include the controller observing pressure thresholds and/or observing pressure patterns, for example. For example, during the course of a pulse, and with reference to the graph 810 of FIG. 32, the controller can be programmed to (a) determine that pressure of 7.8 psi has been attained (indicating that first high pressure point 821 is attained), and (2) upon input of pressure less than 7.5, turn off the additive valve-so as to terminate the pulse active period. That is, the controller can determine the occurrence of the second high pressure point 822, shown in FIG. 32, based on a pressure threshold, as opposed to the running of a particular time period.

Figure 33:
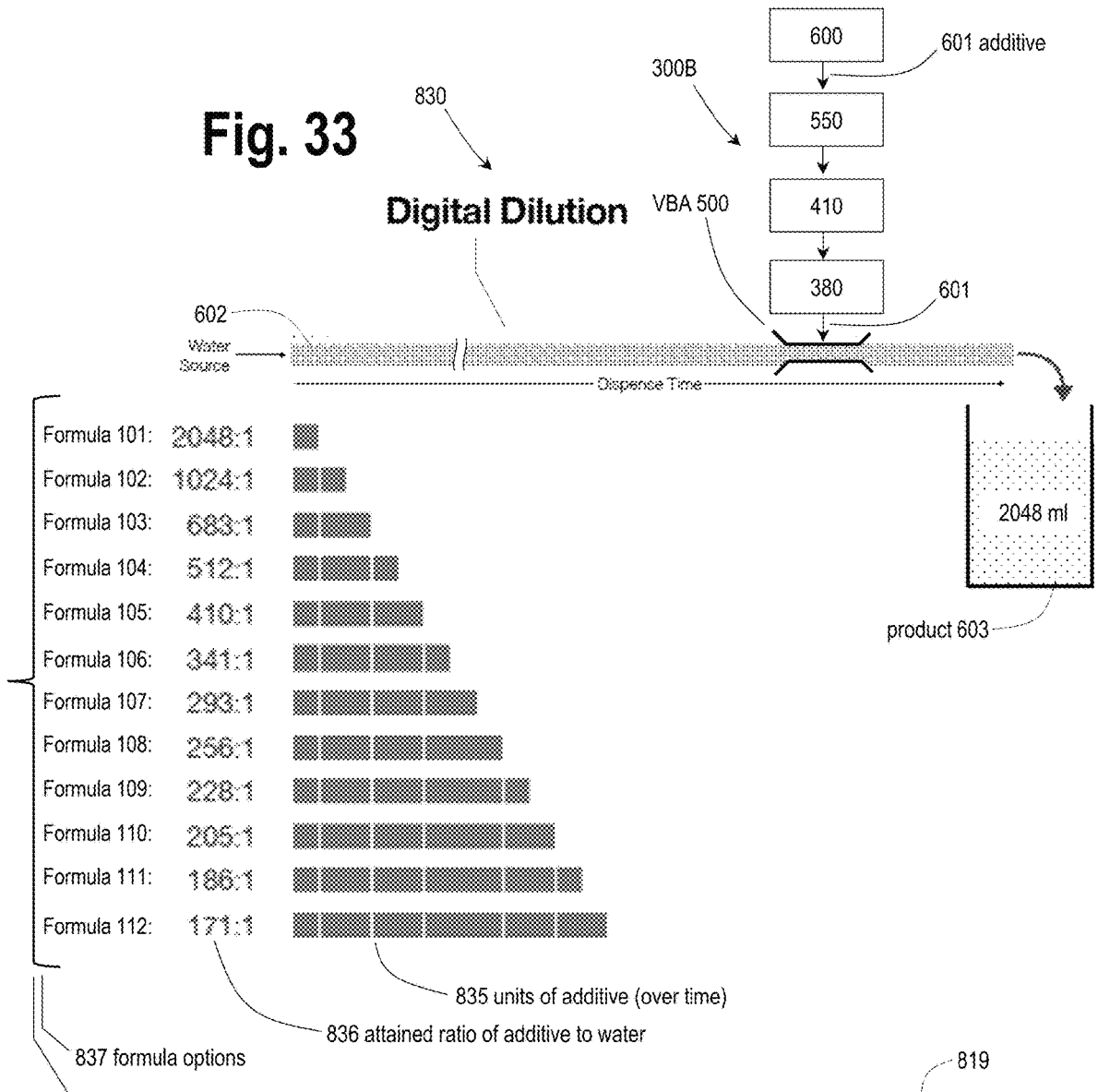
FIG. 33 is a schematic diagram 830 showing further aspects of pulse processing.

FIG. 33 is a schematic diagram 830 showing further aspects of pulse processing. FIG. 33 shows a CFA 300B adding additive into a flow of water 602 from a water source. The pulse processing of the disclosure can be described as digital dilution. FIG. 33 shows various formulas 101-112, i.e. formula options 837. A particular additive can be mapped or associated with a particular formula. For example, cleaning additive XYZ could be associated with formula 102. Such formula could be contained, i.e. stored, in a data indicator mounted on the source container of the additive. Also, a user might select a particular formula from a panel of buttons on a kiosk or other user interface. Also, a pop-up menu might be presented to the user, by which the user selects a particular formula. A particular formula can be selected in any of a wide variety of manners or be pre-associated with a particular additive or concentrate.

As shown in the diagram 830, each formula option 837 is associated with a ratio of additive to water, i.e. a ratio 836. Each formula option is also associated with units of additive over time, i.e. units 835. The units 835, graphically represented in the diagram 830, can be represented in a data format such that the controller knows the attributes to utilize in execution of each formula. Illustrative attributes for formula 102 are shown in FIG. 33.

In illustrative pulse processing, with formula 102, 2 ml of additive is dispensed in two pulses. Each pulse has an active period of 41 ms, with a base dispense time of 86 ms. (see related FIG. 32). Water is output, i.e. flowed through the VBA 500, at a rate of 350 ml/second. Accordingly, the time to output 2048 ml of water=5.85 seconds=base dispense time, i.e. total dispense time. Accordingly, operating parameters for formula 2 are:

base dispense time=5.85 seconds (i.e. how long the dispense of product will take in total);
first pulse: (active period=41 ms), (pulse duration period=86 ms);
2nd pulse: (active period=41 ms), (pulse duration period=86 ms).

Note, the active period for the second pulse can be adjusted based on pressure feedback observed with first pulse—such adjustment can be performed in step 861, 863 of FIG. 20. A sequence of pulses to add an additive can be described as a dispense sequence. Also, pulse duration, and in particular active period, can vary between different pulses in a dispense sequence. Such a variation in pulse duration can result from an adjustment to a pulse, based on observed variation in one or more prior pulses. Also, such variation in pulse duration can the built into a particular formula. For example, a last pulse that is performed for a formula may well be shortened as compared to prior pulses. Such is due to the fact that the active duration in the final pulse a shortened so as to obtain the desired amount of additive being added into the product. Accordingly, FIG. 33 shows various additional features of pulse processing, including additional features relating to illustrative formulas. Hereinafter, further aspects of pulse processing are described.

Figure 34:
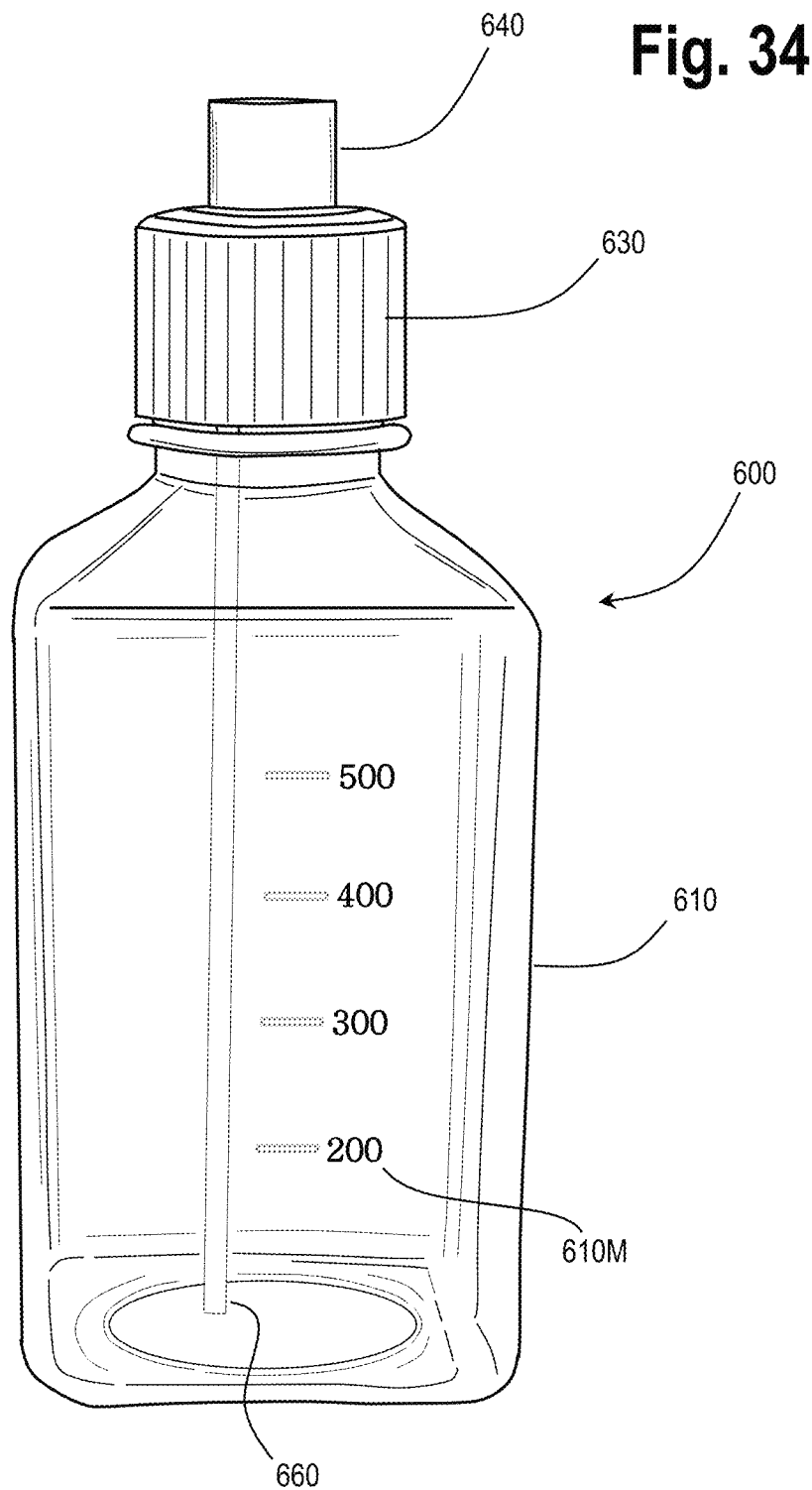
FIG. 34 is a front perspective view of a container assembly 600, in accordance with principles of the disclosed subject matter.

FIG. 34 is a front perspective view of a container assembly 600, in accordance with the disclosure. The container assembly 600 includes a source container 610, an attachment collar 630, and a connection assembly 640. As described herein, the connection assembly 640 is adapted to interface with an attachment adaptor 550. The attachment collar 630 can include a vent tube 660. As described above, the vent tube 660 can provide for the internal volume of the source container 610 to be in communication with the ambient environment. The source container 610 can be provided with various markings 610M. The markings 610M can show the fill level of the container. As shown, the markings show the fill level when the container is in the upright position. Markings can also be provided so as to show the fill level when the container is in an inverted position.

Figure 35:
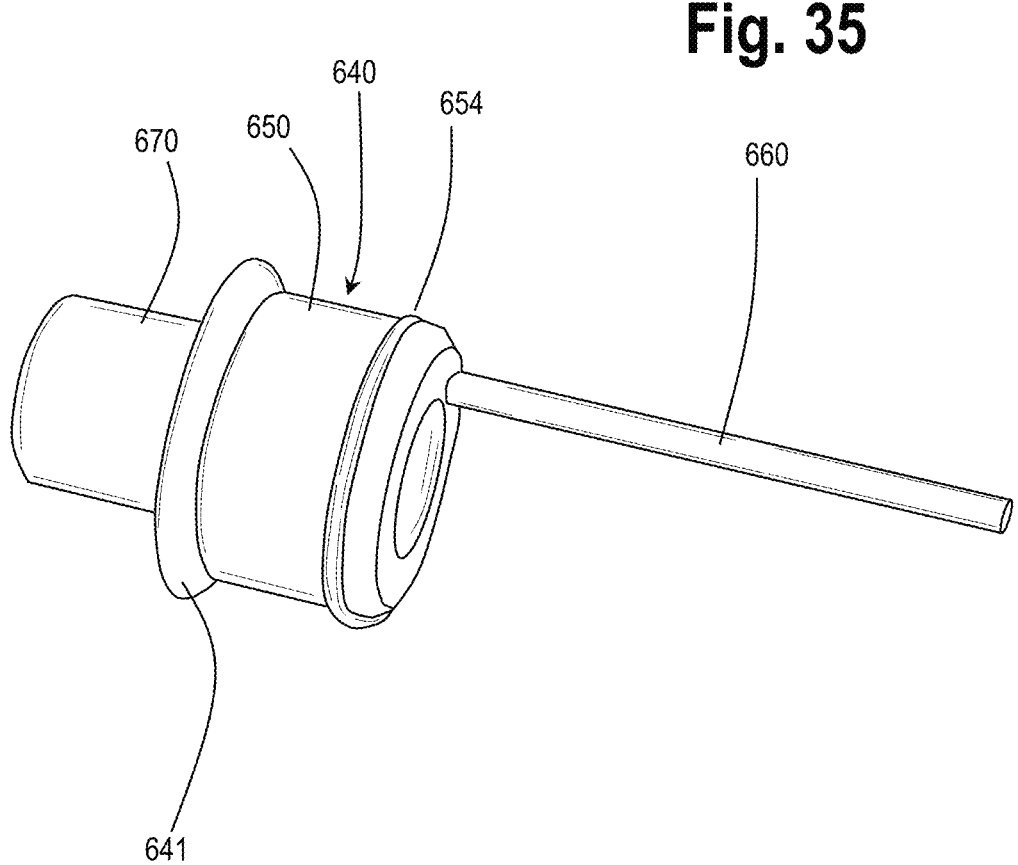
FIG. 35 is a front perspective view of a connection assembly 640, in accordance with principles of the disclosed subject matter.

FIG. 35 is a front perspective view of a connection assembly 640, which can be the same as or similar to the connection assembly 640 illustrated in FIG. 34, as well as FIG. 27, for example. As shown, the connection assembly 640 can include the vent tube 660. The connection assembly 640 can also include bottle attachment collar 650 that can be received into the opening of a source container containing additive. The bottle attachment collar 650 can be provided with an O-ring or other gasket mechanism so as to provide a seal between the connection assembly 640 in the source container. The connection assembly 640 can include an adapter collar 670 that is configured to engage with an attachment adaptor 550. The connection assembly 640 can also include the engagement collar 641. The engagement collar 641 is adapted to be sandwiched and held between the top of a source container and an attachment collar 630, as described above. FIG. 36 is a cross-section view of a Venturi body assembly (VBA) 500, in accordance with principles of the disclosed subject matter. As noted at 505', pulse processing can be performed using the VBA 500, so as to dispense additive into a water flow in a controlled manner. Such pulse processing can be performed by measuring pressure in a vacuum manifold that is provided in the additive flow into the VBA 500. As illustrated at 505', as a result of the flow of water 602, low pressure occurs in the throat 501 (of the VBA 500). Such low pressure can occur due to the increased speed of the water flowing through the throat 501. The low pressure in the throat creates a vacuum in the low pressure inlet 505, which draws the additive into the flow. FIG. 36 shows relationships between: P1=pressure in the high pressure connection; P2=pressure in the low pressure (suction) throat; V1=velocity in the high pressure connection; V2=velocity in the low pressure (high velocity) throat; and ρ=density of the fluid. As shown in FIG. 36 and described above, the geometry of upstream cone 502 can be different as compared to the downstream cone 503. As otherwise described herein, the geometry of the VBA 500, the size of the VBA 500, the pressure at which water flows into the VBA 500, and other attributes of the arrangement can vary the amount of additive that is drawn into the water flow in operation. However, such a variance can be adjusted utilizing an adjustment factor. Such adjustment factor is described above with reference to FIG. 32.

The adjustment factor for a particular arrangement of a CFA 300B can be established by ascertaining a relationship between additive flow and a pressure curve, which corresponds to such additive flow. That is, once a physical arrangement is set up, a test source container 610 can be utilized using a test additive. Additive can be mixed into a known water flow, passing through the VBA 520 of the arrangement. In such a pulse processing trial, the water flow, i.e. the base ingredient flow, can be performed for some predetermined amount of time. The additive can be mixed in using a series of pulses using predetermined active period and predetermined pulse duration, for each pulse. Such attributes might be the same for each pulse or different. Once the flow of base ingredient has been concluded, testing can be performed so as to measure the amount of additive that was input into the resulting product. Also, the corresponding pressure curve can be assessed to determine the "area under the curve" that was observed in the various pulses. Thereafter, the adjustment factor can be generated so as to correlate the area under the curve with the actual additive that was dispensed in the pulse processing trial. Accordingly, an adjustment factor for a given arrangement can be generated.

Hereinafter, further features of the disclosure will be described.

Figure 37:
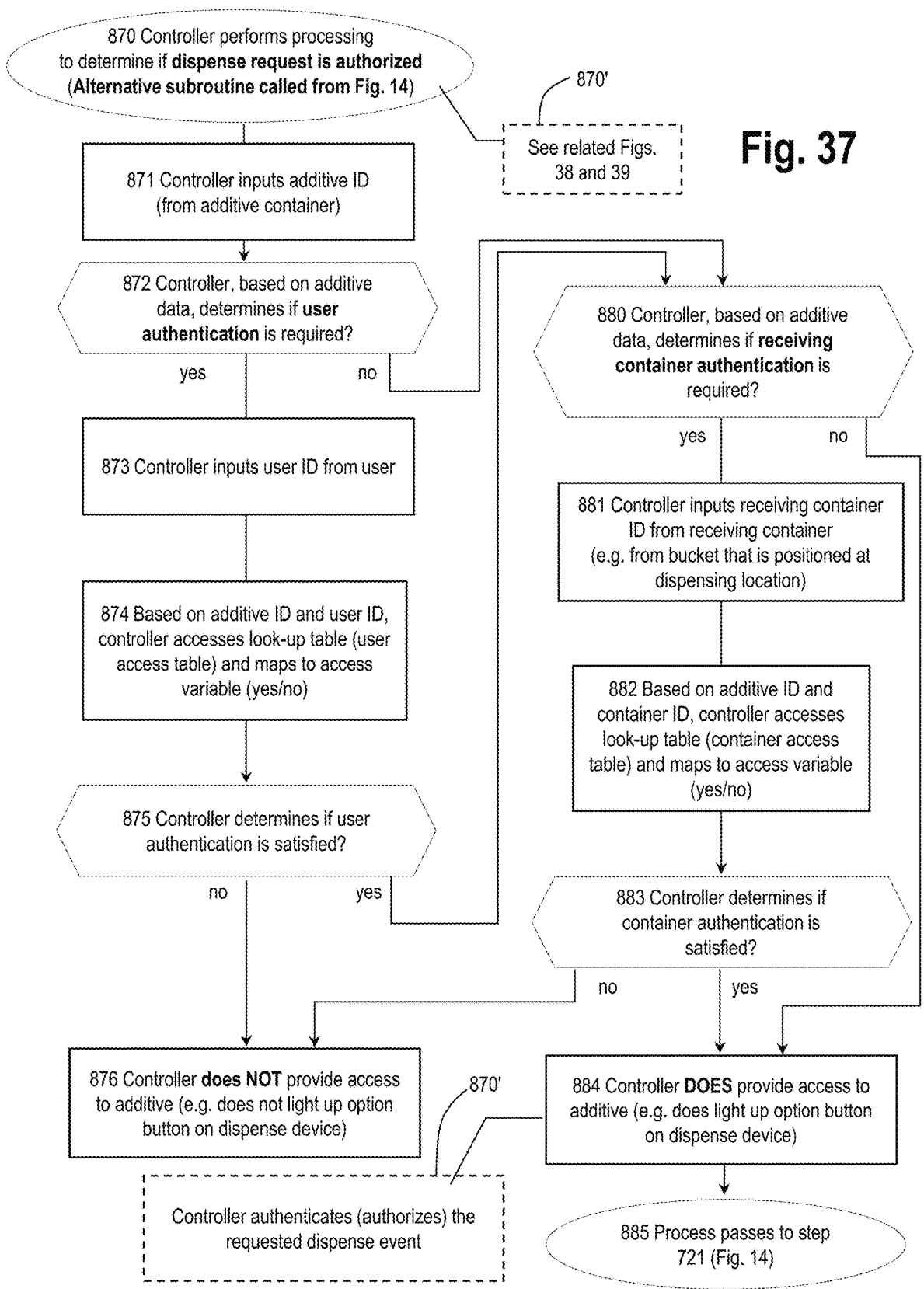
FIG. 37 is a flowchart showing in further detail a subroutine 870, controller performs processing to determine if a dispense request is authorized, as can be called from the processing of FIG. 14, in accordance with principles of the disclosed subject matter.
Figure 39:
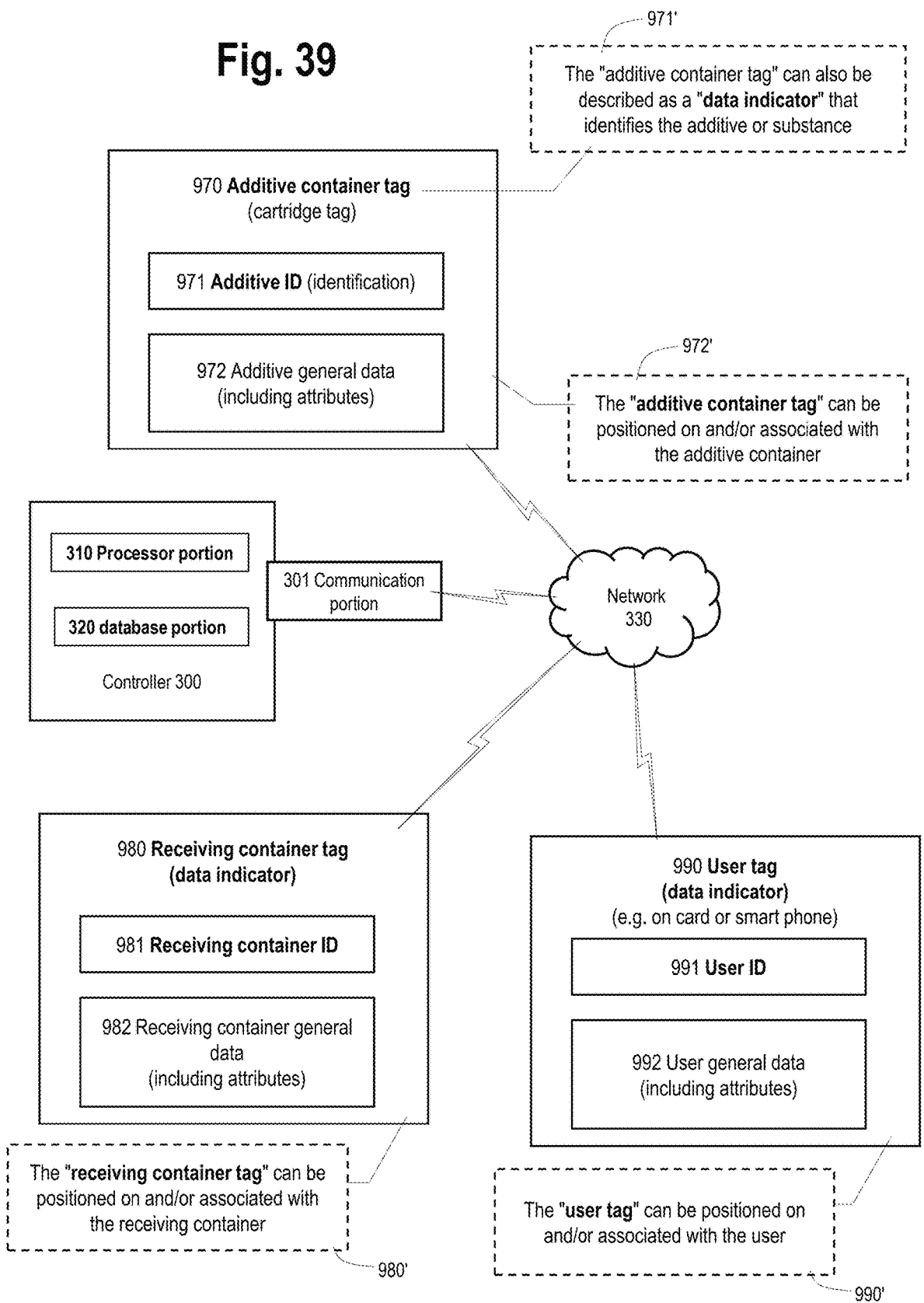
FIG. 39 is a block diagram showing further features of the dispensing system, in accordance with principles of the disclosed subject matter.

As described above, with reference to FIG. 14, for example, the controller 300 can perform processing to determine if a dispense request is authorized. Various disclosure is provided above regarding methodologies by which a dispense request is authorized. FIG. 37 is a flowchart showing in further detail a subroutine 870, controller performs processing to determine if a dispense request is authorized, as can be called from the processing of FIG. 14. In particular, the processing of FIG. 37 illustrates alternative processing that can be performed to authenticate a dispense request. As noted at 870', FIGS. 30 and 39 are related to the processing of FIG. 37 and described below. The processing of FIG. 37 can be performed by the dispense control portion 313, of FIG. 12, for example.

As shown, the process of FIG. 37 starts in step 870 and passes onto step 871. In step 871, the controller inputs additive identification (ID) from an additive container, from which additive is requested so as to execute a dispense request. Then, in step 872, the controller, based on the additive data, determines if user authentication is required. The additive data can be pulled from a data indicator on the source container of the additive. The additive data can be retrieved based on the additive ID. If yes in step 872, the process passes onto step 873. In step 873, the controller inputs user data from the user. Then, in step 874, based on the additive ID and the user ID, the controller accesses a lookup table, which can be described as a user access table. The controller maps to an access variable based on the additive ID and the user ID. The access variable can be in the form of a yes/no variable. Then, in step 875, the controller determines if user authentication is satisfied. That is, was the variable, which was mapped to in step 874, a yes value or a no value. If no, then the process passes from 875 onto step 876. In step 876, the controller does not provide access to the additive. For example, such determination could result in the controller not lighting up an option button to dispense the particular additive, or the controller otherwise precluding access to a particular additive.

Alternatively, a yes can be rendered in step 875. Such a determination means that user authentication was required for the requested dispense, and indeed that user authentication requirement was satisfied. The processing then proceeds to determine if a receiving container authentication is also required. That is, if the determination of step 875 renders a yes, then the processing passes onto step 880.

With further reference to FIG. 37, the determination of step 872 may have rendered a no. That is, the controller determines that user authentication is not required. In such determination, the processing also passes onto step 880.

In step 880, the controller, based on additive data, determines if receiving container authentication is required. If no, then the process passes onto step 884. In step 884, the controller does provide access to the additive. That is, as reflected at 870', the controller authenticates and/or authorize the requested dispense event.

On the other hand, a yes can be rendered in step 880. Accordingly, the processing passes onto step 881. In step 881, the controller inputs the receiving container ID from the receiving container. Then, in step 882, based on the additive ID and the container ID, the controller accesses a lookup table, which can be described as a container access table. The controller maps to the access variable that corresponds to the additive ID in the container ID. Such a variable can be in the form of a yes or no value. Then, in step 883, the controller determines that the container authentication is satisfied. That is, was the value rendered in step 882 a yes value or a no value. If no, the process passes onto step 876, and access is not provided.

Alternatively, the determination of step 883 can render a yes. As a result, the process passes from step 883 onto step 884. As described above, in step 884, the controller does provide access to the additive. Then, after step 884, the process passes onto step 885. In step 885, the process passes to FIG. 14, step 721. Processing then continues on as described above.

FIG. 38 is a schematic diagram showing database 900, which can be used in the processing of FIG. 37. The database 900 includes an access control table 910', a user access table 930', and a container access table 950'. The database 900 can be provided in the dispense database 323 of FIG. 12, for example.

The access control table 910', includes a plurality of data records 910. Each data record can include a plurality of fields 920. The fields 920 can include field 921 and field 922. Data record 910 can store the primary key (PK) of the access control table 910'. Such PK can provide access to the table by the controller 300.

As shown in FIG. 38, data record 912 includes a foreign key (FK) so as to provide access, by the controller, to the user access table. Data record 913 includes an FK so as to provide access, by the controller, to the container access table. Accordingly, in the processing of FIG. 37, the controller can use the PK of the access control table, in data record 911, so as to access the database 900. Then, the controller can use the FKs in data records 912, 913 so as to perform the processing of step 874 and/or step 882. That is, the controller can access the user access table and/or the container access table.

As shown in FIG. 38, the user access table 930' includes a plurality of data records 930. The data records 930 include data records 931, 932, 933, 934, 935, 936, and 937. Each data record includes a plurality of fields 940. The fields 940 include fields 941, 942, 943, 944, and 945. Data record 931 includes the PK for the user access table 930'. Such PK allows the table 930' to be mapped to the table 910'.

The table 930' includes data record 932. Data record 932 includes fields that store, respectively, additive IDs for different additives. Data record 933 includes fields that store, respectively, access variables for a user, user_101, for each of the additives. For example, data record 933, in field 944, stores a value of "yes" for User_101 and additive_C. Accordingly, upon a dispense request coming in from user 101 for a product that contains additive C, the processing of step 874, in FIG. 37, would return a yes value. In similar manner to data record 933, data records 934-937 include fields that store, respectively, access variables for additional users, for each of the listed additives. Accordingly, the user access table 930' provides a lookup table utilized in step 874 of FIG. 37.

As shown in FIG. 38, the container access table 950' includes a plurality of data records 950. The data records 950 include data records 951, 952, 953, 954, 955, 956, and 957. Each data record includes a plurality of fields 960. The fields 960 include fields 961, 962, 963, 964, and 945. Data record 951 includes the PK for the container access table 950'. Such PK allows the table 950' to be mapped to the table 910'.

The table 950' includes data record 952. Data record 952 includes fields that store, respectively, additive IDs for different additives. Data record 953 includes fields that store, respectively, access variables for a container, container_101, for each of the additives. For example, data record 953, in field 964, stores a value of "yes" for container_101 and additive_C. Accordingly, upon a dispense request coming in for container 101 for a product that contains additive C, the processing of step 882, in FIG. 37, would return a yes value. In similar manner to data record 953, data records 954-957 include fields that store, respectively, access variables for additional containers, for each of the listed additives. Accordingly, the container access table 930' provides a lookup table utilized in step 882 of FIG. 37.

FIG. 39 is a block diagram showing further features of the dispensing system of the disclosure. In particular, FIG. 39 shows further aspects of the data indicators utilized in the processing of the disclosure. As described above, the controller 300 can include a processor portion 310 and the database portion 320. The controller 300 can include a communication portion 301 that communicates with network 330.

The controller 300 can communicate with an additive container tag 970. The additive container tag 970 can be positioned on a source container 910. The additive container tag 970 can provide or constitute the "data indicator" described above, as reflected at note 971'. The additive container tag 970 can include an additive ID 971 that uniquely identifies the particular additive. The additive container tag 970 can also include additive general data 972, which can include various attributes of the additive. Such attributes can include the name of the additive, amount of additive in the source container, expiration date of the additive, limitations on how much additive can be added into a product, data regarding which users are allowed or not allowed to use the additive, data regarding which containers the additive is allowed or not allowed to be output to, and other relevant data related to use of the additive in a product. As noted at 972', the additive container tag 970 can be positioned on and/or associated with an additive container. For example, the additive container tag 970 can be in the form of an RFID tag that is adhesively attached onto a source container 610.

The controller 300 can communicate with a receiving container tag 980. The receiving container tag 980 can be positioned on a receiving container 590. The receiving container tag 980 can provide or constitute the "data indicator" described above. The receiving container tag 980 can include a receiving container ID 981 that uniquely identifies the particular receiving container. The receiving container tag 980 can also include receiving container general data 982, which can include various attributes of the receiving container. Such attributes can include the capacity of the receiving container, what additives are compatible with the construct of the receiving container, the expected lifespan of the receiving container, designated areas of a facility in which the receiving container can be utilized, designated stations at which the receiving container can be utilized, and other relevant data related to use of the receiving container. As noted at 980', the receiving container tag 980 can be positioned on and/or associated with a receiving container. For example, the receiving container tag 980 can be in the form of an RFID tag that is adhesively attached onto a receiving container 590.

The controller 300 can communicate with a user tag 990. The user tag 990 can be positioned on or associated with a user 590. The user tag 990 can provide or constitute the "data indicator" described above. The user tag 990 can include a user ID 991 that uniquely identifies the particular user. The user tag 990 can also include user general data 992, which can include various attributes of the user. Such attributes can include the name of the user, position of the user, length of employment of the user, which additives the user is authorized to utilize, the quantity of additives that the user is authorized to use, time windows or ranges in which the user is authorized to use particular additives, and other relevant data related to use of the user. As noted at 990', the user tag 990 can be positioned on and/or associated with a user. For example, the user tag 990 can be in the form of a magnetic card that the user carries or data on the user's cell phone, which is input via the network 330 to the controller.

Figure 40:
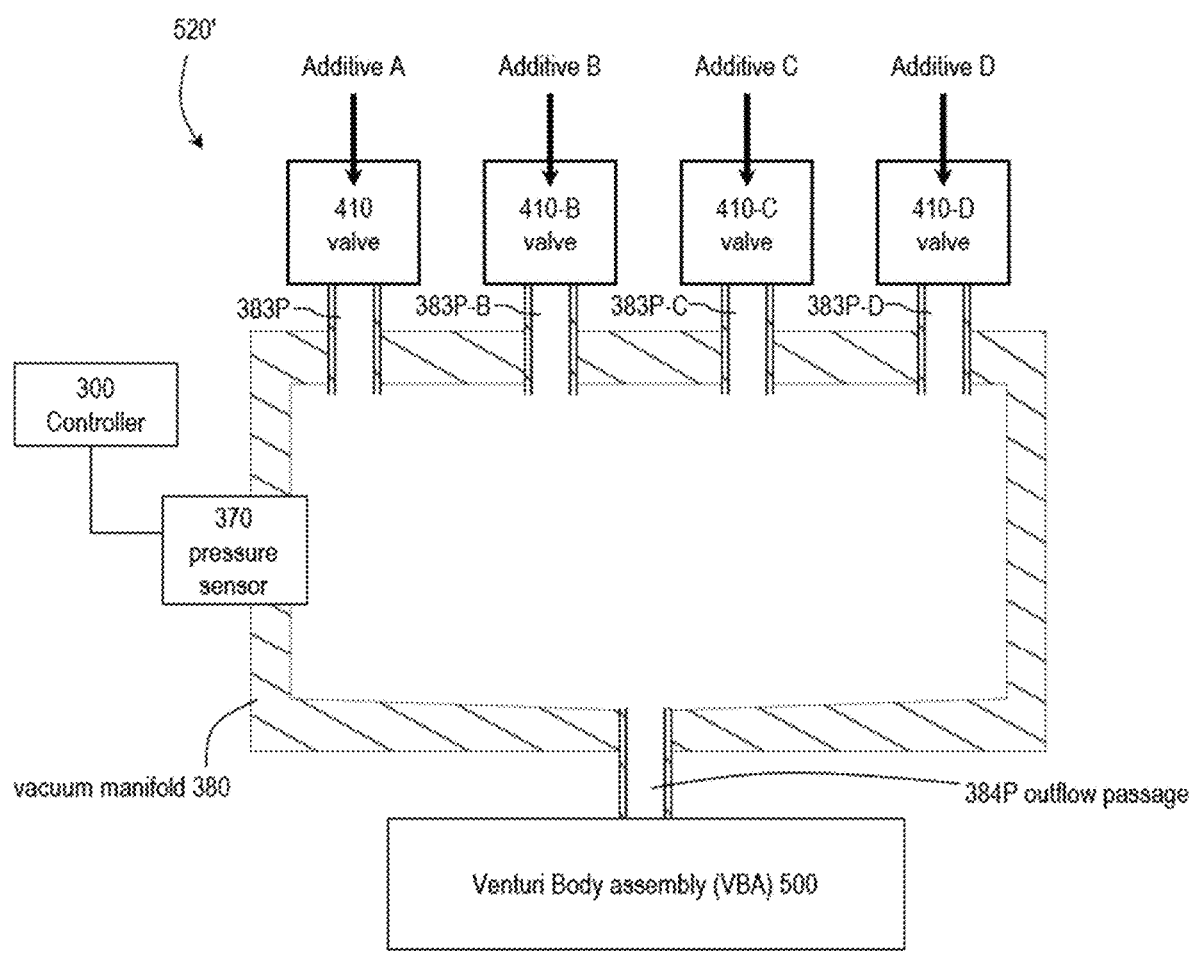
FIG. 40 is a schematic diagram of a dispense assembly, in accordance with principles of the disclosed subject matter.

FIG. 40 is a cross-section view of a Venturi dispense assembly (VBA) 520', in accordance with an embodiment of the disclosure. As described above, the apparatus of the disclosure can blend ingredients from multiple source containers, each containing a respective additive or additive ingredient. FIG. 40 shows such an arrangement. As shown, the vacuum manifold 380 can be connected to four (4), for example, source containers, each containing an additive. Valve 410 can control flow (into the vacuum manifold 380) of additive A, via an inflow passage 383P. Valve 410-B can control flow (into the vacuum manifold 380) of additive B, via an inflow passage 383P-B. Valve 410-C can control flow (into the vacuum manifold 380) of additive C, via an inflow passage 383P-C. Valve 410-D can control flow (into the vacuum manifold 380) of additive D, via an inflow passage 383P-D.

As described herein, dispense of an additive, e.g. additive A, can be performed by opening and closing valve 410 while water (or other base ingredient) is flowed through the VBA 500.

For example, in a dispense event, water can be flowed for a period of time to dispense 400 milliliters (ml) of water. During such time, 4 pulses of additive A can be performed in sequence, so as to dispense 4 ml of additive A, i.e. each pulse dispenses 1 ml. Such provides a ratio of additive A to water of 1:100. If one of the pulses of additive did not delivery the desired volume (providing a deficiency or excess), the time of a subsequent pulse time can be adjusted so as to counter such deficiency or excess, as described in detail above. There can be an allocated time window for each pulse, i.e. a time window in which the particular pulse is to be performed. Once a pulse has delivered the volume of ingredient mandated, i.e. the target volume for that particular pulse (as adjusted based on delivery of prior pulses), then the additive is turned OFF, and water continues to flow during such time window, i.e. until the next pulse is scheduled to be performed, if there is a next pulse.

In this example, during the time of flowing the 400 ml of water, and after the pulsing to dispense additive A, additive B can be dispensed. For example, additive B can be dispensed in 3 pulses of additive B (performed in sequence), so as to dispense 3 ml of additive B, i.e. each pulse dispenses 1 ml. Such provides a ratio of additive B to water of 0.75:100, i.e. 3:400. If one of the pulses of additive B did not delivery the desired volume (providing a deficiency or excess), the time of a subsequent pulse time can be adjusted so as to counter such deficiency or excess. Accordingly, in such example, a blended product can be created that includes additive A and additive B. Such a product can be output by a user making a selection (e.g. pushing a button), and that selection being mapped to a particular formula. Such formula contains the data that the controller 300 uses so as to deliver the desired product. Such formula can be presented in any suitable format so as to represent the data needed for the controller to perform the dispense. If 800 ml of water is desired to fill a receiving container, then the above described dispense of additive A and additive B with water can be repeated, and then subsequently repeated, as desired. Note, as described above, the pulsing of additive can be performed at the initial time of a dispense event, and then water flowed thereafter-so as to provide the total water content desired. Accordingly, a user may be limited in the user's ability to terminate the dispense event early, in that such an early termination would "throw off" the additive to water ratio. If a user is given the ability to terminate early, e.g. a mop bucket is overflowing, a message or warning might be communicated to the user that the ratio in the requested product is off, i.e. incorrect. Additionally, it is appreciated the pulsing of additive into the water flow, or other base ingredient, might be performed at the end of the dispense event or water flow, or at any other time as desire. It may be desired to pulse additive at the beginning of a pulse event so as to "flush" out lines, e.g. the outflow passage 384P, to prepare for some later dispense. Pressure monitoring can be performed during the entirety of a dispense event, including when only water is flowing. Pressure observed in the vacuum manifold 380 can be used to perform the various processing as described above. Pressure variances can be used to detect problems in a dispense apparatus. Pressure in the vacuum manifold 380 can be used to detect when a source container, of additive, is empty or nearing an empty state. That is, with reference to the graph 810 of FIG. 31, the observed pressure, i.e. the graph 810, may show "spikes" as the observed pressure sporadically increases as the final portion of additive in a source container is exhausted, i.e. which might be described as a "slurping" event. This can result since, as the additive is depleted, the vacuum manifold/pressure sensor 370 may start to be exposed to the ambient environment, via vent tube 660, e.g., and thus the vacuum manifold/pressure sensor 370 may start to be exposed to atmospheric pressure, e.g. 14.7 PSI.

Relatedly, a controller may not allow a dispense event, if the controller is tracking consumption data of the particular ingredient—and the controller knows that the source container is almost empty.

Various features of the systems and methods of the disclosure are described above. It is appreciated that known devices and mechanisms can be used in the apparatus of the disclosure, including known valves, connection structure, tubing arrangements, and pressure sensors, for example. Also, connection structure or fittings described as providing a first connection as described herein may be used to provide another connection. Relatedly, the male-female connection can be reversed. That is, if a first part is provided with a female fitting and a second part provided with a male fitting, the arrangement can be flipped so that the first part is provided with a male fitting and a second part provided with a female fitting. Components described herein can be suitably electrically powered, as desired, such as by an alternating current (AC) source and/or a battery(s), for example.

This disclosure relates to pulse processing utilizing a Venturi body assembly (VBA) and various related features and processing. This disclosure is related to the disclosures of U.S. patent application Ser. No. 10/348,646 filed Jan. 21, 2003 (now U.S. Pat. No. 6,968,876 issued Nov. 29, 2005); U.S. patent application Ser. No. 11/288,525 filed Nov. 29, 2005 (now U.S. Pat. No. 7,237,577 issued Jul. 3, 2007); and U.S. patent application Ser. No. 11/289,024 filed Nov. 29, 2005 (now U.S. Pat. No. 7,284,576 issued Oct. 23, 2007), the disclosures of which are all incorporated herein by reference in their entirety.

Any of the features described in such disclosures can be used in conjunction with the features described herein.

Accordingly, this disclosure relates to a container filling apparatus that has at least one source container containing a substance, a reading mechanism capable of reading data from a data indicator on a receiving container wherein the data indicator identifies data about the receiving container. A controller is connected to the reading mechanism wherein the controller is programmed to determine when a dispensing condition is satisfied, based on the data from the receiving container, and to generate a signal when the dispensing condition is satisfied. A dispenser is provided for discharging the substance into the receiving container in response to the signal from the controller.

In an alternate embodiment, the disclosure includes a dispensing apparatus having a plurality of source containers each containing a substance wherein each of the source containers has at least one data indicator containing data. The apparatus also has a reading mechanism that reads the data on the source container data indicators and data from a receiving data indicator on a receiving container for receiving the substance, and transmits the data to a controller. The controller is programmed to process the data received from the source container data indicators and receiving container data indicator, and operates at least one of the source containers to discharge the one or more substance into the receiving container in response to a determination that the data from the receiving container data indicator matches or corresponds to data from the at least one source container data indicator.

In an alternate embodiment, the disclosure includes a method of dispensing a substance into a receiving container. The steps of the method include reading a data indicator on the receiving container, reading a data indicator on one or more source containers wherein the source containers each contain a substance, operating a controller to determine if the data from the indicator on the source container matches the data from the indicator from the receiving container, and operating a dispensing system to discharge a substance from at least one of the source containers into the receiving container in response to a determination that the source container data indicator corresponds to the receiving container data indicator.

All data can be downloadable via traditional memory devices such as floppy or compact discs, transmitter/receiver devices, or infrared technology to "PALM"™ or similar portable computer peripherals to a main server database. The data will allow for the measurement and management of key statistics. In an alternate embodiment, the apparatus includes a unit for reading/scanning the data indicators on the various components of the apparatus. This unit can be attached to the apparatus or be hand-held.

Processing can include inputting data from a receiving container data indicator that indicates the position of the receiving container with respect to the source container. A dispensing condition can be deemed satisfied when the receiving container is properly positioned.

Various dispensing conditions can be assessed prior to performing a dispensing event. A dispensing condition can be constituted by a match between data from a data indicator and data stored for access by the controller. Processing of the disclosure can include mixing a chemical concentrate with water or other base ingredient. A dispensing apparatus can be provided that is configured to accept source containers of different sizes so that a source container can be replaced with a differently sized source container. The controller can be programmed to record amount of the substance dispensed, the number of receiving containers filled, the frequency with which receiving containers are filled, and/or the amount of substance dispensed at a time. The controller can be programmed to track the frequency of filling a receiving container and to limit the frequency with which the receiving container can be filled. The controller can communicate data to a master control device. A reading mechanism, to read data indicators, can be movable with respect to a dispensing apparatus, to which such reading mechanism is connected.

A dispensing apparatus of the disclosure can be adapted to mix multiple substances and dispense a mixture into a container. Multiple substances can be dispensed into a mixture in sequence, using pulse processing of the disclosure respectively with each additive to be dispensed into a mixture. The controller can be programmed to record the personal information about an operator operating a dispensing apparatus of the disclosure. The controller can be programmed to record the amount of substance discharged per operation of the dispenser.

A reading mechanism of the disclosure can be capable of reading data from multiple data indicators on a receiving container, when the data indicators identify data about the receiving container. Each source container can have a data indicator and each of multiple data indicators, of a container filling apparatus, can be used to associate the receiving container with one of the multiple source containers. The controller can be programmed so as to limit the number of receiving containers processed.

A plurality of the chemical substance applicators of the disclosure can be introduced into a facility, the chemical substance applicators having data indicators. The movement of chemical substance applicators within the facility can be controlled by monitoring data from the chemical substance applicators using the reading mechanism. The movement of chemical substance applicators within the facility can be controlled by monitoring data from the chemical substance applicators at an exit of the facility using a reading mechanism. One or more reading mechanisms can be positioned at one or more locations within the facility, the reading mechanism being capable of reading data from the data indicators on the chemical substance applicators.

One or more reading mechanisms can be connected to a recording mechanism, and detection of a chemical substance applicator by a reading mechanism at the one or more exits of the facility is recorded on the recording mechanism. The reading mechanisms for reading the data can be an RF receiver, and the data indicators on the chemical substance applicators can be RF chips. This disclosure relates to a system for filling receiving containers. According to this disclosure there is provided a container filling apparatus for topping off receiving containers that are partially filled with an initial amount of a solution of a concentrate and a diluent. The apparatus includes a dispenser for discharging additional concentrate into the receiving container, the dispenser being connected to a source of the concentrate. A controller is connected to the concentrate dispenser, the controller being programmed to determine the amount of the solution initially in the partially filled receiving container, and to discharge concentrate into the receiving container in an amount sufficient to provide a desired concentration of solution for a full receiving container of the solution.

According to this disclosure there is also provided a container filling apparatus for topping off receiving containers that are partially filled with an initial amount of a solution of a chemical concentrate and a diluent. The apparatus includes a dispenser for discharging additional concentrate into the receiving container, the dispenser being connected to a source of the concentrate. A diluent supply mechanism is connected to a source of the diluent and is configured to deliver diluent to the receiving container. A controller is connected to the concentrate dispenser and the diluent supply mechanism, the controller being programmed to first substantially fill the initially partially full receiving container with diluent, and to measure the amount of diluent required to be added to the initially partially full receiving container to substantially fill the receiving container with diluent, and then to discharge concentrate into the receiving container to provide the desired concentration, with the amount of concentrate being discharged being determined in response to the measured amount of diluent added.

According to this disclosure, in an embodiment, there is also provided a container filling apparatus for topping off receiving containers that are partially filled with an initial amount of a solution of a concentrate and a diluent. The apparatus includes a dispenser for discharging additional concentrate into the receiving container, the dispenser being connected to a source of the concentrate. A diluent supply mechanism is connected to a source of the diluent and configured to deliver diluent to the receiving container. A controller is connected to the concentrate dispenser and the diluent supply mechanism. The controller is programmed to initially determine the amount of the solution in the partially filled receiving container, and to then measure the amount of diluent discharged from the diluent supply mechanism into the receiving container. The controller is further programmed to then discharge, in response to the amount of diluent discharged from the diluent supply mechanism, concentrate into the receiving container in an amount sufficient to provide a desired concentration of solution for a full receiving container of the solution.

According to this disclosure there is also provided a container filling apparatus for topping off receiving containers that are partially filled with an initial amount of a solution of a concentrate and a diluent. The apparatus includes a dispenser for discharging additional concentrate into the receiving container, the dispenser being connected to a source of the concentrate. A diluent supply mechanism is connected to a source of the diluent and configured to deliver diluent to the receiving container. The diluent supply mechanism includes a valve. A controller is connected to the concentrate dispenser and the valve of the diluent supply mechanism, the controller being programmed to initially determine the amount of the solution in the partially filled receiving container. The controller is further programmed to close the valve when a condition of an overflowing receiving container is sensed.

A container filling apparatus can be provided for topping off receiving containers that are partially filled with an initial amount of a solution of a concentrate and a diluent, the apparatus comprising a dispenser for discharging additional concentrate into the receiving container, the dispenser being connected to a source of the concentrate; a level sensor configured to determine a level of the solution in the partially filled receiving container; and a controller connected to the concentrate dispenser, the controller being programmed to: use the level of the solution to determine the amount of the solution initially in the partially filled receiving container, and to determine an amount of concentrate to discharge into the receiving container sufficient to provide a desired concentration of solution for a full receiving container of the solution, and discharge the determined amount of concentrate into the receiving container.

An apparatus of the disclosure can include a data indicator on a receiving container that includes data on the size of the receiving container, and wherein the reading mechanism is configured to determine the size of the receiving container by reading the data indicator, and further wherein the controller is programmed to use the size of the receiving container as one factor in determining the amount of concentrate to discharge into the receiving container to provide the desired concentration of solution for a full receiving container of the solution.

A container filling apparatus can be provided for topping off receiving containers that are partially filled with an initial amount of a solution of a concentrate and a diluent includes a dispenser for discharging additional concentrate into the receiving container, the dispenser being connected to a source of the concentrate. A controller is connected to the concentrate dispenser, the controller being programmed to determine the amount of the solution initially in the partially filled receiving container, and to discharge concentrate into the receiving container in an amount sufficient to provide a desired concentration of solution for a full receiving container of the solution.

First Set of Illustrative Embodiments

Embodiment 1. A container filling apparatus comprising: (A) a source container containing a substance; (B) a reading mechanism capable of reading use data from a data indicator on a use device; (C) a controller connected to the reading mechanism, the controller being programmed to determine when a dispensing condition is satisfied, based on the use data from the data indicator, and to generate a signal when the dispensing condition is satisfied; (D) a dispenser for discharging the substance into a receiving container in response to the signal from the controller, the dispenser including: (a) an additive valve for controlling flow of the substance out of the source container; (b) a vacuum manifold, the substance flowing through the vacuum manifold downstream of the additive valve; (c) a pressure sensor that measures flow pressure of the substance in the vacuum manifold, and the pressure sensor in data communication with the controller so as to output the flow pressure, over time, to the controller; (d) a tee pipe including: a high pressure inlet that is connected to a source of base ingredient; a low pressure inlet that is connected to the vacuum manifold; and a dispense outlet, the dispense outlet provided to be positioned over the receiving container.

Embodiment 2. The container filling apparatus of embodiment 1, the tee pipe includes a venturi tube that includes a constricted portion that separates a first cone and a second conc.

Embodiment 3. The container filling apparatus of embodiment 1, the source of base ingredient is a source of water.

Embodiment 4. The container filling apparatus of embodiment 1, the data indicator is a receiving container data indicator, and the use device is the receiving container.

Embodiment 5. The container filling apparatus of embodiment 4, the receiving container data indicator, with the use data, indicates the position of the receiving container with respect to the dispense outlet and the dispensing condition is satisfied when the receiving container satisfies spatial thresholds so as to be deemed, by the controller, to be properly positioned.

Embodiment 6. The container filling apparatus of embodiment 1, the dispenser is adapted to dispense a plurality of substances from a plurality of source containers.

Embodiment 7. The container filling apparatus of embodiment 1, further including a plurality of source containers, each containing a respective substance, and the apparatus is configured to (a) mix the base ingredient and two or more of the respective substances to generate a mixture, and (b) to discharge the mixture into the receiving container.

Embodiment 8. The container filling apparatus of embodiment 1, the substance is a chemical concentrate, and the base ingredient is water.

Embodiment 9. The container filling apparatus of embodiment 1, the use device is a personal identification token of a user.

Embodiment 10. The container filling apparatus of embodiment 9, the personal identification token is at least one of a card, a magnetic card, a key fob, a smart phone, and a user device.

Embodiment 11. The container filling apparatus of embodiment 1, the dispensing condition includes a match between the use data, from the data indicator, and access data stored by the controller.

Embodiment 12. The container filling apparatus of embodiment 1, the use data constitutes first use data, and the user device is the receiving container; the reading mechanism also capable of reading second use data from a personal identification token of a human user; the dispensing condition includes: (a) a match between first access data stored by the controller and the first use data, AND (b) a match between second access data stored by the controller and the second use data.

Embodiment 13. The container filling apparatus of embodiment 1, the controller includes a computer processor and a memory portion, and instructions stored on a non-transitory computer medium disposed in the memory portion, and the computer processor performs processing, based on the instructions, the memory portion storing access data; and the processing including: determining that the dispensing condition is satisfied, and the dispensing condition includes a match between the use data, from the data indicator, and access data stored in the memory portion and accessed by the processor.

Embodiment 14. The container filling apparatus of embodiment 13, the performs processing including: monitoring the flow pressure over time to determine if the flow pressure is within a pressure window, and the pressure window defined by predetermined thresholds.

Embodiment 15. The container filling apparatus of embodiment 14, the performs processing including turning the additive valve OFF, upon determining that the flow pressure is not within the pressure window.

Embodiment 16. The container filling apparatus of embodiment 1, the dispenser including a base ingredient valve that controls flow of base ingredient into the high pressure inlet, and the base ingredient valve being controlled by the controller.

Second Set of Illustrative Embodiments

Embodiment 1. A container filling apparatus comprising: (A) a source container containing a substance; (B) a controller, the controller being programmed to determine that a dispensing condition is satisfied and to generate a signal when the dispensing condition is satisfied, and the controller including a computer processor and a memory portion, and instructions stored on a non-transitory computer medium disposed in the memory portion, and the computer processor performing processing, based on the instructions, including monitoring pressure observed by a pressure sensor; (C) a dispenser for discharging the substance into a receiving container in response to the signal from the controller, the dispenser including: (a) an additive valve for controlling flow of the substance out of the source container, and the additive valve controlled by the controller; (b) a vacuum manifold, the substance flowing through the vacuum manifold downstream of the additive valve; (c) the pressure sensor that measures flow pressure of the substance in the vacuum manifold, and the pressure sensor in data communication with the controller so as to output pressure data over time, based on the pressure observed by the pressure sensor, to the controller; and a tee pipe including: a high pressure inlet that is connected to a source of base ingredient; a low pressure inlet that is connected to the vacuum manifold; and a dispense outlet.

Embodiment 2. The container filling apparatus of embodiment 1, the tee pipe includes a venturi tube that includes a constricted portion that separates a first cone and a second conc.

Embodiment 3. The container filling apparatus of embodiment 2, the performing processing including: pulsing the additive valve ON and OFF over a predetermined period of time so as to add a predetermined amount of substance into a stream of base ingredient, as the base ingredient flows through the tee pipe.

Embodiment 4. The container filling apparatus of embodiment 3, the pulsing the additive valve generates pressure pulses that are represented in the pressure data.

Embodiment 5. The container filling apparatus of embodiment 5, the monitoring pressure includes monitoring a low pressure and a high pressure of each of the pressure pulses.

Embodiment 6. The container filling apparatus of embodiment 5, the monitoring pressure includes monitoring a pressure curve between (a) a first low pressure and a second low pressure, the first low pressure associated with a first pressure pulse and the second low pressure associated with a second pressure pulse, the second pressure pulse following the first pressure pulse.

Embodiment 7. The container filling apparatus of embodiment 6, the performing processing includes: performing an integration process to determine an area under the pressure curve; and assessing an amount of additive added to the base ingredient based on the area under the pressure curve.

Embodiment 8. The container filling apparatus of embodiment 7, the assessing an amount of additive added to the base ingredient includes applying an adjustment factor to the area, under the pressure curve.

Embodiment 9. The container filling apparatus of embodiment 3, the performing processing including: turning the additive valve OFF so as to terminate flow of additive.

Embodiment 10. The container filling apparatus of embodiment 1, the performing processing including: pulsing the additive valve ON and OFF over a first predetermined period of time so as to add a predetermined amount of substance into a flow of the base ingredient, as the base ingredient flows through the tee pipe.

Embodiment 11. The container filling apparatus of embodiment 10, the container filling apparatus further including a base ingredient valve that is controlled by the controller, the base ingredient valve controlling a flow of the base ingredient into the high pressure inlet, so as to mix with the substance.

Embodiment 12. The container filling apparatus of embodiment 11, the base ingredient valve is maintained in an ON position over a second predetermined period of time during a dispense event, and the second predetermined period of time is longer than the first predetermined period of time.

Embodiment 13. The container filling apparatus of embodiment 1, the performs processing including monitoring the pressure data over time to determine if flow pressure is within a pressure window, and the pressure window defined by predetermined upper and lower thresholds.

Embodiment 14. The container filling apparatus of embodiment 13, the performs processing including turning the additive valve OFF, upon determining that the flow pressure is not within the pressure window.

Embodiment 15. The container filling apparatus of embodiment 1, the dispensing apparatus further including a reading mechanism capable of reading use data from a data indicator on a use device; and the controller connected to the reading mechanism, the controller being programmed to determine when a dispensing condition is satisfied and to generate a signal when the dispensing condition is satisfied, and the signal initiating and/or allowing a dispense event.

Embodiment 16. The container filling apparatus of embodiment 1, the dispense outlet configured so as to be positioned over a receiving container.

Third Set of Illustrative Embodiments

Embodiment 1. A dispensing apparatus that performs dispensing of product, the apparatus comprising: (A) a container assembly that includes a container with an internal volume, the internal volume for storing an additive; (B) an additive valve; (C) a vacuum manifold that includes a vacuum chamber, the additive valve controlling flow of the additive from the internal volume, of the container assembly, into the vacuum manifold; (D) a pressure sensor exposed to the vacuum chamber, the pressure sensor generates pressure data based on measured pressure in the vacuum manifold; (E) a venturi body assembly (VBA) that includes: a venturi body, the venturi body including an upstream cone with a first passage, a throat with a second passage, and a downstream cone with a third passage, and the first, second and third passages connected to provide fluid flow therethrough, and the second passage having reduced diameter, versus the first and second passage, so as to provide low pressure fluid flow through the second passage; and a low pressure connection with a low pressure passage, the low pressure passage providing additive flow from the vacuum manifold into the second passage; and (F) an inflow valve, connected to the high pressure connection, to control flow of a base ingredient, from a source, into the first internal passage; and (G) a controller that includes a processor and a database, (a) the controller in communication with the pressure sensor, so as to input the pressure data; and (b) the controller controlling the additive valve to perform a dispense event, in conjunction with monitoring the pressure data, and the dispense event including adding the additive into the base ingredient, in the venturi body, so as to generate the product, and the product being output from the downstream cone.

Embodiment 2. The dispensing apparatus of embodiment 1, the controller further controlling the inflow valve, so as to open and close the inflow valve.

Embodiment 3. The dispensing apparatus of embodiment 1, the inflow valve being manually controllable by a human user, so as to open and close the inflow valve, and the controller controlling the dispense event in conjunction with the inflow valve being open.

Embodiment 4. The dispensing apparatus of embodiment 1, the controller monitoring the pressure data includes the controller determining if the pressure in the vacuum chamber is within predetermined pressure thresholds.

Embodiment 5. The dispensing apparatus of embodiment 4, the predetermined pressure thresholds includes a low pressure threshold and a high pressure threshold.

Embodiment 6. The dispensing apparatus of embodiment 4, the controller further controlling the inflow valve, so as to open and close the inflow valve, and the controller, upon determining that pressure in the vacuum chamber is NOT within the predetermined pressure thresholds, (a) turning the inflow valve OFF, and (b) turning the additive valve off.

Embodiment 7. The dispensing apparatus of embodiment 1, further including an attachment adaptor that includes an engagement spout, the engagement spout providing for the attachment adaptor to be removably attached to container assembly.

Embodiment 8. The dispensing apparatus of embodiment 1, further including a valve assembly that includes a one way valve, the one way valve providing for additive to flow from the internal volume to the additive valve.

Embodiment 9. The dispensing apparatus of embodiment 1, the container assembly being open, at a top of the container assembly, so as to be exposed to ambient pressure.

Embodiment 10. The dispensing apparatus of embodiment 1, container assembly being closed at a top of the container assembly, and the container assembly further including a vent tube, and the vent tube providing for ambient air to enter the internal volume.

Fourth Set of Illustrative Embodiments

Embodiment 1. A container filling apparatus comprising: (A) a source container containing a substance; (B) a reading mechanism configured to read use data from a data indicator on a use device; (C) a controller connected to the reading mechanism, the controller being programmed to determine when a dispensing condition is satisfied based on the use data and to generate a signal when the dispensing condition is satisfied, and the controller including a computer processor and a memory portion, and instructions stored on a non-transitory computer medium disposed in the memory portion, and the computer processor performing processing, based on the instructions, including monitoring pressure observed by a pressure sensor; (D) a dispenser for discharging the substance into the receiving container in response to the signal from the controller, the dispenser including: (a) an additive valve for controlling flow of the substance out of the source container, and the additive valve controlled by the controller; (b) a vacuum manifold, the substance flowing through the vacuum manifold downstream of the additive valve; (c) the pressure sensor that measures flow pressure of the substance in the vacuum manifold, and the pressure sensor in data communication with the controller so as to output pressure data over time, based on the pressure observed by a pressure sensor, to the controller; (d) a tee pipe that includes a venturi tube with a constricted portion that separates an inlet cone and an outlet cone, the tee pipe including: (1) a high pressure inlet that includes the inlet cone, the high pressure inlet connected to a source of base ingredient; (2) a low pressure inlet that is connected to the vacuum manifold, and the low pressure inlet providing flow of substance into the constricted portion; and (3) a dispense outlet that is downstream of the outlet cone; and (E) the performing processing including: (a) opening the base ingredient valve to initiate a dispense event with flow of base ingredient; (b) pulsing the additive valve to provide a flow of additive that is added into the flow of base ingredient, during the dispense event; and (c) closing the base ingredient valve to terminate the dispense event.

Embodiment 2. The container filling apparatus of embodiment 1, the performing processing including: measuring an amount of time between opening and closing the base ingredient valve; and determining a base volume based on the amount of time, the base volume representing a volume of dispensed base ingredient.

Embodiment 3. The container filling apparatus of embodiment 2, the performing processing including: controlling the additive valve to open for a predetermined number of pulse times during the dispense event; determining an additive volume based on the predetermined number of pulse times, the additive volume representing a volume of additive dispensed.

Embodiment 4. The container filling apparatus of embodiment 1, the performing processing including: controlling the additive valve to open for a predetermined number of pulse times during the dispense event; and determining an additive volume based on the predetermined number of pulse times, the additive volume representing a volume of additive dispensed.

Embodiment 5. The container filling apparatus of embodiment 4, the performing processing including incrementing an additive dispensed value, by the additive volume, in a data record, in the memory portion.

Embodiment 6. The container filling apparatus of embodiment 5, the performing processing including comparing the additive dispensed value to a total source container volume to determine an amount of additive remaining in the source container.

Embodiment 7. The container filling apparatus of embodiment 1, the performing processing including generating consumption data based on the pulsing of the additive valve, and the consumption data representing amount of additive dispensed, by the dispenser, from the source container.

Embodiment 8. The container filling apparatus of embodiment 7, the container filling apparatus including a second source container with second additive;
the controller also generating second consumption data representing amount of second additive dispensed, by the dispenser, from the second source container; and
the controller aggregating the consumption data with the second consumption data, so as to generate aggregated consumption data.

Embodiment 9. The container filling apparatus of embodiment 8, the container filling apparatus being spread over multiple stations, and the multiple stations being positioned at respective multiple physical locations in a building; and a first station, of the multiple stations including the source container and the second source container.

Embodiment 10. The container filling apparatus of embodiment 9, the controller being located at a central location, and the controller communicating with each of the multiple stations, so as to input respective consumption data from each of the stations, and the controller aggregating the respective consumption data from each of the stations, so as to generate the aggregated consumption data.

Embodiment 11. The container filling apparatus of embodiment 1, the container filling apparatus being spread over multiple stations, and the multiple stations being positioned at respective multiple physical locations in a building; and a first station, of the multiple stations including the source container and a second source container.

Embodiment 12. The container filling apparatus of embodiment 11, the controller being located at a central location, and the controller communicating with each of the multiple stations, so as to input respective consumption data from each of the stations, and the controller aggregating the respective consumption data from each of the stations, so as to generate aggregated consumption data.

Embodiment 13. The container filling apparatus of embodiment 1, the performing processing further including determining if there is sufficient quantity of the substance to perform a requested dispense event.

Fifth Set of Illustrative Embodiments

Embodiment 1. A container filling apparatus comprising: (A) a first source container containing a first substance; (B) a second source container containing a second substance; (C) a controller; and the controller including a computer processor and a memory portion, and instructions stored on a non-transitory computer medium disposed in the memory portion, and the computer processor performing processing, based on the instructions; (D) a dispenser for discharging a substance into a receiving container in response to the signal from the controller, the dispenser including: (a) a first additive valve that controls flow of the first substance out of the first source container and into a vacuum manifold, and the first additive valve controlled by the controller; (b) a second additive valve that controls flow of the second substance out of the second source container and into a vacuum manifold, and the second additive valve controlled by the controller; (c) the vacuum manifold; (d) a pressure sensor that measures flow pressure in the vacuum manifold, and the pressure sensor in data communication with the controller so as to output pressure data over time, based on the pressure observed by a pressure sensor, to the controller, and the performing processing including monitoring the pressure data over time; (e) a tee pipe including: a high pressure inlet that is connected to a source of base ingredient; a low pressure inlet that is connected to the vacuum manifold; and a dispense outlet.

Embodiment 2. The container filling apparatus of embodiment 1, the tee pipe is a Venturi pipe that includes a constricted portion that separates a first cone and a second cone.

Embodiment 3. The container filling apparatus of embodiment 1, the dispenser further including a base ingredient valve that controls the flow of base ingredient into the tee pipe, and the base ingredient valve controlled by the controller.

Embodiment 4. The container filling apparatus of embodiment 3, the performing processing further including: (a) turning the base ingredient valve ON to allow the flow of base ingredient; (b) pulsing the first additive valve ON and OFF to provide for flow of the first substance; (c) pulsing the second additive valve ON and OFF to provide for flow of the second substance; and (d) turning the base ingredient valve OFF to stop the flow of base ingredient.

Embodiment 5. The container filling apparatus of embodiment 4, the performing processing of 1, 2, 3 and 4 are performed in order of 2 after 1, 3 after 2, and 4 after 3.

Embodiment 6. The container filling apparatus of embodiment 4, the pulsing the first additive valve is performed, and thereafter, the pulsing the second additive valve is performed.

Embodiment 7. The container filling apparatus of embodiment 4, the pulsing the first additive valve is performed intermittently with pulsing the second additive valve.

Embodiment 8. The container filling apparatus of embodiment 4, the pulsing the first additive valve ON and OFF to provide for flow of the first substance includes a plurality of pulses, and a number of the plurality of pulses is determined, by the controller, based on a volume of first substance to be dispensed.

Embodiment 9. The container filling apparatus of embodiment 8, the monitoring the pressure data over time includes determining that the pressure observed by the pressure sensor is within a lower limit and an upper limit.

Embodiment 10. The container filling apparatus of embodiment 8, the performing processing further includes monitoring a pressure curve, of the pulsing, based on the pressure data.

Embodiment 11. The container filling apparatus of embodiment 10, the performing processing further includes integrating the pressure curve so as to determine the volume of first substance dispensed.

Embodiment 12. The container filling apparatus of embodiment 4, the performing processing further includes waiting a period of time after the pulsing the second additive valve ON and OFF, so as to allow a predetermined amount of base ingredient to flow after the second substance has been added.

Embodiment 13. The container filling apparatus of embodiment 1, the monitoring the pressure data over time includes determining that the pressure observed by the pressure sensor is within a lower limit and an upper limit.

Embodiment 14. The container filling apparatus of embodiment 1, further including a third source container containing a third substance; and a third additive valve that controls flow of the third substance out of the third source container and into the vacuum manifold, and the third additive valve controlled by the controller.

Embodiment 15. The container filling apparatus of embodiment 1, the dispensing apparatus further including a reading mechanism capable of reading use data from a data indicator on a use device; and the controller connected to the reading mechanism, the controller being programmed to determine when a first dispensing condition is satisfied and to generate a first signal when the first dispensing condition is satisfied, and the first signal initiating and/or allowing a dispense event of the first substance.

Embodiment 16. The container filling apparatus of embodiment 15, the controller being programmed to determine when a second dispensing condition is satisfied and to generate a second signal when the second dispensing condition is satisfied, and the second signal initiating and/or allowing a dispense event of the second substance.

Sixth Set of Illustrative Embodiments

Embodiment 1. A container filling apparatus comprising: (A) a container assembly that includes a source container, the source container containing an additive ingredient; (B) a controller; and the controller including a computer processor and a memory portion, and instructions stored on a non-transitory computer medium disposed in the memory portion, and the computer processor performing processing, based on the instructions; (C) a dispenser for outputting the additive ingredient into a receiving container in response to a signal from the controller, the dispenser including: (a) an additive valve that controls flow of the additive ingredient out of the source container and into a vacuum manifold, and the additive valve controlled by the controller; (b) the vacuum manifold; (c) a pressure sensor that measures flow pressure in the vacuum manifold, and the pressure sensor in data communication with the controller so as to output pressure data over time, based on the pressure observed by a pressure sensor, to the controller, and (d) a tee pipe including: a high pressure inlet that is connected to a source of base ingredient; a low pressure inlet that is connected to the vacuum manifold; and a dispense outlet.

Embodiment 2. The container filling apparatus of embodiment 1, the tee pipe is a Venturi pipe that includes a constricted portion that separates a first cone and a second cone.

Embodiment 3. The container filling apparatus of embodiment 1, the dispenser further including a base ingredient valve that controls the flow of base ingredient into the tee pipe, and the base ingredient valve controlled by the controller.

Embodiment 4. The container filling apparatus of embodiment 1, the container assembly including: the source container, the source container including an opening; and a connection assembly positioned in the opening, so as to control flow of the additive ingredient through the opening; and the dispenser including an attachment adaptor that is connected to the additive valve, the attachment adaptor removably engaged with the connection assembly.

Embodiment 5. The container filling apparatus of embodiment 4, the connection assembly including a one way valve.

Embodiment 6. The container filling apparatus of embodiment 4, the attachment adaptor received into an outlet chamber of the connection assembly.

Embodiment 7. The container filling apparatus of embodiment 4, the container assembly further including an attachment collar, and the attachment collar serving to connect the connection assembly to the source container.

Embodiment 8. The container filling apparatus of embodiment 1, the container assembly including: (a) the source container, the source container including an opening; (b) a connection assembly positioned in the opening, so as to control flow of the additive ingredient through the opening; and (c) an attachment collar, and the attachment collar serving to secure the connection assembly onto the source container.

Embodiment 9. The container filling apparatus of embodiment 8, the container assembly further including a vent tube, the vent tube extending from a receiving aperture in the connection assembly into an interior volume of the source container, and the vent tube serving to allow ambient air to flow into the interior volume of the source container as the additive ingredient is depleted.

Embodiment 10. The container filling apparatus of embodiment 9, a vent opening provided in at least one of (a) a neck of the source container and (b) the connection assembly, and the vent opening is provided for the flow of ambient air into the vent tube and into the interior volume of the source container.

Embodiment 11. The container filling apparatus of embodiment 8, the connection assembly including an engagement collar, the engagement collar sandwiched between an annular surface of the opening of the source container and an inner surface of the engagement collar.

Embodiment 12. The container filling apparatus of embodiment 8, an annular gasket positioned between the source container and the connection assembly.

Embodiment 13. The container filling apparatus of embodiment 8, the attachment collar is attached onto a neck of the source container by threads, which are provided on an interior surface of the attachment collar.

Embodiment 14. The container filling apparatus of embodiment 1, the performing processing including monitoring the pressure data over time.

Embodiment 15. The container filling apparatus of embodiment 1, further including a pressure regulator that is positioned upstream of the high pressure inlet, so as to control pressure of the base ingredient flowing into the high pressure inlet.

Hereinafter, further aspects of the disclosure will be described.

As described herein, in at least some embodiments of the system of the disclosure, various processes are described as being performed by one or more computer processors. Such one or more computer processors can, in conjunction with a database or other data storage mechanism, provide and/or constitute a "processing machine," i.e. a tangibly embodied machine, in that such one or more computer processors can include various physical computing devices as otherwise described herein, various support structure to physically support the computing devices, other hardware, and other physical structure, for example. In embodiments, a processing machine of the disclosure can include one or more computer processors and one or more databases that are in communication with the one or more computer processors. A computer processor or processing machine of the disclosure can be part of a higher level system or apparatus.

As used herein, the term "computer processor" can be understood to include at least one processor that uses at least one memory. The at least one memory can store a set of instructions. The instructions may be either permanently or temporarily stored in the memory or memories of the processing machine or associated with the processing machine. The computer processor can execute the instructions that are stored in the memory or memories in order to process data, input data, output data, and perform related processing. The set of instructions may include various instructions that perform a particular task or tasks, such as any of the processing as described herein. Such a set of instructions for performing a particular task may be described as a program, software program, code or simply software. Accordingly, various processing is described herein as performed by a computer processor (CP). Such computer processor (CP) can be described as or can include: a computer processor portion, a computer processing portion, a processor, a system processor, a processing system, a server, a server processing portion, an engine, a processing engine, a central processing unit (CPU), a controller, a processor-based controller, an electronic computing device, an apparatus controller, an apparatus computer processor, a processing device, a computer operating system, an apparatus processing portion, an apparatus processing portion, an electronic control unit ("ECU"), a microcontroller, a microcomputer, a plurality of electronic computing devices or servers, other processor-based controller(s), and/or similar constructs, for example.

A computer processor and/or processing machine, of the disclosure, may be constituted by and/or be part of particular apparatus(es), system(s) and/or device(s) described herein. The computer processor can execute instructions that are stored in memory or memories to process data. This processing of data may be in response to commands by a user or users of the computer processor, in response to previous processing, in response to a request by another processing machine and/or any other input, for example. A user can be in the form of a user device, such as a cellular phone.

A computer processor and/or processing machine of the disclosure may also utilize (or be in the form of) any of a wide variety of technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that can be capable of implementing the steps of the processes of the disclosure.

The computer processor and/or processing machine used to implement the disclosure may utilize a suitable operating system. Thus, embodiments of the disclosure may include a processing machine running the Windows 11 operating system, the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described herein, it is not necessary that the computer processors and/or the memories of a processing machine be physically located in the same geographical place. That is, each of the computer processors and the memories used by the processing machine may be located in geographically distinct locations and connected so as to communicate in any suitable manner. Additionally, it is appreciated that each computer processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described herein may, in accordance with a further embodiment of the disclosure, be performed by a single component. Further, the processing performed by one distinct component as described above may be performed by two distinct components. For example, processing as described herein might be performed in part by a system or other system or server, in part by some third party resource, and in part by a user device. In a similar manner, the memory storage performed by two distinct memory portions as described herein may, in accordance with a further embodiment of the disclosure, be performed by a single memory portion. Further, the memory storage performed by one distinct memory portion as described above may be performed by two memory portions.

Further, as described herein, various technologies may be used to provide communication between the various processors and/or memories, as well as to allow the processors and/or the memories of the disclosure to communicate with any other entity; i.e., so as to obtain further instructions, transfer data, or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described herein, a set of instructions can be used in the processing of the disclosure on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

It is appreciated that the instructions or set of instructions used in the implementation and operation of features of the disclosure may be in a suitable form such that a computer processor or processing machine may read the instructions. For example, the instructions that form a program may be in the form of a suitable programming language, which can be converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer processor, for example. The computer processor understands the machine language.

Accordingly, a suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, Python, Ruby, PHP, Perl, JavaScript, and/or other scripting language, for example. Further, it is not necessary that a single type of instructions or single programming language be utilized in conjunction with the operation of the systems and methods of the disclosure. Rather, any number of different programming languages may be utilized as may be necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example. Accordingly, a compression or encryption technique or algorithm can be used that transforms the data from an un-encrypted format to an encrypted format.

As described above, the disclosure may illustratively be embodied in the form of a processing machine, including a computer processor, for example, that includes at least one memory. It is to be appreciated that the set of instructions, i.e., the software for example, that enables the computer processor to perform the operations described herein may be contained on any of a wide variety of media or medium, as desired. Further, the data that can be processed by the set of instructions can be contained on any of a wide variety of media or medium. That is, the particular medium, i.e., the memory or data storage device used in a processing machine, utilized to hold the set of instructions and/or the data used in practice of the disclosure may take on any of a variety of physical forms or transmissions, for example. Illustratively, the medium or data storage device may be in a tangibly embodied form of paper, paper transparencies, a compact disk, a DVD, an integrated circuit, a hard disk, a floppy disk, an optical disk, a magnetic tape, a RAM, a ROM, a PROM, a EPROM, a CD-ROM, a DVD-ROM, a hard drive, a magnetic tape cassette, a wire, a cable, a fiber, communications channel, and/or may be in the form of a satellite transmissions or other remote transmission, as well as any other medium or source of data that may be read by the processors of the disclosure.

For example, exemplary embodiments are intended to cover all software or computer programs capable of enabling processors to implement the operations, designs and determinations as described herein. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed herein.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs and outputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. A network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The database(s), memory or memories used in the processing machine that implements the disclosure may be in any of a wide variety of forms to allow the memory to hold instructions, data, or other information, as can be desired. Thus, a memory might be in the form of a database to hold data. The database might use any desired arrangement of files or data sets such as a flat file arrangement or a relational database arrangement, for example. The database can include any number of data records, tables, and/or other data structure. A table in a database can include a Primary key (PK) to identify the table. A foreign key (FK) can be an attribute in one table (entity) that links or maps to the PK of another table, so as to provide an interrelationship or mapping between tables and/or databases, for example.

In various processing described herein and illustrated by flowcharts or otherwise described, variables can be used in various processes. Such processes can include routines, subroutines, and steps, for example. The various variables can be passed between processes as may be needed in accord with the instructions provided to a processor. The various variables can be global variables that are available to the various processes, such as between a calling process and a subroutine, for example.

In the system and method of the disclosure, a variety of "user interfaces" may be utilized to allow a user to interface with the processing machine or machines that are used to implement the disclosure. As used herein, a user interface can include any hardware, software, or combination of hardware and software used by the processing machine that allows a user to interact with the processing machine and/or computer processor. A user interface may be in the form of a dialogue screen for example. A user interface may also include any of a mouse, touch screen, keyboard, voice reader, voice recognizer, dialogue screen, menu box, list, checkbox, toggle switch, a light, a pushbutton or any other device that allows a user to receive information regarding the operation of the processing machine as the processing machine processes a set of instructions and/or provide the processing machine with information. Accordingly, the user interface can be any device that provides communication between a user and a processing machine and/or computer processor. The information provided by the user to the processing machine through the user interface may be in the form of a command, a selection of data, or some other input, for example.

A user interface of the disclosure can be provided by or in the form of a user device or electronic user device. Also, systems of the disclosure can include or be in communication with one or more user devices that serve to interact or interface with a human user. A user device can be any appropriate electronic device, such as a cellular (mobile) telephone, smart phone, a tablet computer, a laptop computer, a desktop computer, an e-reader, an electronic wearable, smartwatch, gaming console, personal digital assistant (PDA), portable music player, fitness trackers with smart capabilities, and/or a server terminal, for example.

Such a user device can permit a user to input requests for information, output information, and/or process data. A user device can be in the form of and/or include a computer processor and/or a processing machine, as described herein.

As discussed above, a user interface can be utilized by the processing machine, which performs a set of instructions, such that the processing machine processes data for a user. The user interface can be typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

Features as disclosed herein may be described in context of particular units or dimensions. It is appreciated that alternative units or dimensions can be used as desired. Additionally, conversion can be performed between units or dimensions as may be desired.

In this disclosure, quotation marks, such as with the language "computer processor", have been used to enhance readability and/or to parse out a term or phrase for clarity.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left". "right", "north", "south", "east", "west", "up", "down", "right", "left", "upper threshold", "lower threshold" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures. For example, if a device or apparatus in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly. Embodiments are also intended to include or otherwise cover methods of using and methods of manufacturing any and all of the elements disclosed above.

As used herein, "data" and "information" have been used interchangeably.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising." when used in this specification, specify the presence of stated features, integers, process steps, operations, elements, and/or components, but do not preclude the presence or addition of one or more other features, integers, process steps, operations, elements, components, and/or groups thereof. Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. A container filling apparatus comprising:
   a source container containing a substance;
   a controller, the controller being programmed to determine that a dispensing condition is satisfied and to generate a signal when the dispensing condition is satisfied, and
      the controller including a computer processor and a memory portion, and instructions stored on a non-transitory computer medium disposed in the memory portion, and the computer processor performing processing, based on the instructions, including monitoring pressure observed by a pressure sensor;
   a dispenser for discharging the substance into a receiving container in response to the signal from the controller, the dispenser including:
      an additive valve for controlling flow of the substance out of the source container, and the additive valve controlled by the controller;
      a vacuum manifold, the substance flowing through the vacuum manifold downstream of the additive valve;
      the pressure sensor that measures flow pressure of the substance in the vacuum manifold, and the pressure sensor in data communication with the controller so as to output pressure data over time, based on the pressure observed by the pressure sensor, to the controller;
      a tee pipe including:
         a high pressure inlet that is connected to a source of base ingredient;
         a low pressure inlet that is connected to the vacuum manifold; and
         a dispense outlet.

2. The container filling apparatus of claim 1, the tee pipe includes a venturi tube that includes a constricted portion that separates a first cone and a second cone.

3. The container filling apparatus of claim 2, the performing processing including:
   pulsing the additive valve ON and OFF over a predetermined period of time so as to add a predetermined amount of substance into a stream of base ingredient, as the base ingredient flows through the tee pipe.

4. The container filling apparatus of claim 3, the pulsing the additive valve generates pressure pulses that are represented in the pressure data.

5. The container filling apparatus of claim 4, the monitoring pressure includes monitoring a low pressure and a high pressure of each of the pressure pulses.

6. The container filling apparatus of claim 5, the monitoring pressure includes monitoring a pressure curve between (a) a first low pressure and a second low pressure, the first low pressure associated with a first pressure pulse and the second low pressure associated with a second pressure pulse, the second pressure pulse following the first pressure pulse.

7. The container filling apparatus of claim 6, the performing processing includes:
   performing an integration process to determine an area under the pressure curve; and
   assessing an amount of additive added to the base ingredient based on the area under the pressure curve.

8. The container filling apparatus of claim 7, the assessing an amount of additive added to the base ingredient includes applying an adjustment factor to the area, under the pressure curve.

9. The container filling apparatus of claim 3, the performing processing including:
   turning the additive valve OFF so as to terminate flow of additive.

10. The container filling apparatus of claim 1, the performing processing including:
    pulsing the additive valve ON and OFF over a first predetermined period of time so as to add a predetermined amount of substance into a flow of the base ingredient, as the base ingredient flows through the tee pipe.

11. The container filling apparatus of claim 10, the container filling apparatus further including a base ingredient valve that is controlled by the controller, the base ingredient valve controlling a flow of the base ingredient into the high pressure inlet, so as to mix with the substance.

12. The container filling apparatus of claim 11, the base ingredient valve is maintained in an ON position over a second predetermined period of time during a dispense event, and the second predetermined period of time is longer than the first predetermined period of time.

13. The container filling apparatus of claim 1, the performing processing including monitoring the pressure data over time to determine if flow pressure is within a pressure window, and the pressure window defined by predetermined upper and lower thresholds.

14. The container filling apparatus of claim 13, the performs processing including turning the additive valve OFF, upon determining that the flow pressure is not within the pressure window.

15. The container filling apparatus of claim 1, the container filling apparatus further including a reading mechanism capable of reading use data from a data indicator on a use device; and the controller connected to the reading mechanism, the controller being programmed to determine when the dispensing condition is satisfied and to generate the signal when the dispensing condition is satisfied, and the signal initiating and/or allowing a dispense event.

16. The container filling apparatus of claim 1, the dispense outlet configured so as to be positioned over the receiving container.

\* \* \* \* \*